United States Patent
Kim et al.

(10) Patent No.: US 9,514,784 B2
(45) Date of Patent: Dec. 6, 2016

(54) TERMINAL AND OPERATING METHOD THEREOF

(71) Applicant: LG ELECTRONICS INC., Seoul (KR)

(72) Inventors: Jaewoon Kim, Seoul (KR); Hyobeom Lee, Seoul (KR); Kyueun Yi, Seoul (KR); Yoonji Kim, Seoul (KR); Seungjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/506,113

(22) Filed: Oct. 3, 2014

(65) Prior Publication Data

US 2015/0325271 A1 Nov. 12, 2015

(30) Foreign Application Priority Data

May 9, 2014 (KR) .......................... 10-2014-0055850
May 9, 2014 (KR) .......................... 10-2014-0055887

(51) Int. Cl.
*H04N 5/775* (2006.01)
*G11B 27/10* (2006.01)
*G11B 27/11* (2006.01)
(Continued)

(52) U.S. Cl.
CPC ............ *G11B 27/105* (2013.01); *G11B 19/02* (2013.01); *G11B 27/034* (2013.01); *G11B 27/11* (2013.01); *G11B 27/28* (2013.01); *G11B 27/34* (2013.01); *G11B 27/36* (2013.01)

(58) Field of Classification Search
CPC ............... G06F 3/013; G06F 3/0481; G06F 17/30017; H04N 21/41407; H04N 21/47217; H04N 21/4858; G06K 19/06009; G06Q 10/06; G11B 27/28

USPC .......................... 386/224, 248, 230, 349, 350
See application file for complete search history.

(56) References Cited

U.S. PATENT DOCUMENTS 7,152,209 B2 * 12/2006 Jojic ................. G06F 17/30825
382/305
8,489,990 B2 * 7/2013 Radloff ................ G11B 27/105
369/30.08

(Continued)

FOREIGN PATENT DOCUMENTS

| EP | 1 843 591 A1 | 10/2007 |
| EP | 2 544 185 A1 | 1/2013 |
| WO | 2008/010118 A1 | 1/2008 |

OTHER PUBLICATIONS

Pantic et al., "Automatic Analysis of Facial Expressions: The State of the Art", IEEE Transactions on Pattern Analysis and Machine Intelligence, vol. 22, No. 12, Dec. 2000, pp. 1424-1445.

*Primary Examiner* — Helen Shibru
(74) *Attorney, Agent, or Firm* — Birch, Stewart, Kolasch & Birch, LLP

(57) ABSTRACT

A method of controlling a mobile terminal, and which includes obtaining, via a camera of the mobile terminal, an image of a user; playing a video on a display unit of the mobile terminal; determining, via a controller of the mobile terminal, if the user is viewing the video being played based on the obtained image; storing, in a memory associated with the mobile terminal, video viewing information indicating when the user is viewing the video being played and when the user is not viewing the video being played for a specific playback section in an entire playback section of the video being played; receiving an input requesting the video viewing information be displayed; and displaying the video viewing information as a progressive bar on the display unit.

18 Claims, 88 Drawing Sheets

(51) Int. Cl.
*G11B 27/36* (2006.01)
*G11B 19/02* (2006.01)
*G11B 27/034* (2006.01)
*G11B 27/28* (2006.01)
*G11B 27/34* (2006.01)

(56) References Cited

U.S. PATENT DOCUMENTS

| | | | | |
|---|---|---|---|---|
| 8,812,850 B2* | 8/2014 | Barton | | H04L 9/0897 |
| | | | | 713/175 |
| 8,913,004 B1* | 12/2014 | Bozarth | | G06K 9/00604 |
| | | | | 345/156 |
| 9,215,510 B2* | 12/2015 | Wheatley | | H04N 21/6587 |
| 2003/0093790 A1 | 5/2003 | Logan et al. | | |
| 2008/0022295 A1 | 1/2008 | Fukumiya et al. | | |
| 2008/0225119 A1* | 9/2008 | Murata | | H04N 5/76 |
| | | | | 348/153 |
| 2010/0122277 A1 | 5/2010 | Fonseca | | |
| 2011/0107369 A1* | 5/2011 | O'Brien | | G06F 17/30029 |
| | | | | 725/38 |
| 2012/0020641 A1 | 1/2012 | Sakaniwa et al. | | |
| 2013/0011114 A1 | 1/2013 | Tashiro et al. | | |
| 2013/0135196 A1* | 5/2013 | Park | | G06F 3/01 |
| | | | | 345/156 |
| 2013/0185753 A1* | 7/2013 | Kliot | | H04N 21/47217 |
| | | | | 725/39 |
| 2013/0334300 A1* | 12/2013 | Evans | | G06F 17/30017 |
| | | | | 235/375 |
| 2014/0108309 A1* | 4/2014 | Frank | | G06N 99/005 |
| | | | | 706/12 |
| 2015/0036999 A1* | 2/2015 | Batur | | G06F 3/013 |
| | | | | 386/230 |
| 2015/0039590 A1* | 2/2015 | Kim | | G06F 17/30265 |
| | | | | 707/722 |

\* cited by examiner

FIG. 10
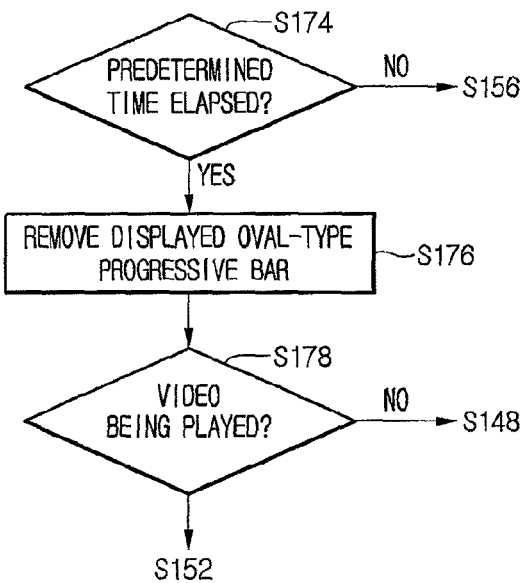
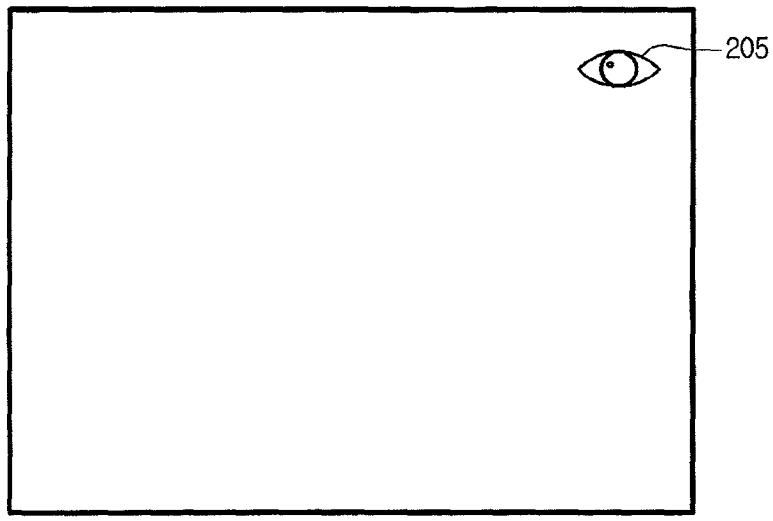
FIG. 11

FIG. 12
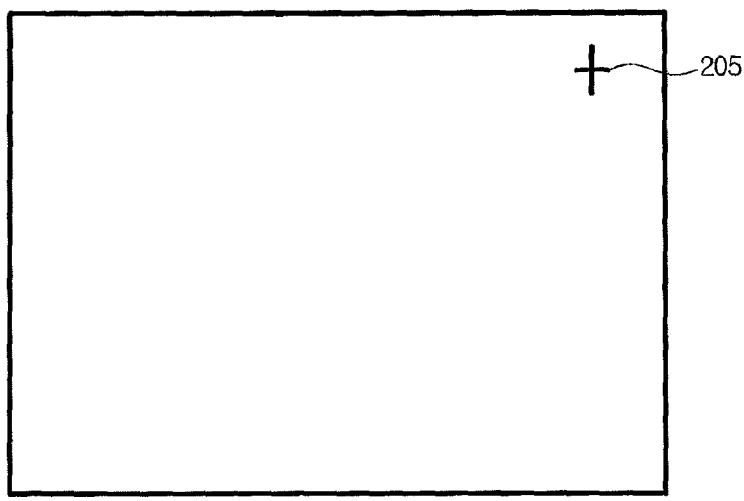
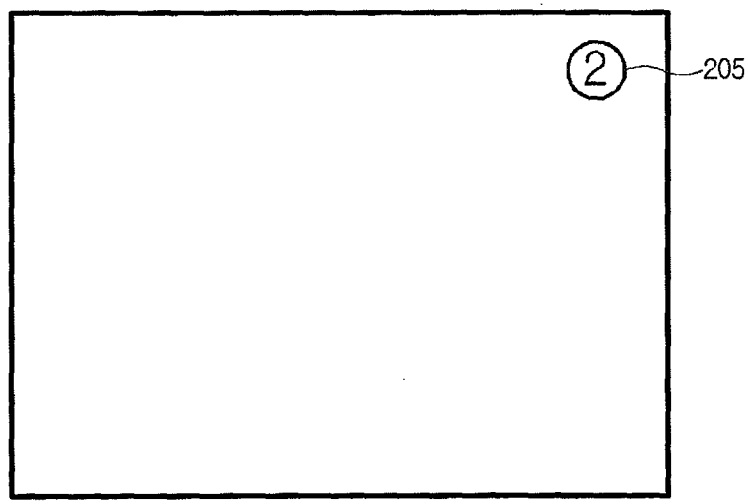
FIG. 13

FIG. 59
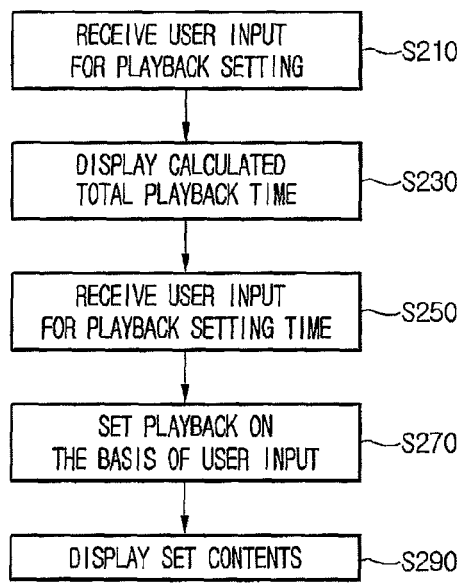
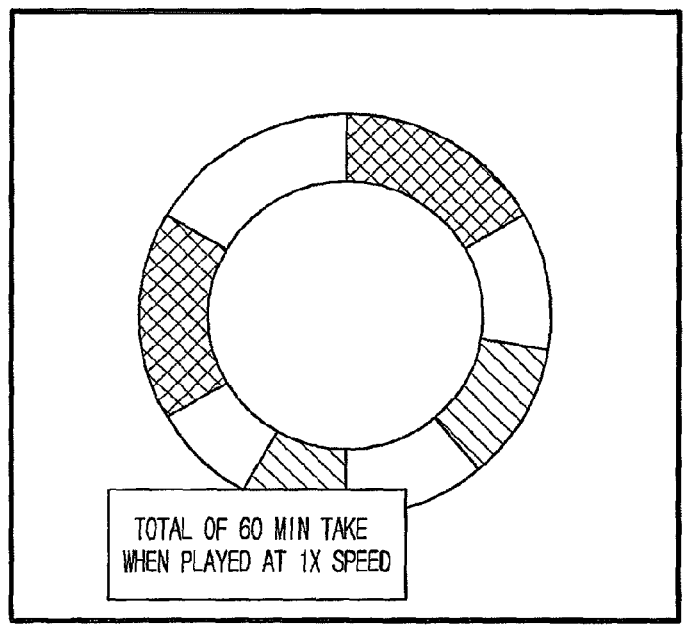
FIG. 60

TERMINAL AND OPERATING METHOD THEREOF

CROSS-REFERENCE TO RELATED APPLICATIONS

The present application claims priority under 35 U.S.C. §119 and 35 U.S.C. §365 to Korean Patent Application No. 10-2014-0055850, filed on May 9, 2014 and Korean Patent Application No. 10-2014-0055887, filed on May 9, 2014, which are hereby incorporated by reference in their entirety.

BACKGROUND OF THE INVENTION

1. Field of the Invention

The present invention relates to a terminal and corresponding method for obtaining a user's video viewing information and displaying the obtained user's viewing information.

2. Discussion of the Related Art

Terminals may be divided into mobile/portable terminals and stationary terminals. The mobile/portable terminals may be divided to handheld terminals and vehicle mounted terminals. As the functions of such terminals have become diversified, the terminals are implemented as a multimedia player having complex functions, for example, capturing pictures or videos, playing music or video files, playing games, and receiving broadcasts.

Accordingly, a user can view several videos such as a drama, movie, and music video using their mobile terminal. However, when a user stops viewing a video, it is difficult for the user to identify a viewed section and an unviewed section. Thus, the user has to play the video from the beginning and find the stopped section.

SUMMARY OF THE INVENTION

Accordingly, one object of the present invention to address the above-noted and other problems with the related art.

Another object of the present invention is to provide a terminal and corresponding method for obtaining a user's video viewing information and providing detailed information on the user's video viewing.

To achieve these and other advantages and in accordance with the purpose of the present invention, as embodied and broadly described herein, the present invention provides in one aspect a method of controlling a mobile terminal, and which includes obtaining, via a camera of the mobile terminal, an image of a user; playing a video on a display unit of the mobile terminal; determining, via a controller of the mobile terminal, if the user is viewing the video being played based on the obtained image; storing, in a memory associated with the mobile terminal, video viewing information indicating when the user is viewing the video being played and when the user is not viewing the video being played for a specific playback section in an entire playback section of the video being played; receiving an input requesting the video viewing information be displayed; and displaying the video viewing information as a progressive bar on the display unit.

In another aspect, the present invention provides a mobile terminal including a camera configured to obtain an image of a user; a display unit configured to display a video being played on the mobile terminal; and a controller configured to determine if the user is viewing the video being played based on the obtained image; store, in a memory associated with the mobile terminal, video viewing information indicating when the user is viewing the video being played and when the user is not viewing the video being played for a specific playback section in an entire playback section of the video being played; receive an input requesting the video viewing information be displayed; and display the video viewing information as a progressive bar on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 5 to 10 are flowcharts illustrating an operating method of a terminal according to an embodiment of the present invention;

FIGS. 11 to 13 are overviews illustrating a save display in a display screen according to an embodiment of the present invention;

FIG. 59 is a flowchart illustrating a video playback setting operation of a terminal 100 according to an embodiment of the present invention;

FIGS. 60 to 62 are overviews illustrating a video playback setting operation of a terminal according to an embodiment of the present invention;

DETAILED DESCRIPTION OF THE EMBODIMENTS

Hereinafter, a terminal relating to the present invention will be described in more detail with reference to the accompanying drawings. The suffixes "module" and "unit" for components used in the description below are assigned or mixed in consideration of easiness in writing the specification and do not have distinctive meanings or roles by themselves.

A mobile terminal described in this specification may include smartphones, laptop computers, digital broadcasting terminals, personal digital assistants (PDAs), portable multimedia players (PMPs), and navigations. However, the configuration is applicable to a stationary terminal such as a digital TV and a desktop computer.

Figure 1:
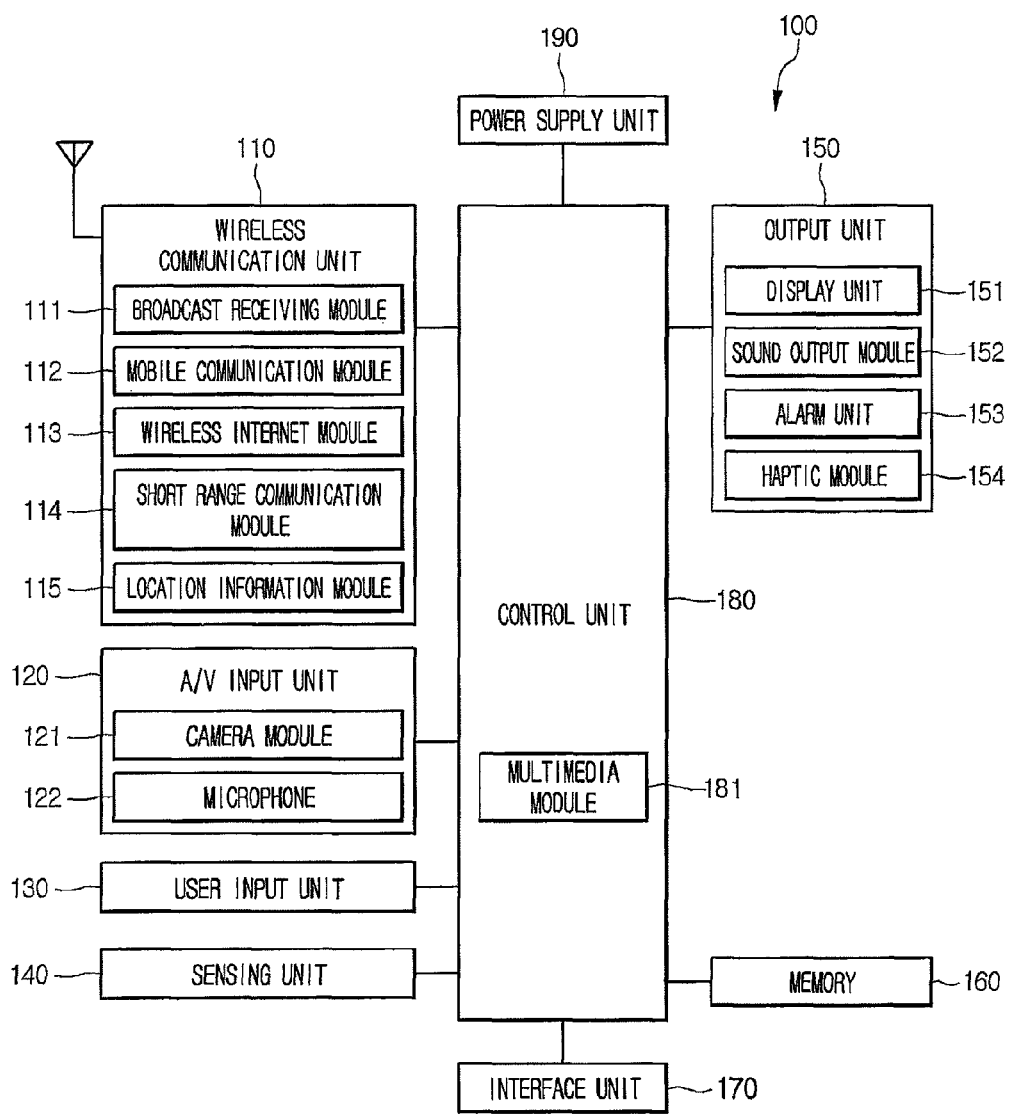
FIG. 1 is a block diagram of a mobile terminal according to an embodiment of the present invention.

A structure of a mobile terminal according to an embodiment of the present invention will now be described with reference to FIG. 1. In particular, FIG. 1 is a block diagram of a mobile terminal according to an embodiment of the present invention. As shown, the mobile terminal 100 includes a wireless communication unit 110, an audio/video (A/V) input unit 120, a user input unit 130, a sensing unit 140, an output unit 150, a memory 160, an interface unit 170, a control unit 180, and a power supply unit 190. The mobile terminal 100 may have more or less components than those shown in FIG. 1.

In addition, the wireless communication unit 110 may include at least one module allowing wireless communication between the mobile terminal 100 and a wireless communication system or between the mobile terminal 100 and a network including the same. For example, the wireless communication unit 110 shown in FIG. 1 includes a broadcast reception module 111, a mobile communication module 112, a wireless internet module 113, a short range communication module 114, and a location information module 115.

The broadcast reception module 111 receives broadcast signal and/or broadcast related information from an external broadcast management server through a broadcast channel. Further, the broadcast channel may include a satellite channel and a terrestrial channel. The broadcast management server may mean a server generating and transmitting broadcast signal and/or broadcast related information or a server receiving pre-generated broadcast signal and/or broadcast related information and transmitting it to a terminal. The broadcast signal may include TV broadcast signal, radio broadcast signal, data broadcast signal and further may include TV broadcast signal in the form in which TV broadcast signal or radio broadcast signal is combined with data broadcast signal.

The broadcast related information may mean information relating to a broadcast channel, a broadcast program, or a broadcast service provider. The broadcast related information may be provided via a mobile communication network. In such a case, the broadcast related information may be received by the mobile communication module 112.

The broadcast related information may exist in various formats. For example, the broadcast related information may be in formats, for example, the Electronic Program Guide (EPG) of the Digital Multimedia Broadcasting (DMB), or the Electronic Service Guide (ESG) of the Digital Video Broadcast-Handheld (DVB-H).

The broadcast reception module 111 can receive digital broadcast signals by using a digital broadcast system, for example, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast reception module 111 may also be configured to be fit for another broadcasting system in addition to the above-mentioned digital broadcasting system. Broadcast signal and/or broadcast related information received through the broadcast reception module 111 may be stored in the memory 160.

The mobile communication module 112 can transmit/receive wireless signal to/from at least one of a base station, an external terminal, and a server on a mobile communication network. The wireless signal may include various formats of data according to voice call signal, video call signal, or text/multimedia messaging.

The wireless internet module 113 refers to a module for wireless internet access and may be equipped internally or externally with respect to the mobile terminal 100. A wireless internet technique includes Wireless LAN (WLAN) (for example, Wi-Fi), Wireless broadband (Wibro), World Interoperability for Microwave Access (Wimax), and High Speed Downlink Packet Access (HSDPA).

The short range communication module 114 refers to a module for short range communication. A short range communication technique includes Bluetooth, Radio Frequency Identification (RFID), infrared Data Association (IrDA), Ultra Wideband (UWB), and ZigBee. In addition, the location information module 115 is a module for obtaining the location of a mobile terminal and its representative example includes a global position system (GPS) module.

The A/V input unit 120 is for inputting audio signal or video signal may include a camera 121 and a microphone 122. The camera 121 processes a video frame of a still image or a video obtained by an image sensor in a video call mode or a capturing mode. The processed video frame can then be displayed on the display unit 151.

Further, the video frame processed in the camera 121 may be stored in the memory 160 or transmitted to the outside through the wireless communication unit 110. The camera 121 may be provided in more than two according to a usage environment.

In addition, the microphone 122 receives an external sound signal by a microphone in a call mode, a recording mode, or a voice recognition mode and processes it as electrical voice data. For a call mode, the processed voice data can be converted into a format transmittable to a mobile communication base station and then output through the mobile communication module 112. Various noise reduction algorithms for reducing noise occurring during a process for receiving external voice signal may also be implemented in the microphone 122.

The user input unit 130 generates input data in order for a user to control an operation of a mobile terminal. The user input unit 130 may be configured with a keypad, a dome switch, a touch pad (for example, a resistive/capacitive touch pad), a jog wheel, and a jog switch.

The sensing unit 140 generates a sensing signal for controlling an operation of the mobile terminal 100 by detecting the current state of the mobile terminal 100, for example, an open/close state of the mobile terminal 100, the location of the mobile terminal 100, whether a user contacts the mobile terminal 100, the orientation of the mobile terminal 100, and the acceleration/deceleration of the mobile terminal 100. For example, when the mobile terminal 100 is a slide phone, it is possible to sense whether the slide phone is opened/closed. Additionally, it is possible to sense whether the power supply unit 190 supplies power and whether the interface unit 170 is connected to an external device. The sensing unit 140 may also include a proximity sensor.

The output unit 150 generates an output relating to visual, auditory, and tactile senses and in FIG. 1 includes a display unit 151, a sound output module 152, an alarm unit 153, and a haptic module 154. The display unit 151 displays (outputs) information processed in the mobile terminal 100. For example, when the mobile terminal 100 is in a call mode, the display unit 151 displays a call related user interface (UI) or graphic user interface (GUI). When the mobile terminal 100 is in a video call mode or a capturing mode, the display unit 151 displays a captured or/and received image, a UI, or a GUI.

The display unit 151 may include any of a liquid crystal display (LCD), a thin film transistor-liquid crystal display (a TFT LCD), an organic light-emitting diode (OLED), a flexible display, and a 3D display. Some displays may be configured with a transparent or optical transmissive type. This is referred to as a transparent display such as a Transparent OLED (TOLED). The display unit 151 may be configured with a rear structure or optical transmissive structure. By such a structure, a user can see an object disposed at the rear of a mobile terminal body through an area that the display unit 151 body occupies.

The display unit 151 may also be provided in more than two. For example, a plurality of display units may be disposed at one side separately or integrally, and may be disposed at different sides.

When a sensor (hereinafter referred to as a touch sensor) for sensing a touch operation of the display unit 151 forms a cross-layer structure (hereinafter referred to as a touch screen), the display unit 151 may be used as an input device in addition to an output device. The touch sensor may have a form of a touch film, a touch sheet, and a touch pad, for example. The touch sensor may also be configured to convert a change in pressure applied to a specific portion of the display unit 151 or capacitance occurring at a specific portion of the display unit 151. The touch sensor may be configured to detect a pressure when touched in addition to a touched position and area.

When there is a touch input on the touch sensor, signals corresponding thereto are transmitted to a touch controller. The touch controller processes the signals and then transmits the next corresponding data to the control unit 180. Therefore, the control unit 180 can identify which area of the display unit 151 is touched.

In addition, the proximity sensor may be disposed in an inner area of a mobile terminal 100 surrounded by the touch screen or near the touch screen. The proximity sensor refers to a sensor for detecting whether an object approaches a predetermined detection surface or there is an object near a predetermined detection surface by using the force of electromagnetic field or infrared ray. The proximity sensor also has a longer life cycle and a higher availability than a contact type sensor.

The proximity sensor includes a transmissive type photoelectric sensor, a direct reflective type photoelectric sensor, a mirror reflective type photoelectric sensor, a high frequency oscillation type proximity sensor, a capacitive proximity sensor, a magnetic proximity sensor, and infrared proximity sensor. When the touch screen is a capacitive type, it is configured to detect the proximity of a pointer by using a change in electric field according to the proximity of the pointer. In this instance, the touch screen (or the touch sensor) 144 may be classified as a proximity sensor.

Hereinafter, for convenience of description, an action for recognizing the pointer as on the touch screen while the pointer is close without contacting the touch screen is referred to as proximity touch and an action for actually contacting the touch screen with the pointer is referred to as contact touch. A position where the pointer is proximity-touched on the touch screen means a position that the pointer corresponds vertically when the pointer is proximity-touched.

The proximity sensor detects a proximity touch and a proximity touch pattern (for example, a proximity touch distance, a proximity touch direction, a proximity touch speed, a proximity touch time, a proximity touch position, and a proximity touch movement state). Information corresponding to the detected proximity touch operation and proximity touch pattern may be output on a touch screen.

The sound output module 152 can output audio data received from the wireless communication unit 110 or stored in the memory 160 in a call signal reception mode, a call mode, a recording mode, or a voice recognition mode. The sound output module 152 can output a sound signal relating to a function (for example, a call signal reception sound and a message reception sound) performed in the mobile terminal 100. The sound output module 152 may include a receiver, a speaker, and a buzzer.

The alarm unit 153 outputs a signal for notifying an event occurrence of the mobile terminal 100. An example of an event occurring in a mobile terminal includes call signal reception, message reception, key signal input, and touch input. The alarm unit 153 may output a signal for notifying event occurrence in another form other than video signal or audio signal, for example, vibration. The video signal or the audio signal may be output through the display unit 151 or the sound output module 152 and the display unit 151 and the sound output module 152 may be classified as part of the alarm unit 153.

The haptic module 154 generates various haptic effects that a user can feel. A representative example of a haptic effect that the haptic module 154 generates includes vibration. The intensity and pattern that the haptic module 154 generates are controllable. For example, different vibrations can be synthesized and output or may be output sequentially.

The haptic module 154 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat. The haptic module 154 can also be implemented to deliver a haptic effect through a direct contact and also allow a user to feel a haptic effect through a muscle sense such as a finger or an arm. The haptic module 154 may also be more than two according to a configuration aspect of the mobile terminal 100.

Further, the memory 160 can store a program for an operation of the control unit 180 and temporarily store input/output data (for example, a phone book, a message, a still image, and a video). The memory 160 may store data on various patterns of vibrations and sounds output during a touch input on the touch screen. Additionally, the memory 160 may store information on whether to view video described later. In more detail, the memory 160 can receive information on user's video viewing from the control unit 180 and then store it or may provide the stored information on user's video viewing to the control unit 180.

Further, the memory 160 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The mobile terminal 100 may operate in relation to a web storage performing a storage function of the memory 160 on internet.

In addition, the interface unit 170 serves as a path to all external devices connected to the mobile terminal 100. The interface unit 170 can receive data from an external device, receive power and deliver it to each component in the mobile terminal 100, or transmit data in the mobile terminal 100 to an external device. For example, the interface unit 170 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through a port.

Additionally, when the mobile terminal 100 is connected to an external cradle, the interface unit 170 can become a path through which power of the cradle is supplied to the mobile terminal 100 or a path through which various command signals input from the cradle are delivered to the mobile terminal 100 by a user. The various command signals or the power input from the cradle may operate as a signal for recognizing that the mobile terminal is accurately mounted on the cradle.

Further, the control unit 180 controls overall operations of a mobile terminal in general. For example, the control unit 180 performs a control and processing relating to a voice call, data communication, and a video call. The control unit 180 can include a multimedia module 181 for playing multimedia. The multimedia module 181 may be implemented in the control unit 180 or may be implemented separated from the control unit 180.

The control unit 180 can also perform pattern recognition processing so as to recognize handwriting input or drawing input on the touch screen as a text and an image, respectively. Further, the control unit 180 can identify a user's face based on a video frame processed by the camera 121.

Accordingly, the control unit 180 can recognize the face of a user using the terminal 100 and store information on the user's face in the memory 160. Thus, the control unit 180 can search for a matched user's face by comparing a plurality of pre-stored user's faces and a user's face of a video frame obtained through the camera 121.

Additionally, the control unit 180 can check whether a user views a video based on a video frame processed by the camera 121. For example, the control unit 180 can recognize a user from the video frame processed by the camera 121 and also determine which direction a user is intently looking (e.g., gazing). Then, the control unit 180 determines whether a user looks or gazes at the display unit 151 where an image is played.

Figure 2:
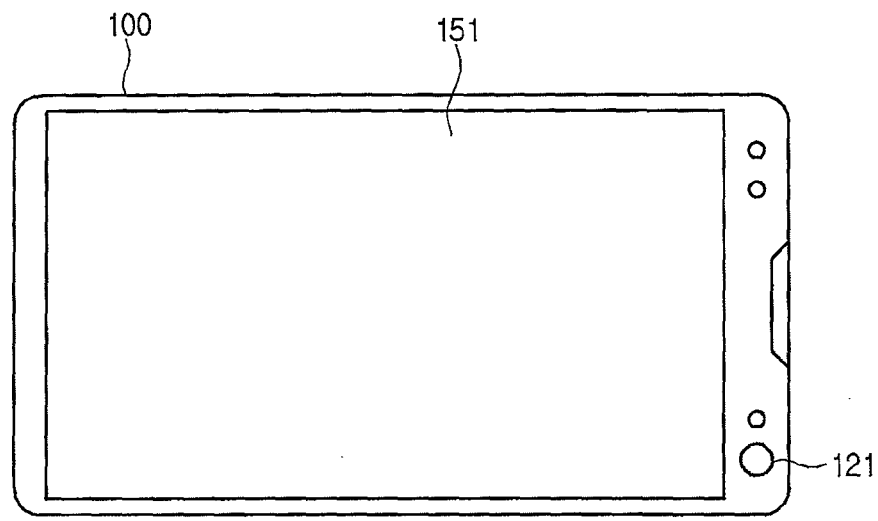
FIG. 2 is an overview illustrating a method of checking whether a user views a video according to an embodiment of the present invention.
Figure 2:
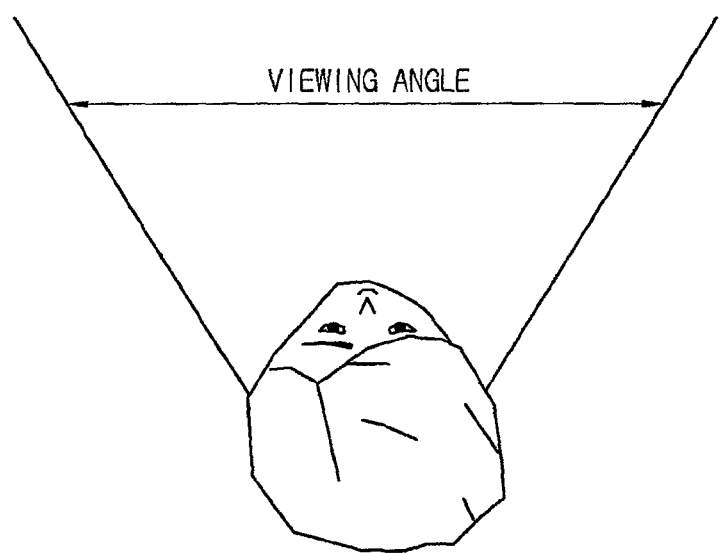

In more detail, FIG. 2 is an overview illustrating a method of checking whether a user views a video. Referring to FIG. 2, the camera 121 of the terminal 100 can obtain a video frame for a user's face. Then, the control unit 180 can determine which direction a user gazes based on a video frame of the obtained user's face.

Figure 3:
FIG. 3 is an overview illustrating recognizing a user's face according to an embodiment of the present invention.
Figure 4:
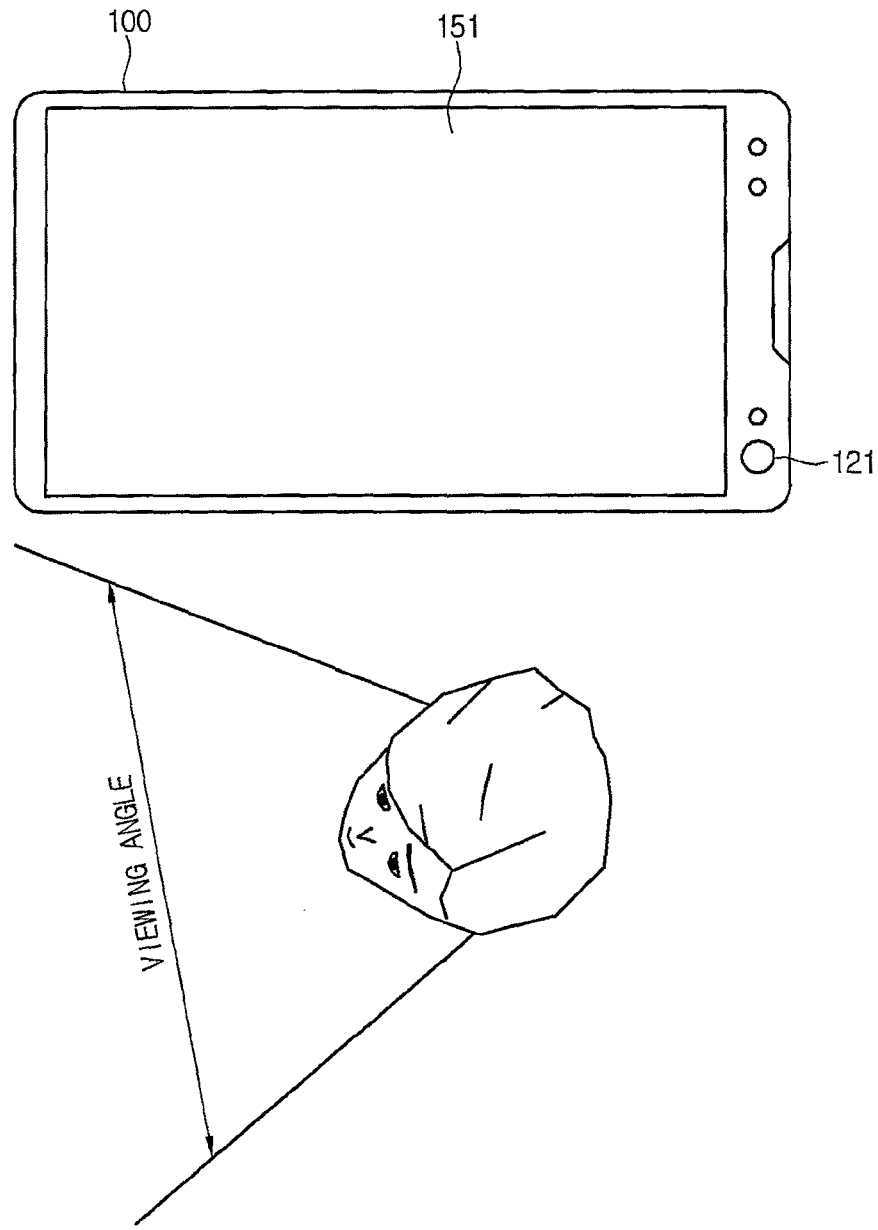
FIG. 4 is an overview illustrating a method of checking whether a user views a video according to an embodiment of the present invention.

For example, referring to FIG. 3, the control unit 180 can identify the position of a user's eye from a video frame for the obtained user's face. Then, the control unit 180 can determine which direction a user gazes based on the identified user's eye position. Accordingly, as shown in FIG. 2, when a user gazes at the display unit 151, the control unit 180 determines the user as viewing a video being played. Further, as shown in FIG. 4, when a user does not gaze at the display unit 151, the control unit 180 determines the user as not viewing a video being played.

In addition, the control unit 180 can also check whether a plurality of users are viewing videos, and determine whether different users are viewing the same video. For example, the control unit 180 can recognize a user 1 and a user 2 separately, so that it can check whether the user A views and the user B views a video A, separately.

Additionally, the control unit 180 can check whether a user views a video during a playback section by comparing a time (hereinafter referred to as a viewing time) at which a user gazes at the display unit 151 and a time (hereinafter referred to as an not viewing time) at which the user does not gaze at the display unit 151 for a predetermined continuous video playback time.

For example, if a user does not gaze at the display unit 151 for a predetermined time, the control unit 180 can determine it as not viewing a corresponding playback section. Herein the predetermined time may be set diversely according to a user's or designer's selection. In addition, the power supply unit 190 can receive external power or internal power under a control of the control unit 180 and then supply power needed for an operation of each component.

Further, various embodiments described herein may be implemented in a computer or device similar thereto readable medium by using software, hardware, or a combination thereof.

According to a hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units performing other functions. In some cases, such embodiments may be implemented by the control unit 180.

According to a software implementation, embodiments for procedures or functions may be implemented with a separate software module performing at least one function or operation. Software code may be implemented by a software application written in appropriate programming language. The software code may be stored in the memory 160 and may be executed by the control unit 180.

Figure 5:
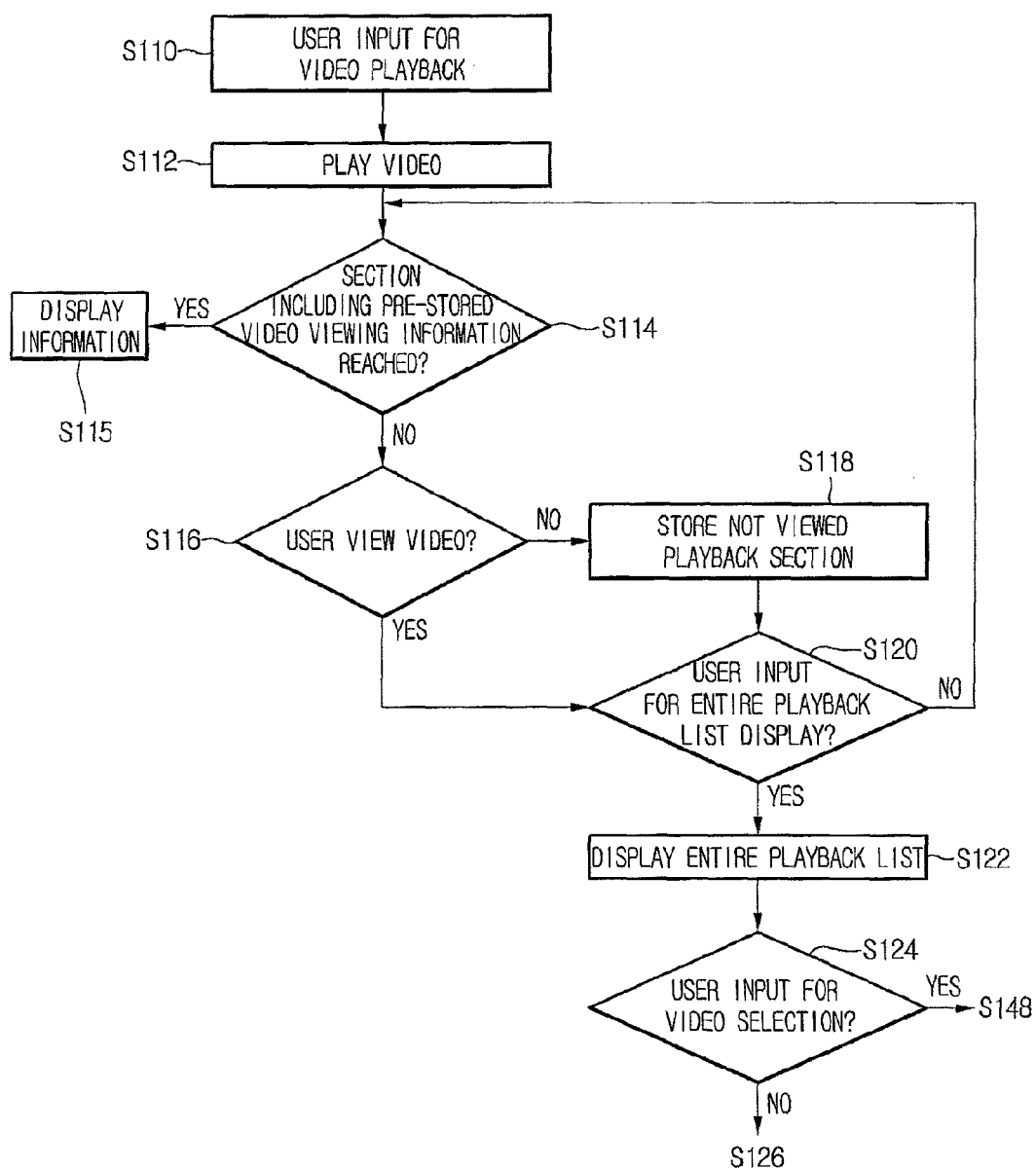

Next, FIGS. 5 to 10 are flowcharts illustrating an operating method of a terminal according to an embodiment of the present invention. Referring to FIG. 5, the control unit 180 receives a user input for video playback from a user (S110). The control unit 180 can receive a user's touch input for video playback through the touch sensor. Additionally, the control unit 180 can receive a user input for video playback through an external input device such as a keypad or a mouse.

Herein, the video may be a video stored in the memory 160 of the mobile terminal 100 or a video according to a broadcast signal received through the broadcast reception module 111. Additionally, the video may be received through the wireless internet module 113 or the short range communication module 114. The control unit 180 plays a video in response to a user input for video playback (S112). For example, the control unit 180 can play a video that a user selects in full screen in response to a user input. Therefore, the control unit 180 can display a played video through the display unit 151.

The control unit 180 checks whether there is pre-stored video viewing information with respect to a process section of a video being played (S114). In more detail, the control unit 180 can check whether there is video viewing information on a progress section of a video being played based on information (hereinafter referred to as video viewing information) on whether a video stored in the memory 160 is viewed.

Herein, the video viewing information may include viewing execution information on whether a user views a video being played and playback execution information on whether a specific playback section in an entire playback section of a video is played. Additionally, the video viewing information may include the number of viewings in a specific playback section in an entire playback section of a video.

If there is video viewing information on a playback section of a video being played (Yes in S114), the control unit 180 can display the video viewing information in a progressive bar form (S115). This will be described later. If there is no video viewing information on the playback section of the video being played (No in S114), the control unit 180 plays the video after checking whether a user views the video (S116).

In addition, the control unit 180 can determine which direction a user gazes based on a video frame of the user's face obtained through the camera 121. Then, the control unit 180 determines whether the user gazes at the display unit 151 where the video is played. Accordingly, when it is determined that the user gazes at the display unit 151, the control unit 180 determines that user views the video. Further, when it is determined that the user does not gaze at the display unit 151, the control unit 180 determines that user does not view the video. Through such a process, the control unit 180 can check whether the user views the video.

When a playback section at which the user does not view the video is checked, the control unit 180 obtains video viewing information of the checked playback section. When it is determined that the user does not view the video (No in S116), the control unit 180 can store video viewing information on the playback section at the determined time in the memory 160. Accordingly, the control unit 180 can store viewing information including information on a section at which the user does not view the video being played in the memory 160.

Moreover, the control unit 180 can check whether each of a plurality of users views the video by recognizing a user's face. Accordingly, when different users play the same video using the mobile terminal 100, the control unit 180 can store different video viewing information on each user's video playback in the memory 160.

When storing video viewing information on a section at which the user does not view the video (S118), the control unit 180 can display a save display 205 on a display screen, which will be described with reference to FIGS. 11 to 13. In particular, FIGS. 11 to 13 are overviews illustrating the save display 205 displayed on a display screen.

For example, referring to FIG. 11, when storing video viewing information on a section at which the user does not view the video, the control unit 180 can display an eye-shaped save display 205 on a display screen. In another example, referring to FIG. 12, when storing video viewing information on a section at which the user does not view the video, the control unit 180 can display a plus-shaped save display 205.

In still another example, referring to FIG. 13, when storing video viewing information on a section at which the user does not view the video, the control unit 180 can display a number displayed circle-shaped save display 205. The number displayed on the number displayed circle-shaped save display 205 may mean the order in which user's viewing information is stored with respect to the video being played. Thus, when storing video viewing information on a section at which the user does not view the video, the control unit 180 can display the save display 205 on a display screen so that the user can intuitively recognize that the video viewing information on a video is being saved.

Returning to FIG. 5, the control unit 180 receives a user input for displaying an entire playback list (Yes in S120). The control unit 180 can receive a user's touch input for displaying an entire playback list through the touch sensor. Additionally, the control unit 180 can receive a user input for displaying a playback list through an external input device such as a keypad or a mouse. Herein, displaying the entire playback list corresponds to displaying a list for at least one video and in one example, displaying a list for at least one video in full screen.

Moreover, if the control unit 180 does not receive a user input for displaying an entire playback list (No in S120), the control unit 180 returns to step S114. Further, the control unit 180 displays the entire playback list in response to the user input for displaying an entire playback list (S122). That is, when receiving a user input for displaying an entire playback list (Yes in S120), the control unit 180 displays the entire playback list on the display unit 151 (S122). In more detail, the control unit 180 can display information on at least one video in a progressive bar form.

Figure 14:
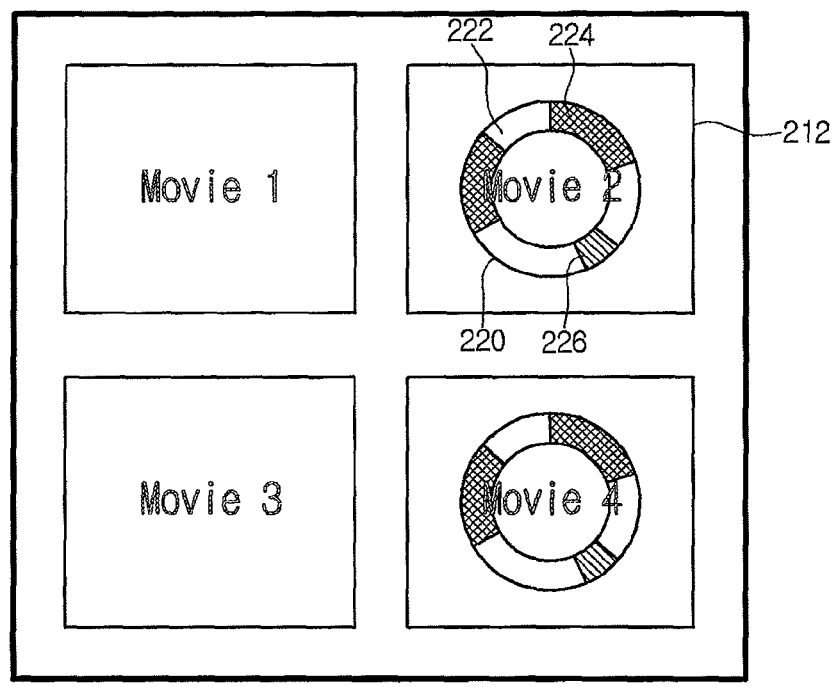
FIGS. 14 and 15 are overviews illustrating an entire playback list according to an embodiment of the present invention.

The entire playback list display of the control unit 180 will now be described with reference to FIG. 14. In particular, FIG. 14 is an overview illustrating a screen where an entire playback list is displayed. Referring to FIG. 14, the control unit 180 can display an entire playback list on a plurality of videos. In more detail, the control unit 180 can display each of a plurality of movies 1 to 4. Then, the control unit 180 can display information on each video in an oval-type progressive bar.

In more detail, the control unit 180 can display a playback list 212 on a video Movie 2 as an oval-type progressive bar 220. Then, the control unit 180 can divide a video playback section in the oval-type progressive bar 220 into a section 222 (hereinafter referred to as "a not played section") that a user does not play, a section 224 (hereinafter referred to as "a viewed section") that a user plays and views, and a section 226 (hereinafter referred to as "a not viewed section") that a user plays but does not view and then display them.

For example, the control unit 180 can display the not played section 222, the viewed section 224, and the not viewed section 226 of the oval-type progressive bar 220 with different colors. According to another embodiment of the present invention, the control unit 180 can display the not played section 222, the viewed section 224, and the not viewed section 226 of the oval-type progressive bar 220 with different contrasts. According to still another embodiment of the present invention, the control unit 180 can display the not played section 222, the viewed section 224, and the not viewed section 226 of the oval-type progressive bar 220 with different three-dimensional effects.

Figure 15:
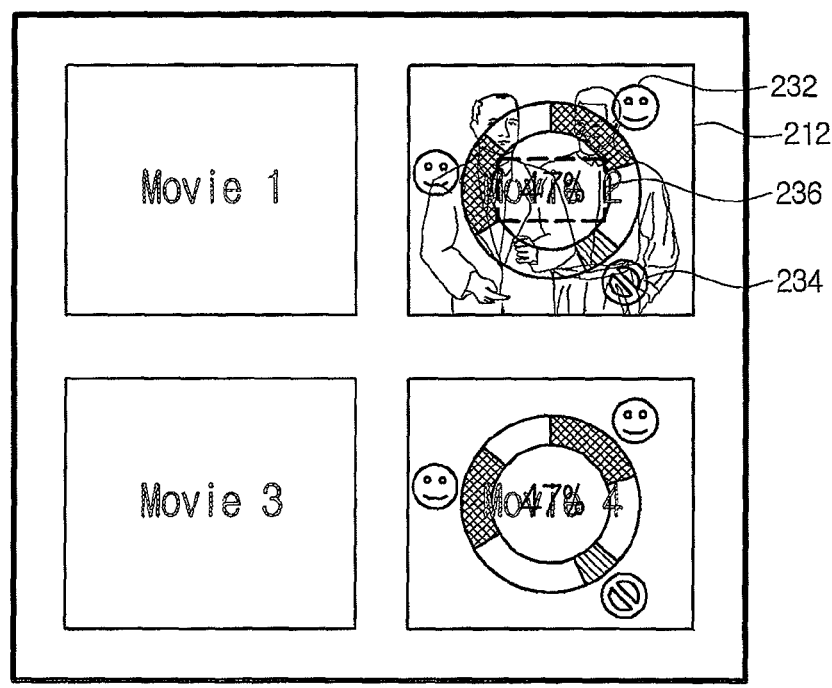

Additionally, the control unit 180 can display an indicator on the viewed section 224 and the not viewed section 226. For example, as shown in FIG. 15, the control unit 180 can display a smile face indicator 232 on the viewed section 224 played and viewed by a user. Additionally, the control unit 180 can display a stop sign indicator 234 on the not viewed section 226 played but not viewed by a user.

Moreover, the control unit 180 can display a percentage 236 on the viewed section 224 viewed by a user in the entire section of a video. For example, as shown in FIG. 15, the control unit 180 can display a percentage 236 on a section viewed by a user in the entire section of a video. In addition, the control unit 180 can display a percentage on a section not viewed by a user in the entire section of a video.

Furthermore, the control unit 180 can display a thumbnail image on a video in the playback list 212. For example, as shown in FIG. 15, the control unit 180 can display a thumbnail image on a video in the playback list 212 as a background screen. Furthermore, the control unit 180 can display playback information on a video in the playback list 212. For example, when a user's finger approaches within a predetermined distance of the display unit 151, the control unit 180 can display playback information on a video.

According to another embodiment of the present invention, when a touch pen approaches within a predetermined distance of the display unit 151, the control unit 180 can display playback information on a video. This will now be described in detail with reference to FIGS. 16 and 17. In particular, FIGS. 16 and 17 are overviews illustrating a playback information display according to an embodiment of the present invention.

Figure 16:
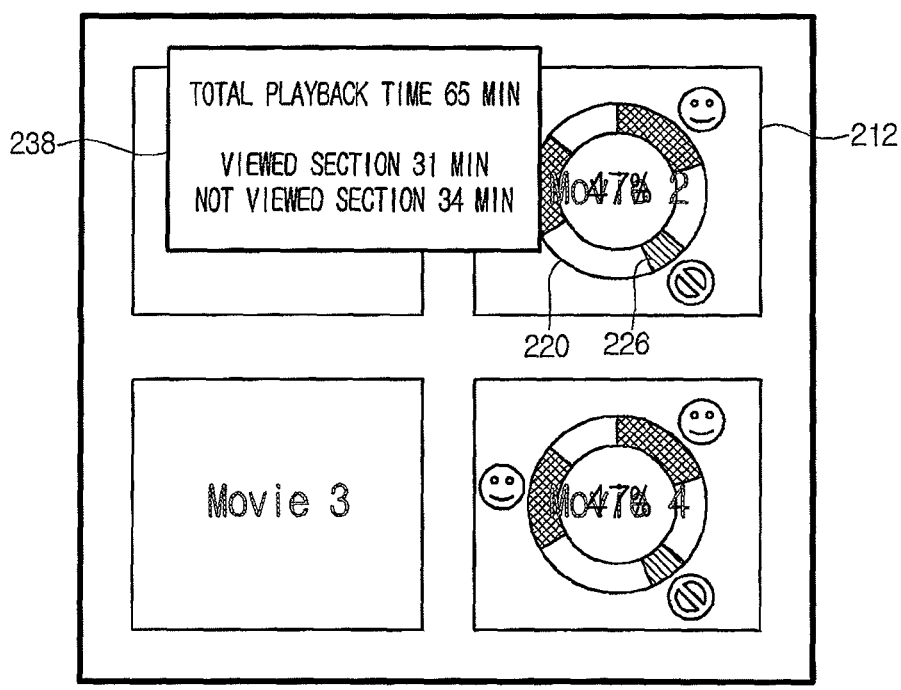
FIGS. 16 and 17 are overviews illustrating a playback information display of a video according to an embodiment of the present invention.
Figure 17:
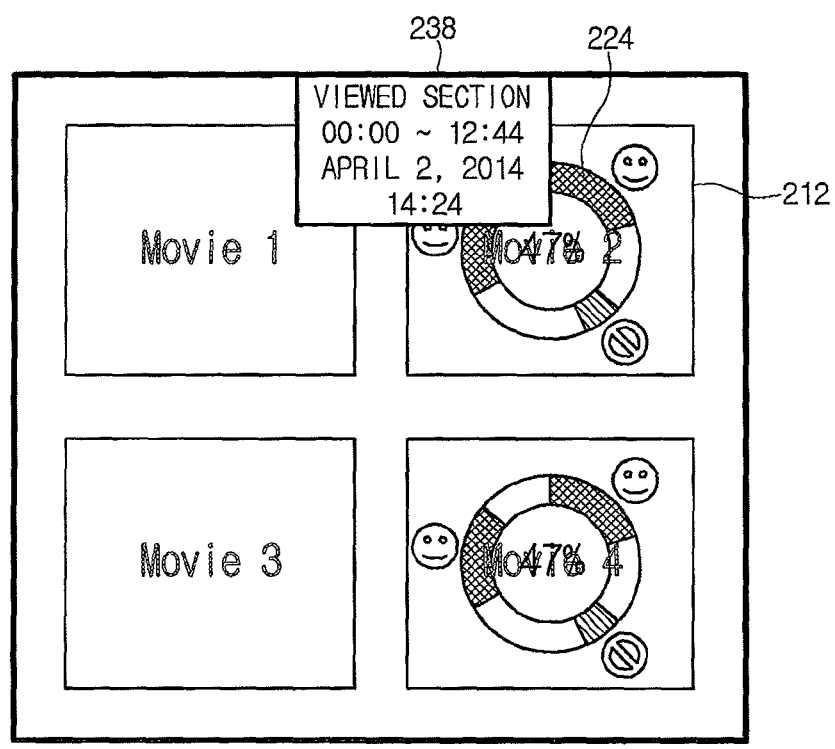

As shown in FIG. 16, the control unit 180 can display on a pop-up window 238 including a total playback time, a playback time of a viewed section, and a playback time of a not viewed section, that is, playback information on a video in the playback list 212, based on a user input. Additionally, as shown in FIG. 17, the control unit 180 can display on a pop-up window 238 including section information on the viewed section 224 and a user's viewing time, based on a user input.

Figure 18:
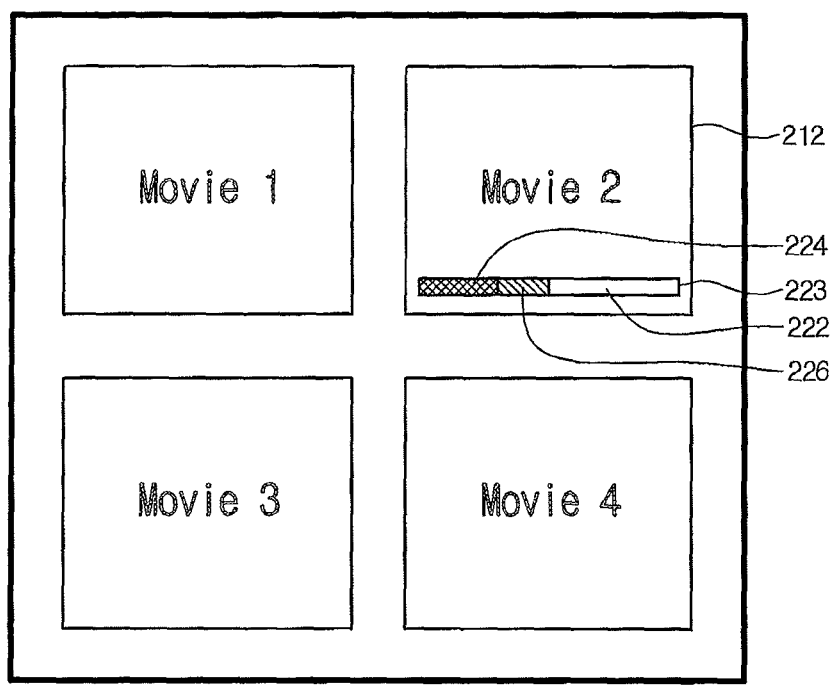
FIG. 18 is an overview illustrating an entire playback list screen according to another embodiment of the present invention.

Moreover, the control unit 180 can display a bar-type progressive bar instead of an oval-type progressive bar. For example, as shown in FIG. 18, the control unit 180 can display a playback list 212 on a video Movie 2 as a bar-type progressive bar 223. Then, the control unit 180 can display a section 222 not played by a user, a section played and viewed by a user 224, and a section 226 played but not viewed by a user in the bar-type progressive bar 223 with three-dimensional effects.

The above-mentioned form of a progressive bar is just an example, and thus may be set diversely according to a user's or designer's selection. Hereinafter, the oval-type progressive bar 220 is mainly described for an operation of the terminal but the bar-type progressive bar is also applicable.

Returning again to FIG. 5, the control unit 180 receives a user input for selecting one video included in a displayed entire playback list (S124). The control unit 180 can receive a user input for selecting one of at least one video included in an entire playback list displayed on the display unit 151 through the touch sensor. Additionally, the control unit 180 can receive a user input for selecting a video through an external input device such as a keypad or a mouse.

Figure 6:
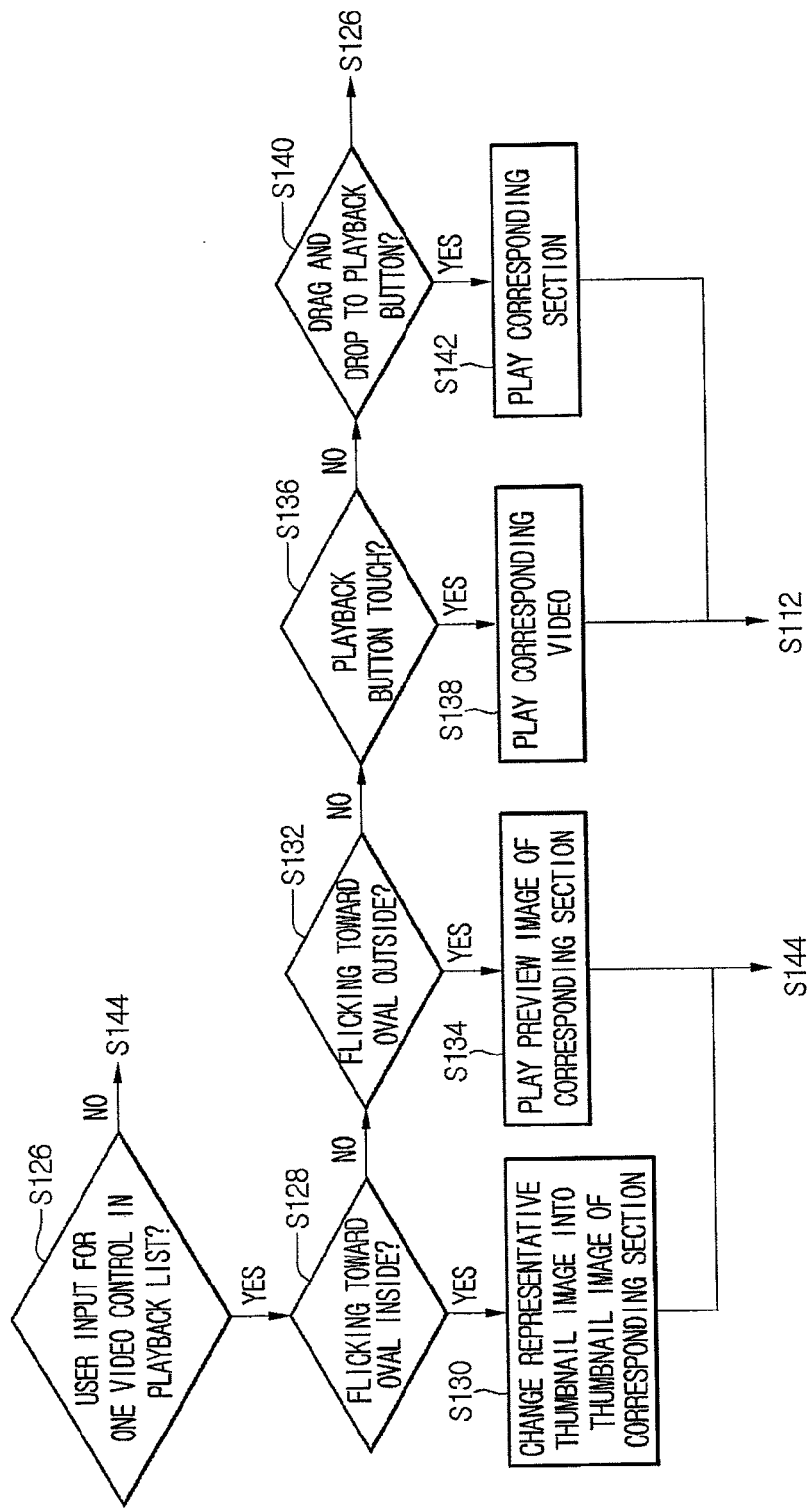

FIG. 6 is a flowchart illustrating when a terminal does not receive a user input for selecting one video according to an embodiment of the present invention (No in S124 in FIG. 5). As shown, the control unit 180 receives a user input for controlling at least one video in a displayed entire playback list (S126).

The control unit 180 can receive a user input for controlling one of at least one video included in an entire playback list displayed on the display unit 151 through the touch sensor. Additionally, the control unit 180 can receive a user input for controlling a video through an external input device such as a keypad or a mouse.

When receiving a user input for selecting a partial section of the displayed oval-type progressive bar 220 and moving it to the oval inside of the oval-type progressive bar 220 (Yes in S128), the control unit 180 changes a thumbnail image corresponding to the selected partial section into the background screen (S130).

In addition, when receiving a user input for touching a partial section of the oval-type progressive bar 220 for one video included in an entire playback list displayed on the display unit 151 through the touch sensor and flicking it toward the oval inside of the oval-type progressive bar 220, the control unit 180 can change a thumbnail image corresponding to the touched section into the background screen.

The partial section of the oval-type progressive bar 220 may correspond to one of a section 222 not played by a user, a section 224 played and viewed by a user, and a section 226 played but not viewed by a user.

Figure 19:
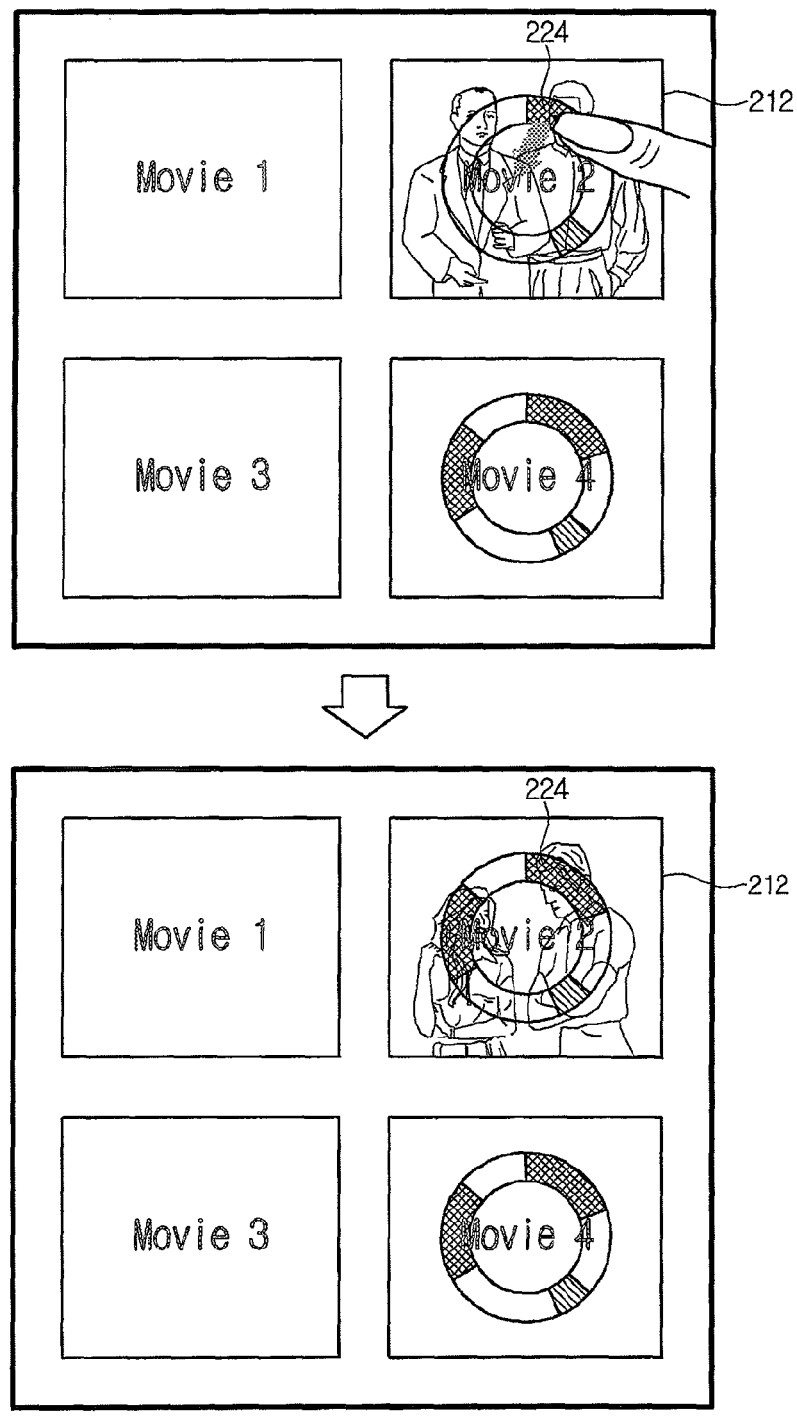
FIG. 19 is an overview illustrating a thumbnail image change depending on a user input according to an embodiment of the present invention.

This will now be described with reference to FIG. 19. In particular, FIG. 19 is an overview illustrating a thumbnail image change of the control unit 180 according to a user input. Referring to FIG. 19, when receiving a user input for touching the viewed section 224 of the oval-type progressive bar 220 from the displayed playback list 212 on the video Movie 2 and flicking it toward the oval inside, the control unit 180 can change a background screen displayed on the playback list 212 into a representative thumbnail image of the viewed section 224.

According to another embodiment of the present invention, when receiving a user input for selecting a partial section of the displayed bar-type progressive bar 223 and moving it toward the lower direction of the bar-type progressive bar 223, the control unit 180 changes a thumbnail image corresponding to the selected partial section into the background screen.

When receiving a user input for touching a partial section of the bar-type progressive bar 223 for one video included in an entire playback list displayed on the display unit 151 through the touch sensor and flicking it toward the lower direction of the bar-type progressive bar 223, the control unit 180 can change a thumbnail image corresponding to the touched section into the background screen.

The partial section of the bar-type progressive bar 223 may correspond to one of a section 222 not played by a user, a section 224 played and viewed by a user, and a section 226 played but not viewed by a user. This will be described with reference to FIG. 20. In particular, FIG. 20 is an overview illustrating a thumbnail image change of the control unit 180 according to a user input.

Figure 20:
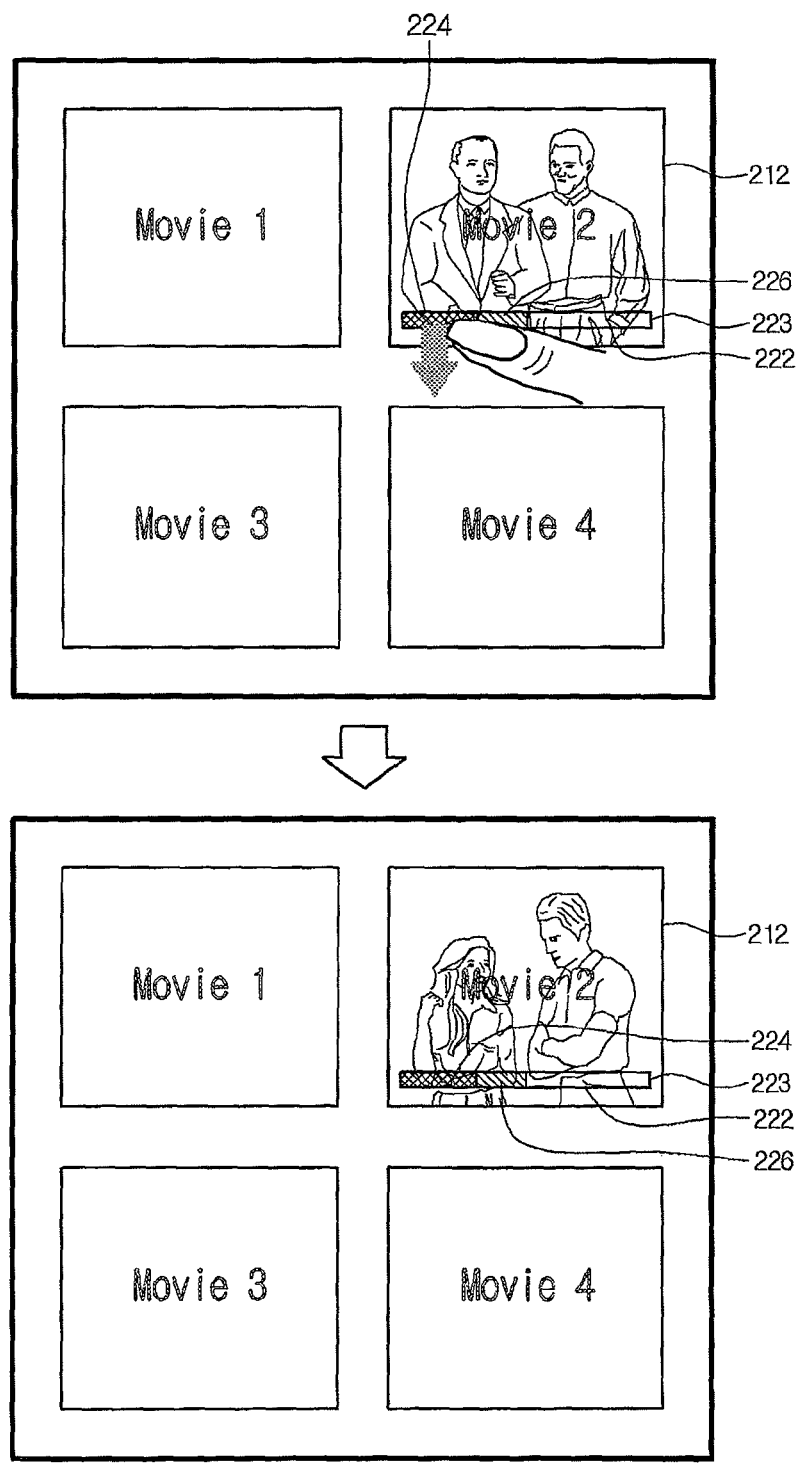
FIG. 20 is an overview illustrating a thumbnail image change depending on a user input according to another embodiment of the present invention.

Referring to FIG. 20, when receiving a user input for touching the viewed section 224 of the bar-type progressive bar 223 from the displayed playback list 212 on the video Movie 2 and flicking it toward the lower direction, the control unit 180 can change a background screen displayed on the playback list 212 into a representative thumbnail image of the viewed section 224.

Returning to FIG. 6, when receiving a user input for selecting a partial section of the displayed oval-type progressive bar 220 and moving it to the oval outside of the oval-type progressive bar 220 (Yes in S132), the control unit 180 plays a preview image of the selected partial section (S134).

Also, when receiving a user input for touching a partial section of the oval-type progressive bar 220 for one video included in an entire playback list displayed on the display unit 151 through the touch sensor and flicking it toward the oval outside of the oval-type progressive bar 220, the control unit 180 can play a preview image of a section corresponding to the touched section.

Additionally, the control unit 180 can play a plurality of preview images on a plurality of areas according to a user input. The partial section of the oval-type progressive bar 220 may correspond to one of a section 222 not played by a user, a section 224 played and viewed by a user, and a section 226 played but not viewed by a user. This will be described with reference to FIG. 21. In particular, FIG. 21 is an overview illustrating a preview image playback of the control unit 180 according to a user input.

Figure 21:
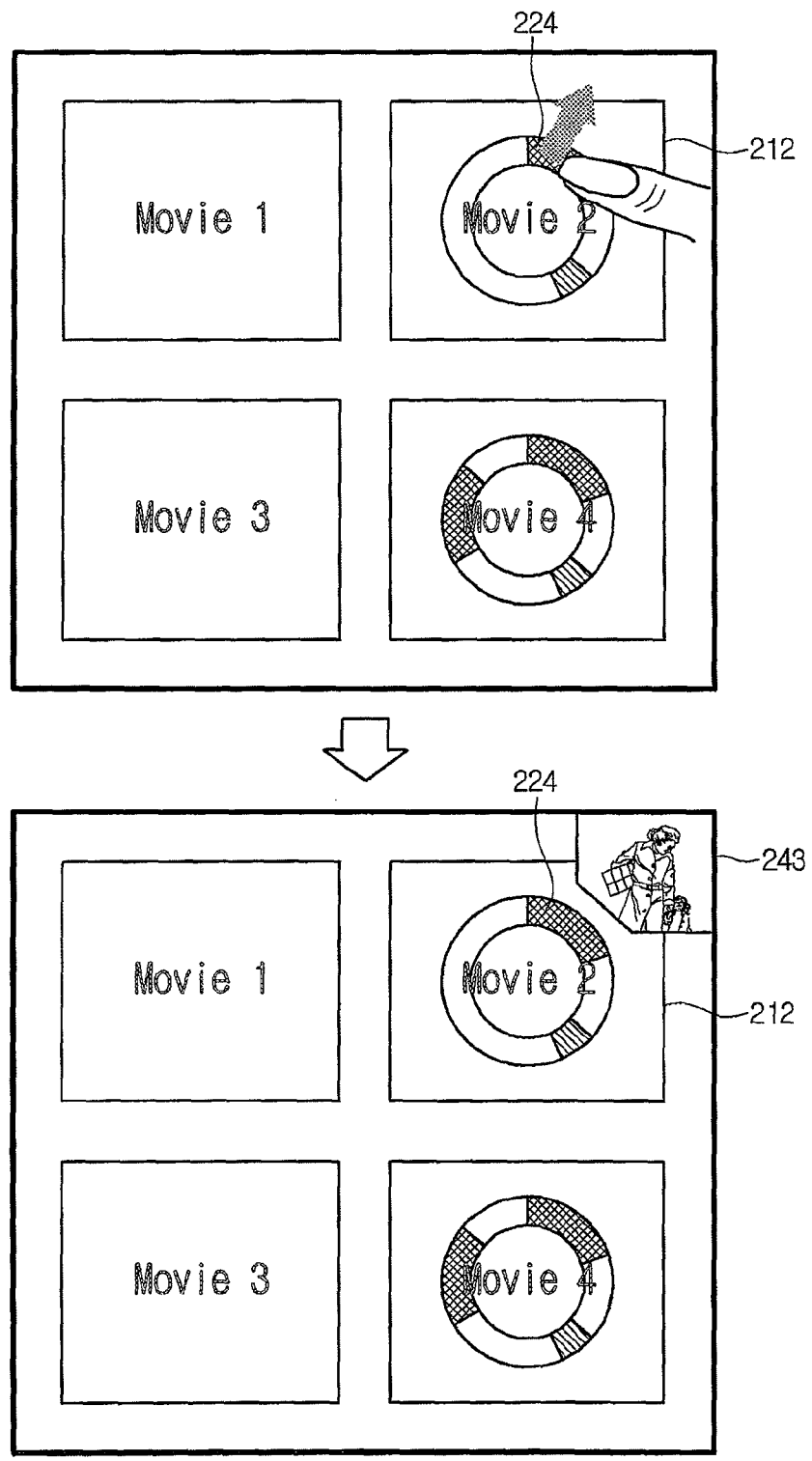
FIG. 21 is an overview illustrating a preview image playback depending on a user input according to an embodiment of the present invention.

Referring to FIG. 21, when receiving a user input for touching the viewed section 224 of the oval-type progressive bar 220 from the displayed playback list 212 on the video Movie 2 and flicking it toward the oval outside, the control unit 180 can display a preview image 243 of the viewed section 224 in a partial area of the playback list 212.

While a user touches the viewed section 224, the control unit 180 can change the playback speed of the preview image 243 displayed on a partial area of the playback list 212. For example, while a user touches the viewed section 224, the control unit 180 can increase the playback speed of the preview image 243 according to a touch time. According to another embodiment of the present invention, while a user touches the viewed section 224, the control unit 180 can reduce the playback speed of the preview image 243 according to a touch time.

According to still another embodiment of the present invention, when receiving a user input for selecting a partial section of the displayed bar-type progressive bar 223 and moving it toward the upper direction of the bar-type progressive bar 223, the control unit 180 can display a preview image of the selected partial section.

Also, when receiving a user input for touching a partial section of the bar-type progressive bar 223 for one video included in the playback list 212 displayed on the display unit 151 through the touch sensor and flicking it toward the upper direction of the bar-type progressive bar 223, the control unit 180 can play a preview image of a section corresponding to the touched section. This will now be described with reference to FIG. 22. In particular, FIG. 22 is an overview illustrating a preview image playback of the control unit 180 according to a user input.

Figure 22:
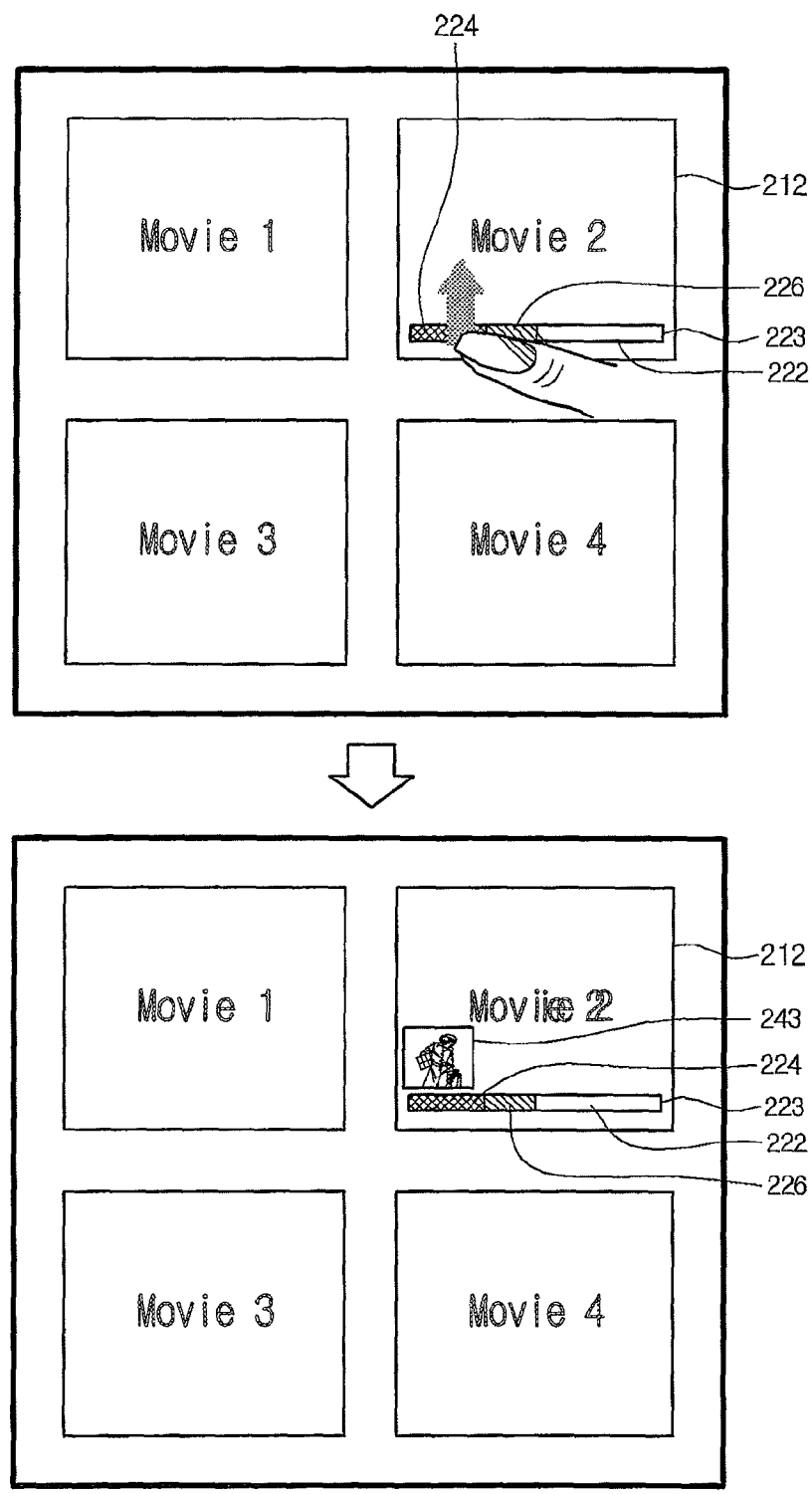
FIG. 22 is an overview illustrating a preview image playback depending on a user input according to another embodiment of the present invention.

Referring to FIG. 22, when receiving a user input for touching the viewed section 224 of the bar-type progressive bar 223 from the displayed playback list 212 on the video Movie 2 and flicking it toward the upper direction, the control unit 180 can display a preview image 243 of the viewed section 224 in a partial area of the playback list 212.

Figure 23:
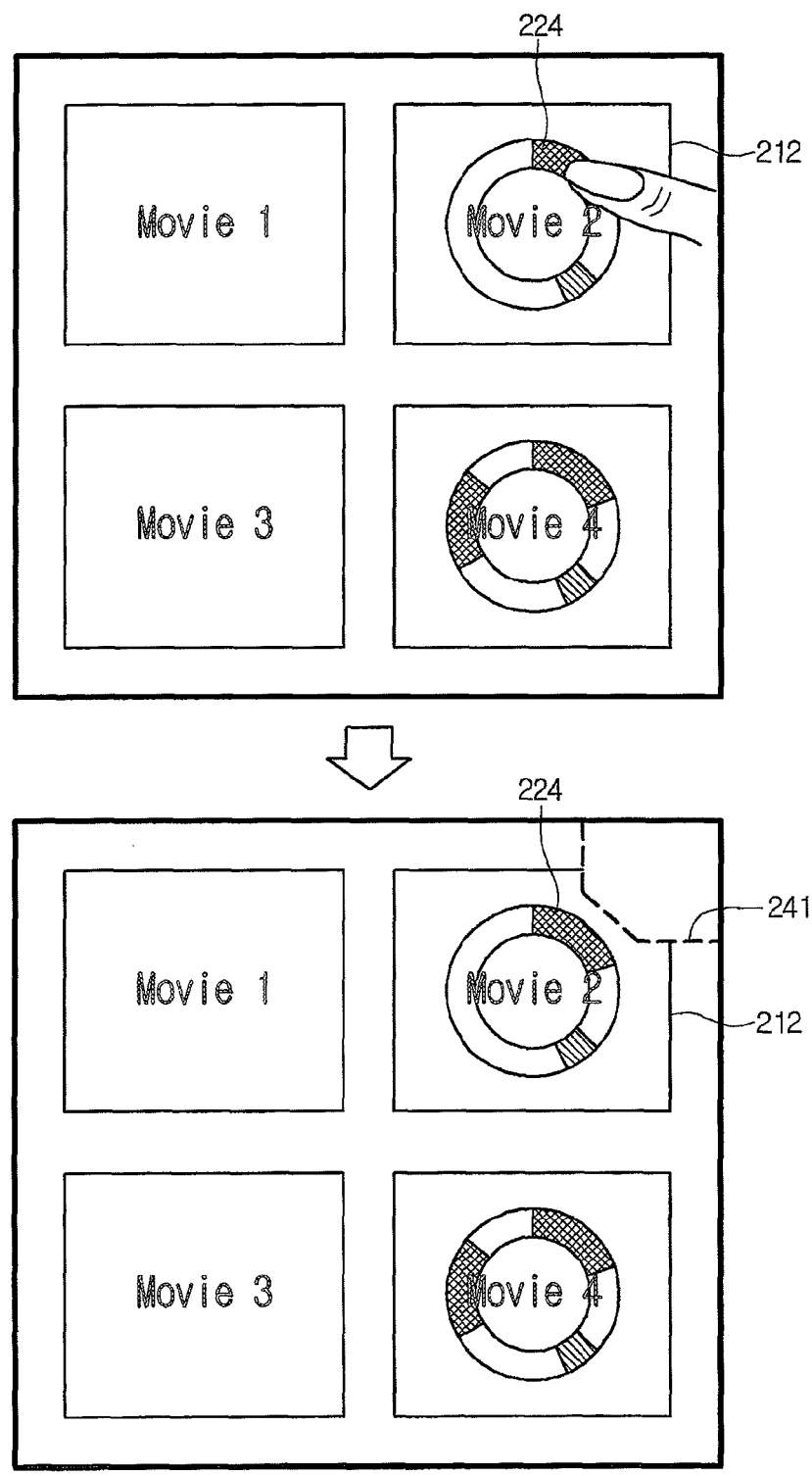
FIG. 23 is an overview illustrating a guide area according to an embodiment of the present invention.

Moreover, as shown in FIG. 23, the control unit 180 can display a guide area 241 for a function for displaying a preview image 243 (see FIG. 24) in order for user's intuitive recognition. In particular, FIG. 23 is an overview illustrating the guide area 241 according to an embodiment of the present invention. The control unit 180 can display the guide area 241 displaying a preview image area where a preview image 243 is displayed in correspondence to a user's touch of the oval-type progressive bar 220.

For example, referring to FIG. 23, the control unit 180 can display the guide area 241 in correspondence to a user's operation for touching the viewed section 224 of the progressive bar 220. Then, when a user touches the viewed section 224 and the control unit 180 receives a user input for flicking it to the guide area 241, the control unit 180 can display the preview image 243 of the viewed section 224 in the guide area 241.

Moreover, the control unit 180 can change the size of the preview image 243 being played in correspondence to the received user's input. In more detail, the control unit 180 can change the size of the preview image 243 being played in correspondence to a user's pinch to zoom or pinch to out input for the preview image 243. This will be described with reference to FIGS. 24 to 27. In particular, FIGS. 24 to 27 are overviews of converting the size of a preview image in correspondence to a user input.

Figure 24:
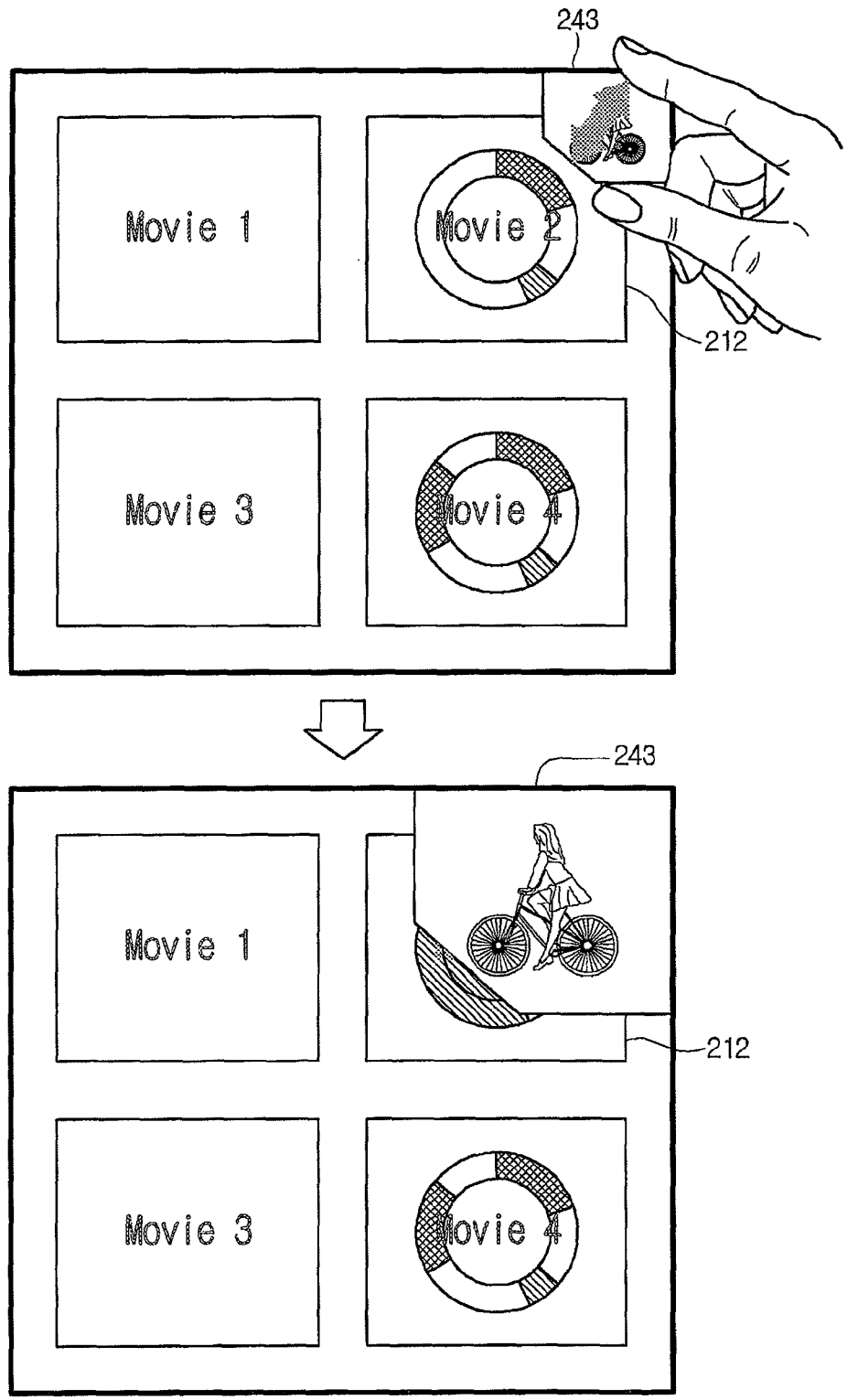
FIGS. 24 to 27 are overviews of converting the size of a preview image in correspondence to a user input according to an embodiment of the present invention.

For example, referring to FIG. 24, when receiving a pinch-to-out touch that simultaneously spreads an area where the preview image 243 is displayed with two fingers from a user, the control unit 180 can change the size of the preview image 243 larger in correspondence to the pinch-to-out touch.

Figure 25:
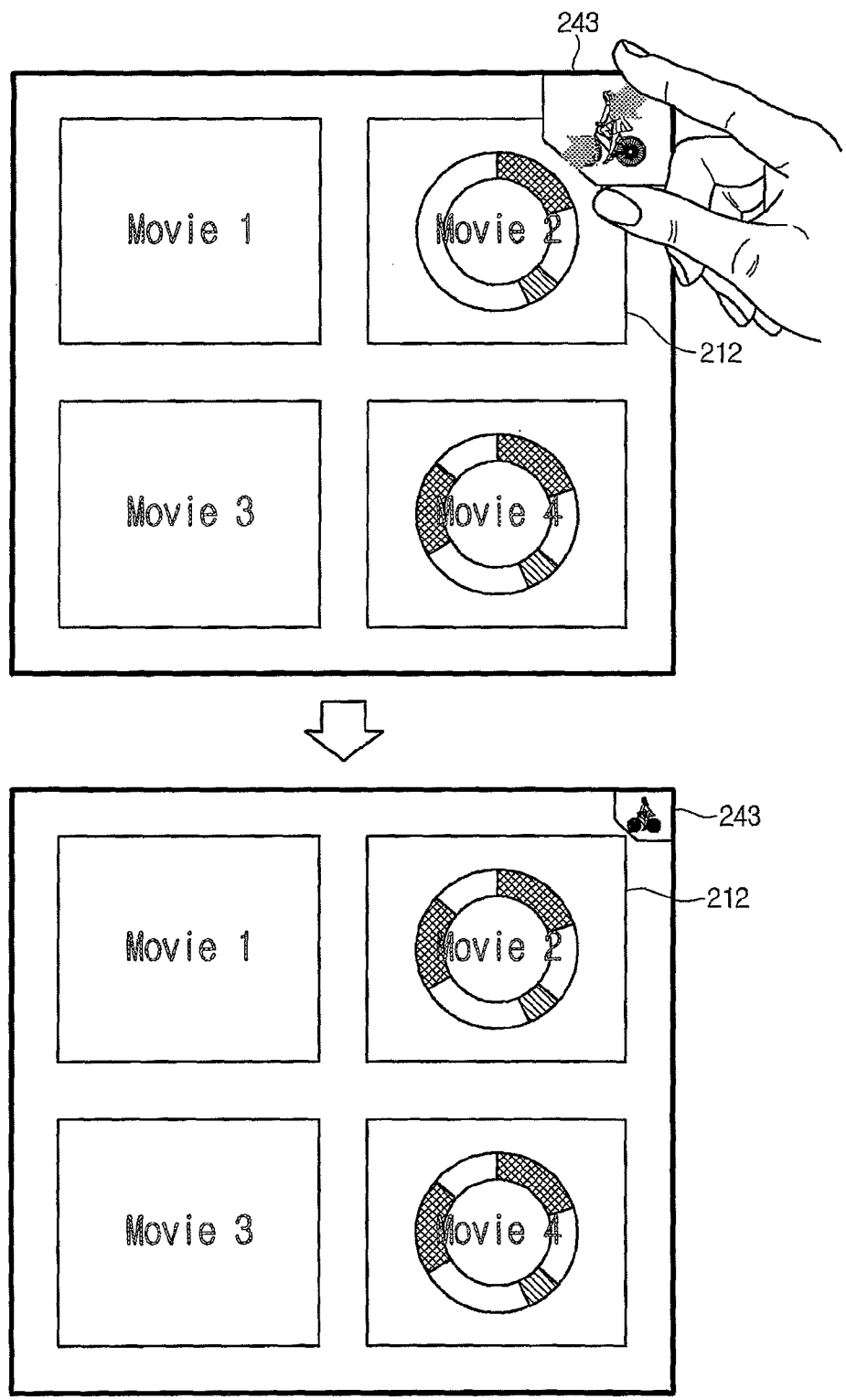
Figure 26:
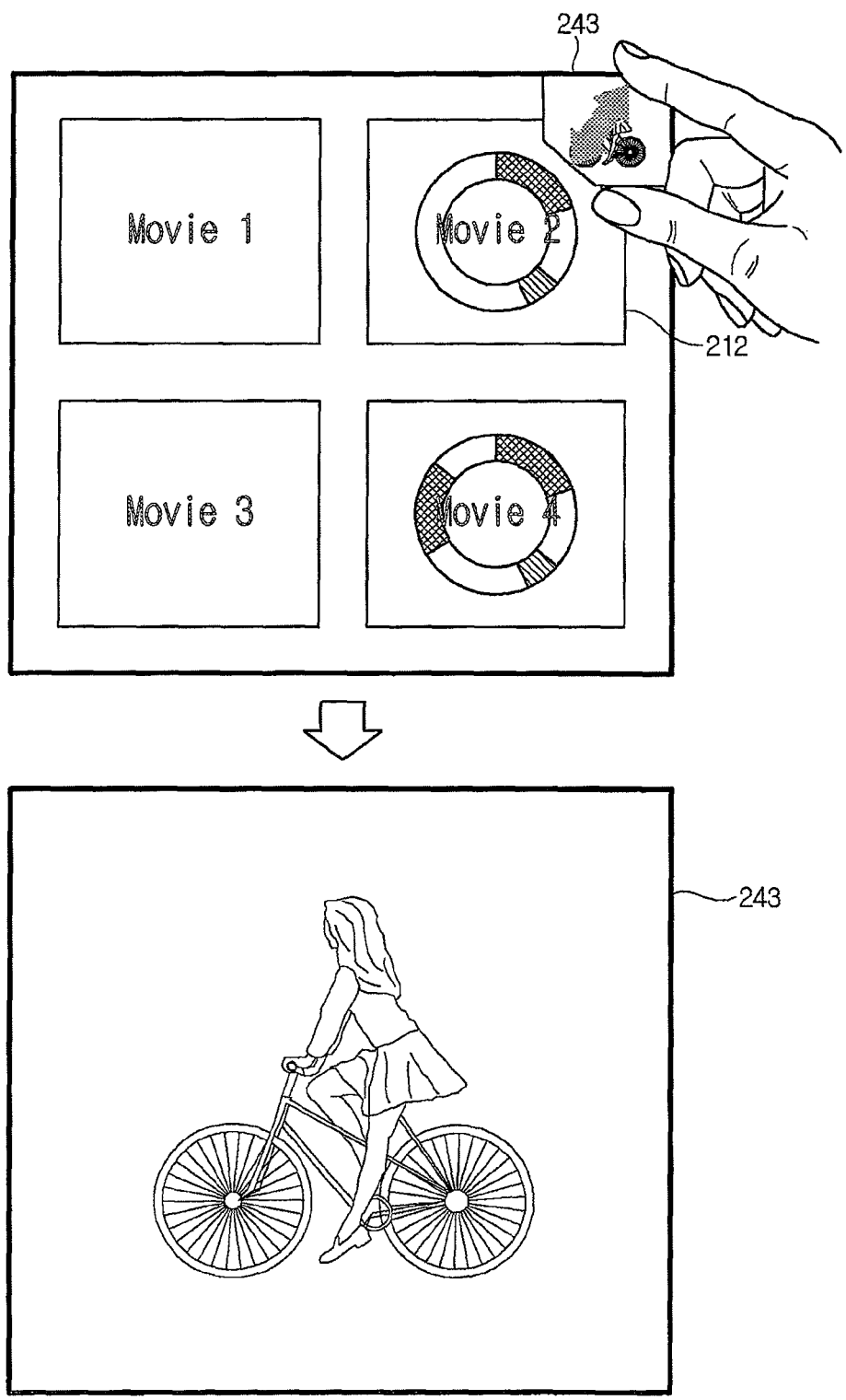
Figure 27:
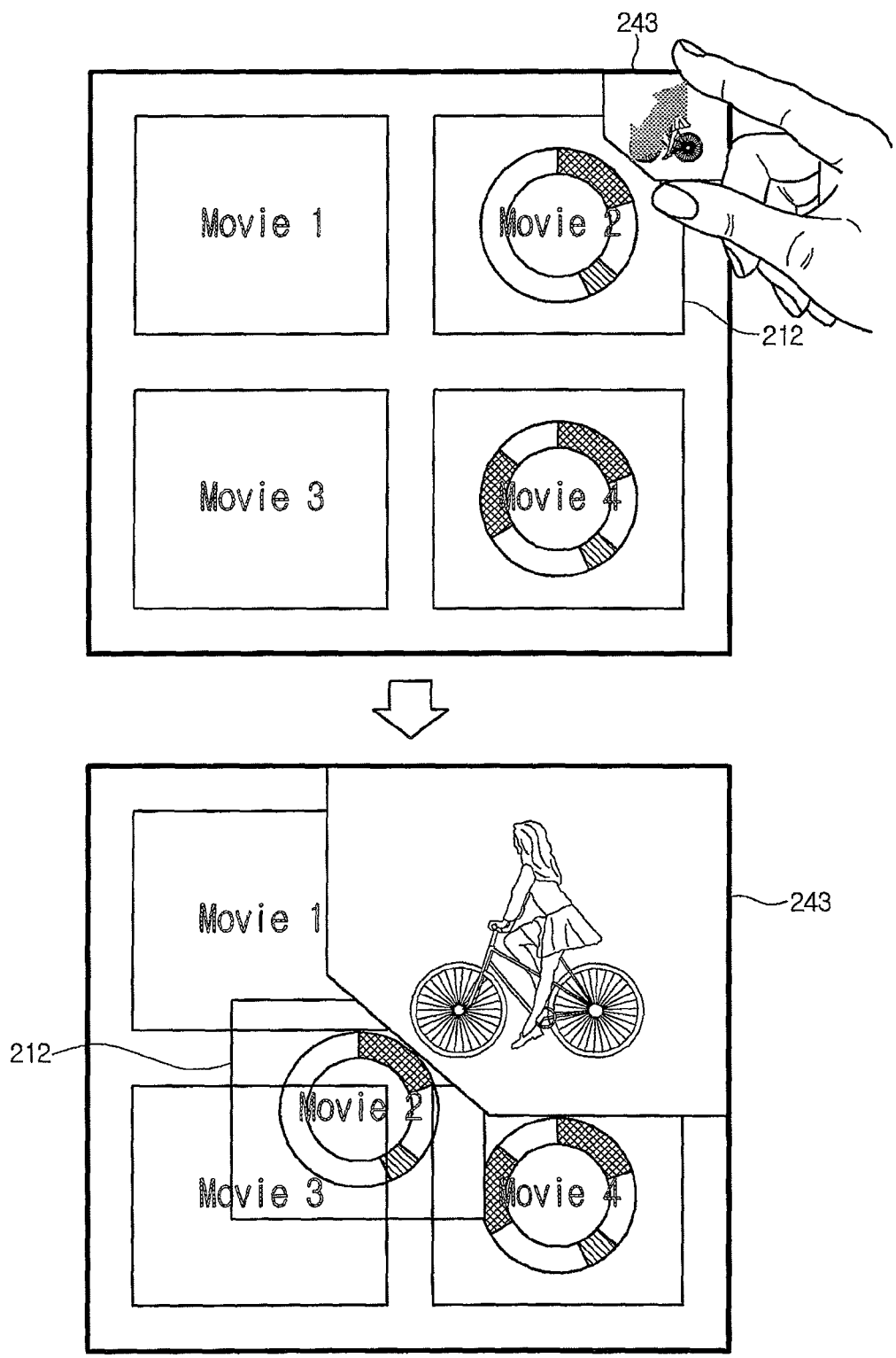

According to another embodiment of the present invention, referring to FIG. 25, when receiving a pinch-to-in touch that simultaneously narrows an area where the preview image 243 is displayed with two fingers from a user, the control unit 180 can change the size of the preview image 243 smaller in correspondence to the pinch-to-in touch.

Additionally, when a user input for the preview image 243 is greater than a predetermined value, the control unit 180 can display the preview image 243 in full screen. For example, referring to FIG. 26, the control unit 180 can receive a pinch-to-out touch that simultaneously spreads an area where the preview image 243 is displayed with two fingers from a user and when the received pinch-to-out touch input is greater than a predetermined value, may display the preview image 243 in full screen.

Additionally, the control unit 180 can move the position of the playback list 212 according to a user input for the preview image 243. For example, referring to FIG. 27, the control unit 180 can receive a pinch-to-out touch that simultaneously spreads an area where the preview image 243 is displayed with two fingers from a user and when the received pinch-to-out touch input is greater than a predetermined value, can change the size of the preview image 243 larger and move it so that the playback list 212 does not overlap the preview image 243.

In addition, returning to FIG. 6, when receiving a user input for a playback button 251 displayed in the playback list 212 (Yes in S136), the control unit 180 plays a selected video (S138). When receiving a user input for touching the playback button 251 for one video included in the playback list 212 displayed on the display unit 151 through the touch sensor, the control unit 180 can play the touched video. Additionally, the control unit 180 can play a video in full screen or part of full screen according to a user input method and an input degree.

Figure 28:
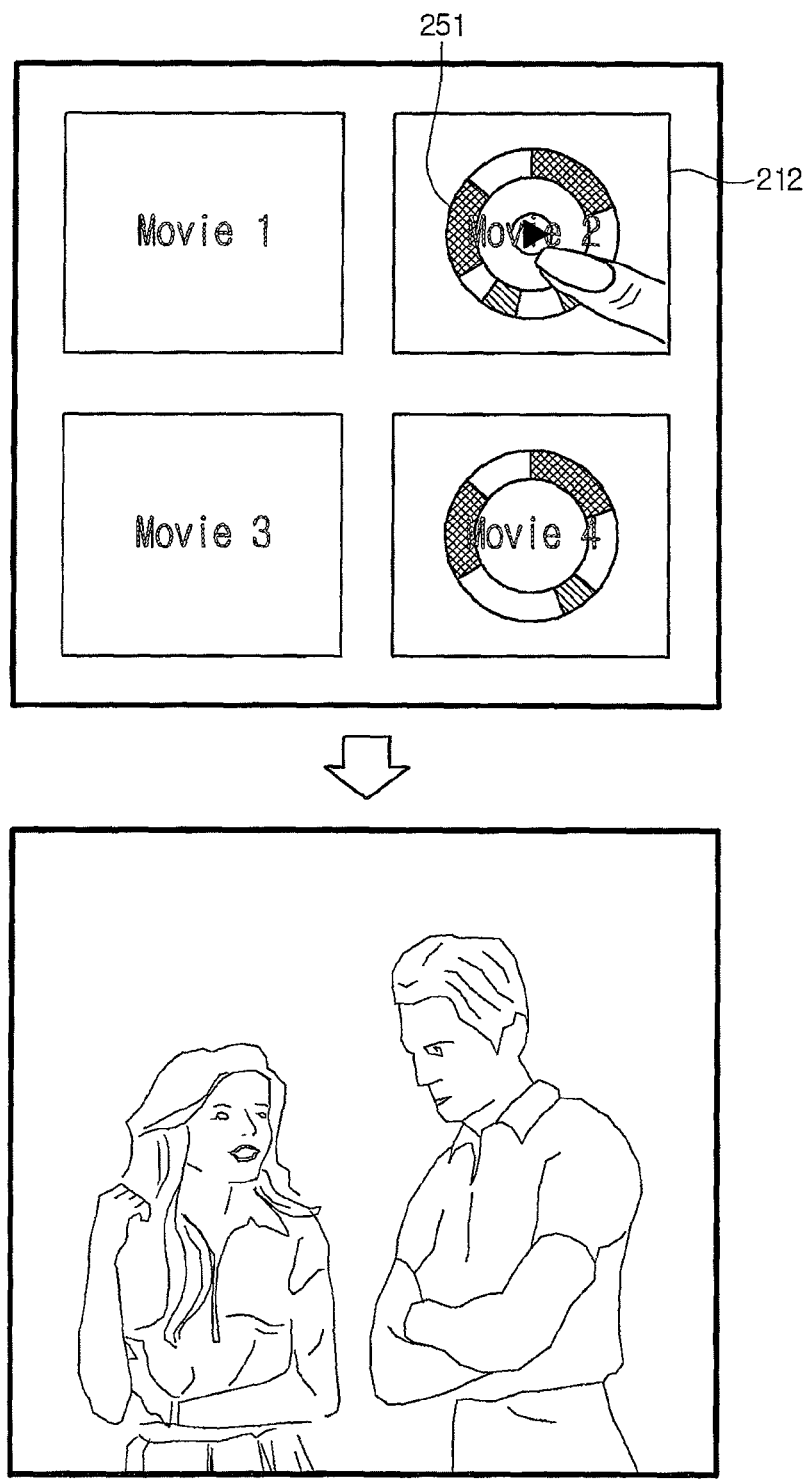
FIGS. 28 and 29 are overviews illustrating a video playback depending on a user input according to an embodiment of the present invention.
Figure 29:
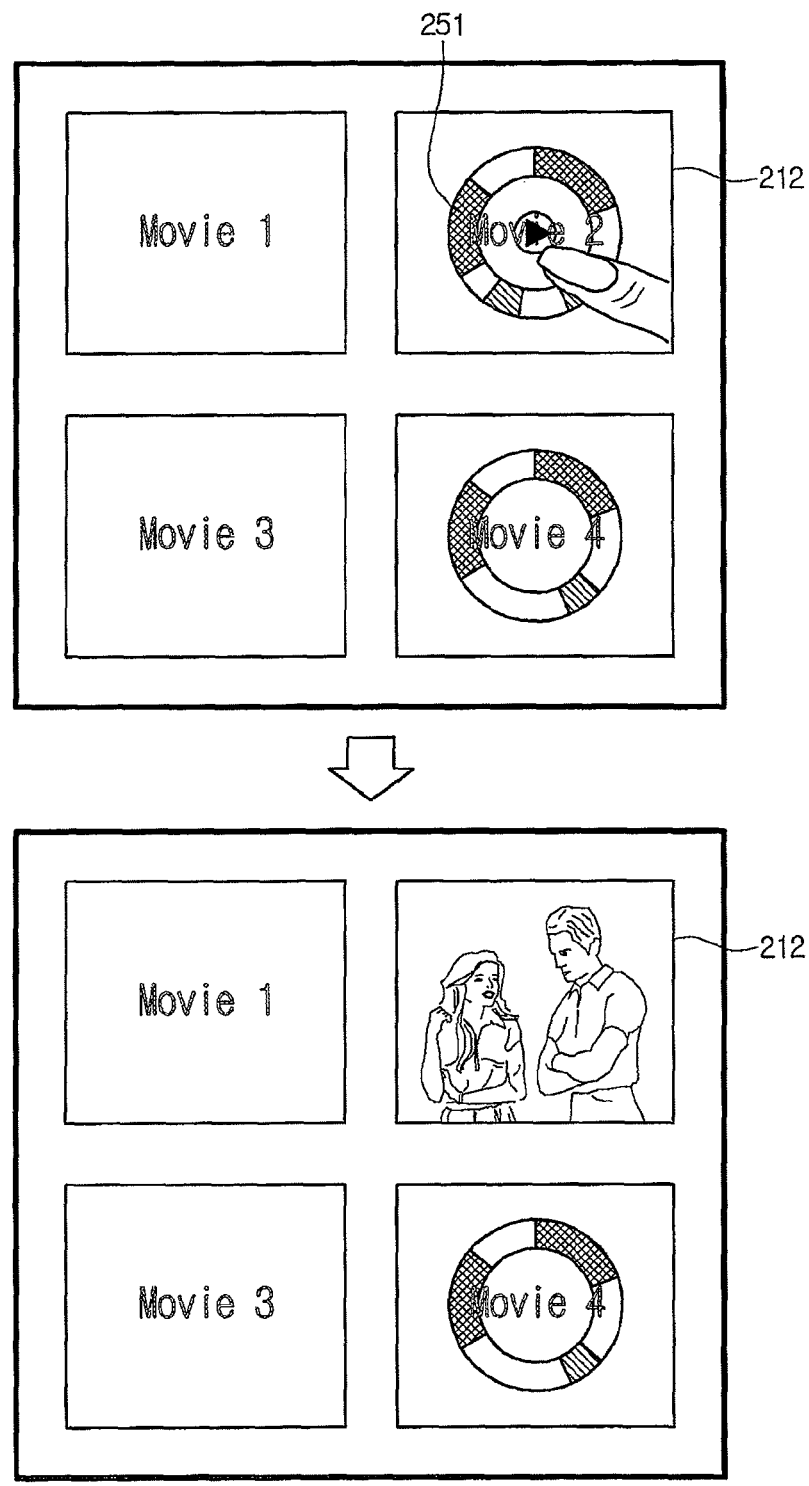

This will be described with reference to FIGS. 28 and 29. In particular, FIGS. 28 and 29 are overviews illustrating a video playback according to a user input. Referring to FIG. 28, when receiving an input for long-touching the playback button 251 from a user, the control unit 180 can play a video of the playback list 212 corresponding to the playback button 251 in full screen.

Referring to FIG. 29, when receiving an input for short-touching the playback button 251 from a user, the control unit 180 can play a video of the playback list 212 corresponding to the playback button 251 in an area of the playback list 212, that is, part of full screen. Herein, a short-touch may be a touch input of less than a first reference time and long-touch may be a touch input of more than a second reference time. Further, the first reference time and the second reference time may be identical to or different from each other.

Figure 30:
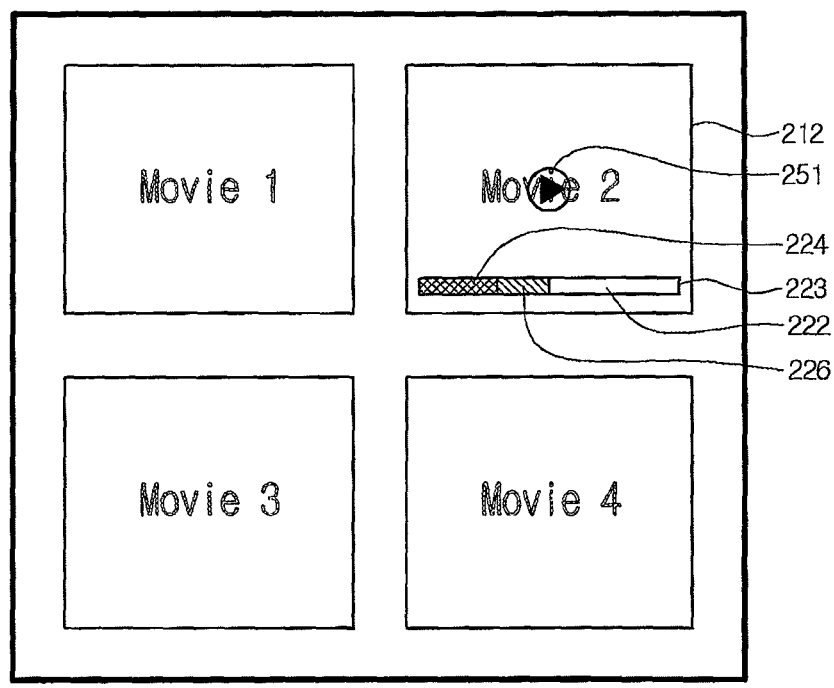
FIG. 30 is an overview illustrating a video playback depending on a user input according to another embodiment of the present invention.

According to another embodiment of the present invention, when receiving a user input for a playback button 251 from the playback list 212 where the bar-type progressive bar 223 is displayed, the control unit 180 can play a selected video. For example, as shown in FIG. 30, when receiving a user input for the playback button 251 from the playback list 212 where the bar-type progressive bar 223 is displayed, the control unit 180 can play a video in correspondence to the received user input.

According to another embodiment of the present invention, when receiving a user input for double-tap-touching the playback list 212, the control unit 180 can play a selected video. This will be described again with reference to FIG. 6. In particular, when receiving a user input for dragging a partial section of the displayed oval-type progressive bar 220 and dropping it on the playback button 251 (Yes in S140), the control unit 180 plays an image of a section corresponding to the dragged and dropped partial section (S142).

Also, when receiving a user input for dragging a partial section of the oval-type progressive bar 220 for one video included in the playback list 212 displayed on the display unit 151 through the touch sensor and dropping it on the playback button 251, the control unit 180 can play an image of the dragged and dropped section. Then, the control unit 180 can play an image of the dragged and dropped section in full screen or part of full screen.

The partial section of the oval-type progressive bar 220 may correspond to one of a section 222 not played by a user, a section 224 played and viewed by a user, and a section 226 played but not viewed by a user.

Figure 31:
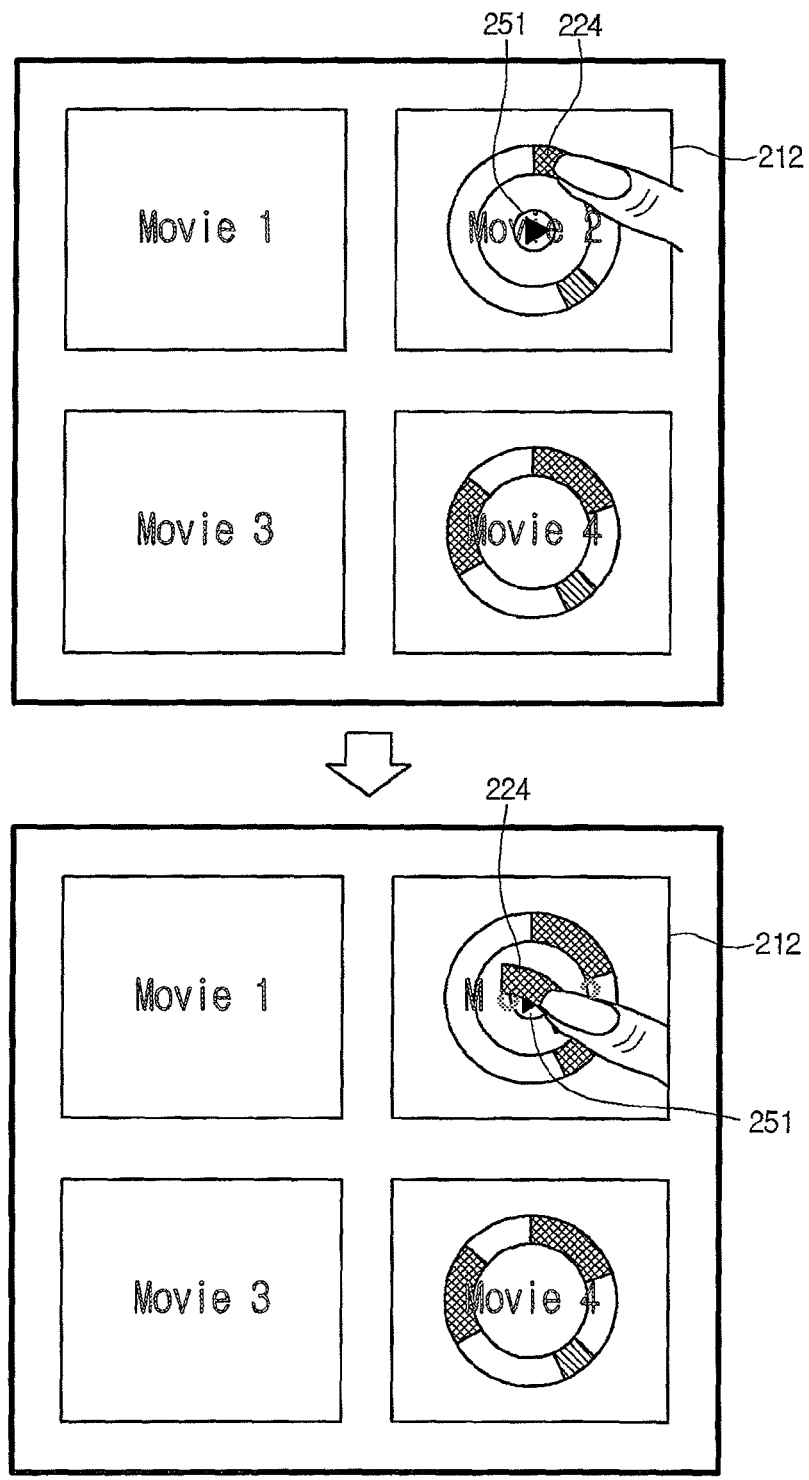
FIG. 31 is an overview illustrating a video playback depending on a user's drag and drop input according to an embodiment of the present invention.

This will be described with reference to FIG. 31. In particular, FIG. 31 is an overview illustrating a video playback according to a user's drag and drop input. Referring to FIG. 31, when receiving an input for dragging the viewing section 224 and dropping it on the playback button 251 from a user, the control unit 180 can play the dragged and dropped viewing section 224 in full screen or part of full screen.

According to another embodiment of the present invention, when receiving a user input for dragging a partial section of the bar-type progressive bar 223 from the playback list 212 where the bar-type progressive bar 223 is displayed and dropping it on the playback button 251, the control unit 180 can play an image of a section corresponding to the dragged and dropped partial section.

When receiving a user input for dragging a partial section of the oval-type progressive bar 220 for one video included in the playback list 212 displayed on the display unit 151 through the touch sensor and dropping it on the playback button 251, the control unit 180 can play an image of the dragged and dropped section. Then, the control unit 180 can play the image of the dragged and dropped section in full screen or part of full screen.

Figure 32:
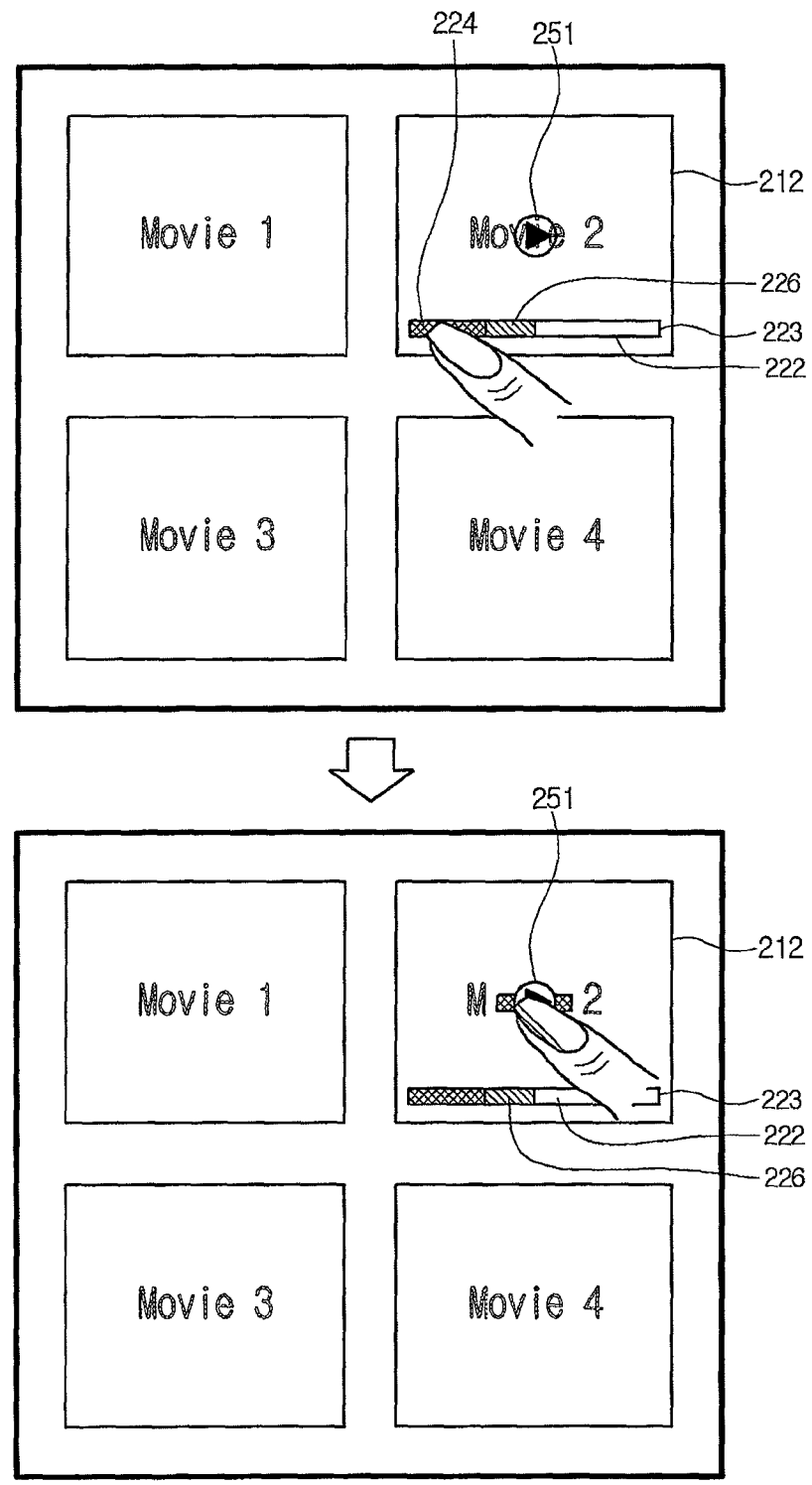
FIG. 32 is an overview illustrating a video playback depending on a user's drag and drop input according to another embodiment of the present invention.

This is described with reference to FIG. 32, which is an overview illustrating a video playback according to a user's drag and drop input. Referring to FIG. 32, when receiving an input for dragging the viewing section 224 and dropping it on the playback button 251 from a user, the control unit 180 can play the dragged and dropped viewing section 224 in full screen or part of full screen.

Figure 7:
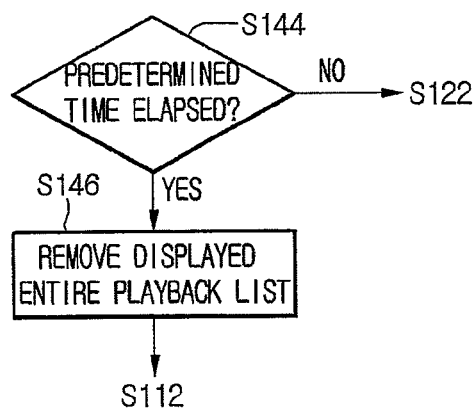

Next, FIG. 7 is a flowchart illustrating when the mobile terminal 100 terminates an entire playback list display according to an embodiment of the present invention. Referring to FIG. 7, if not receiving a user input for a predetermined time (Yes in S144), the control unit 180 removes a displayed entire playback list (S146). Then, the control unit 180 returns to a video playback screen (S112).

Figure 8:
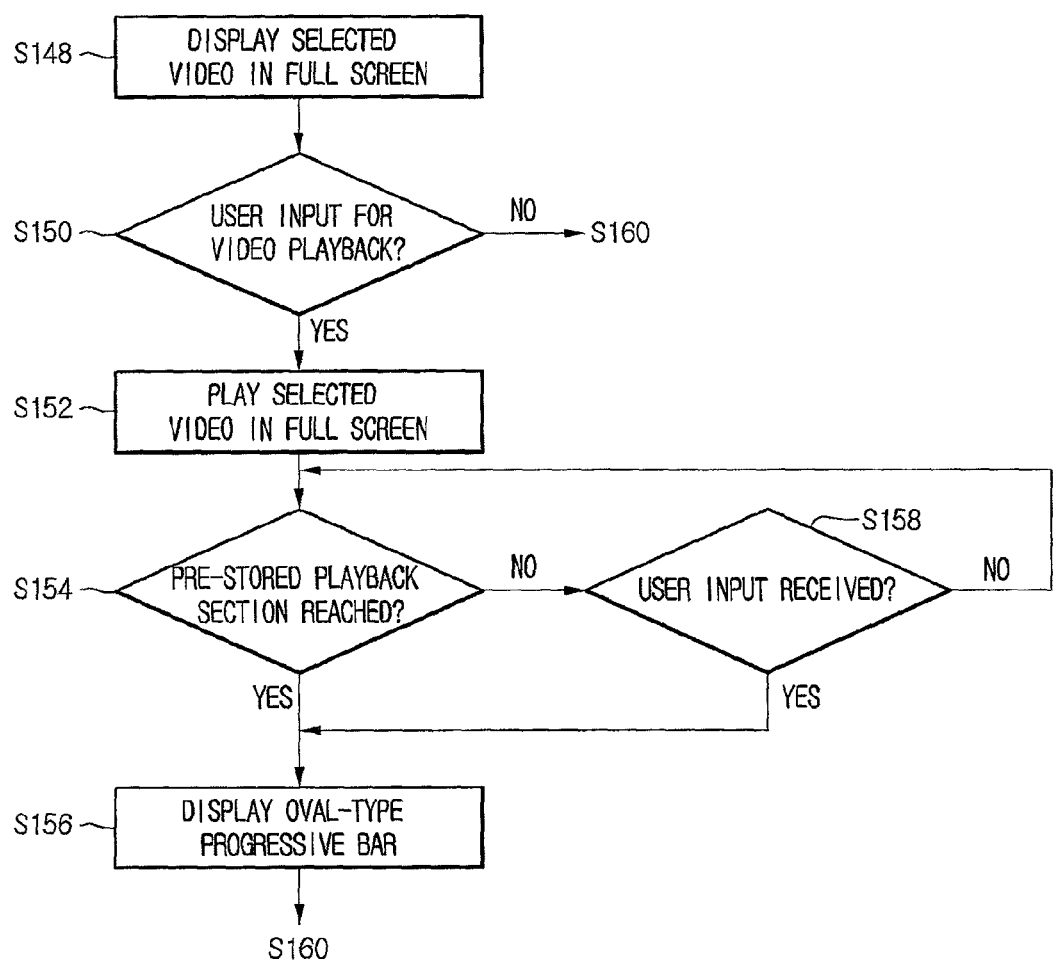

FIG. 8 is a flowchart illustrating when the mobile terminal 100 receives a user input for selecting one video from an entire playback list according to an embodiment of the present invention (Yes in S124 in FIG. 5). When receiving a user input for selecting one of at least one video included in a displayed entire playback list, the control unit 180 displays the selected video in full screen (S148).

Figure 33:
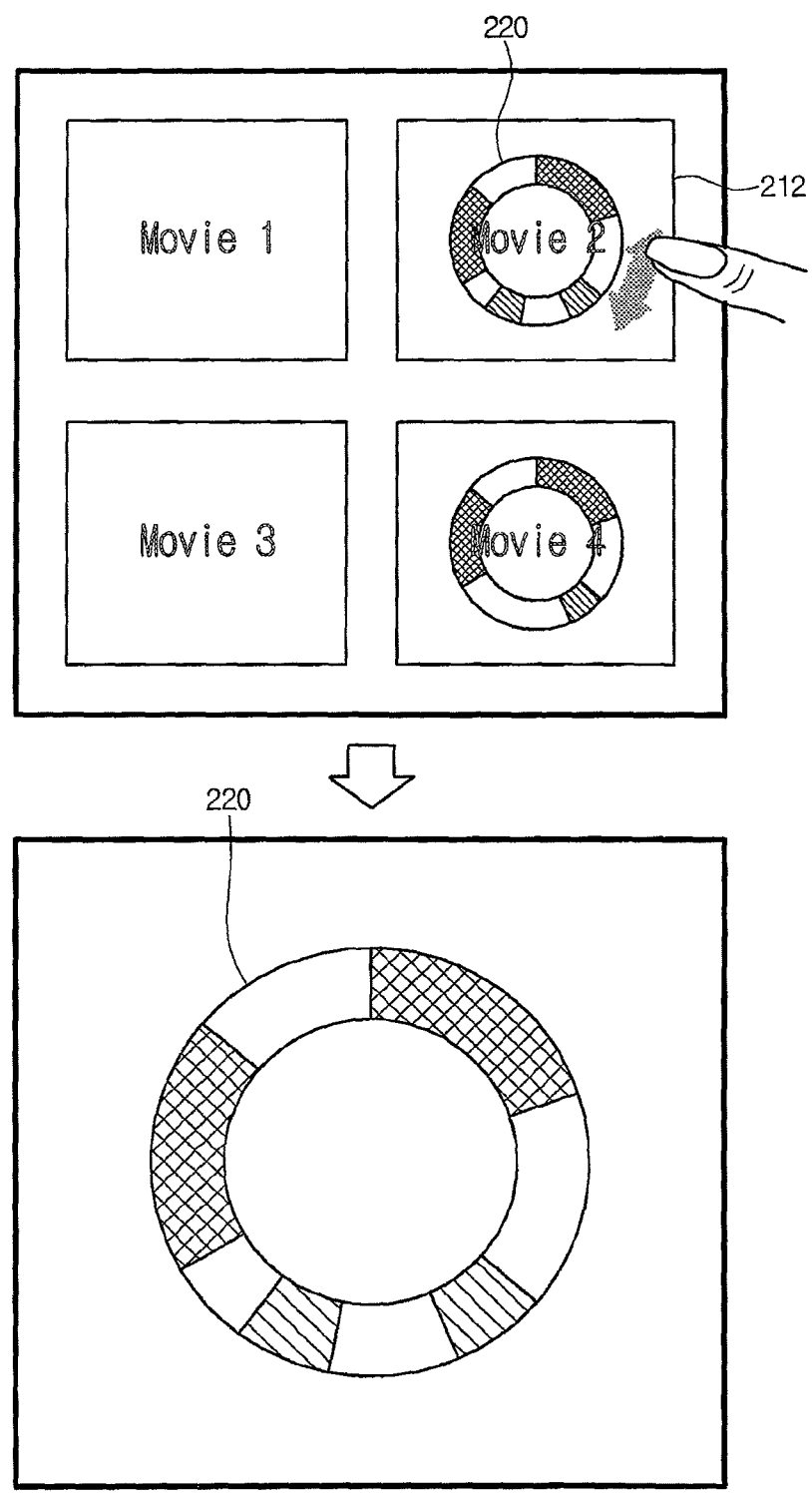
FIGS. 33 to 35 are overviews illustrating a full screen display of a selected video according to an embodiment of the present invention.
Figure 34:
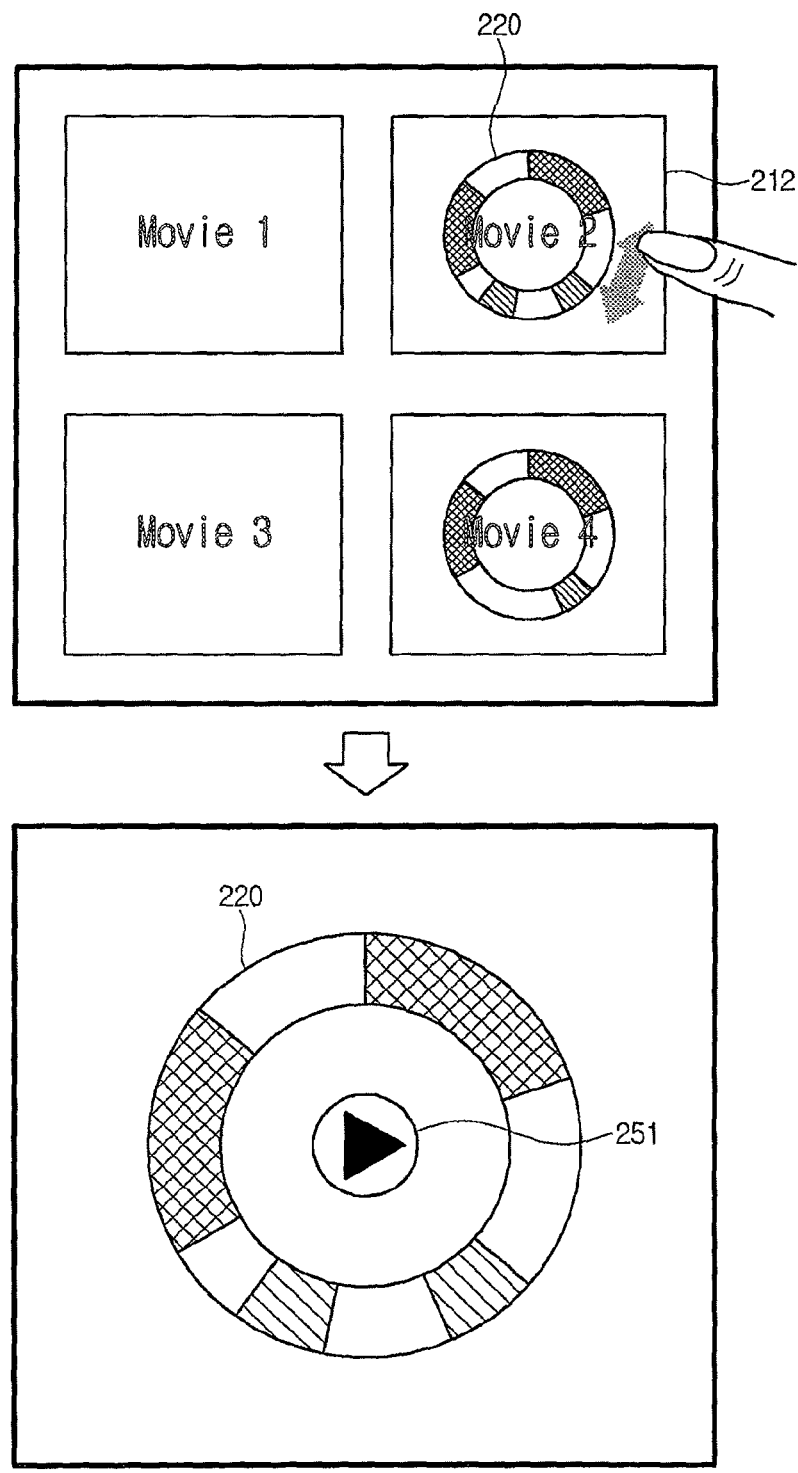
Figure 35:
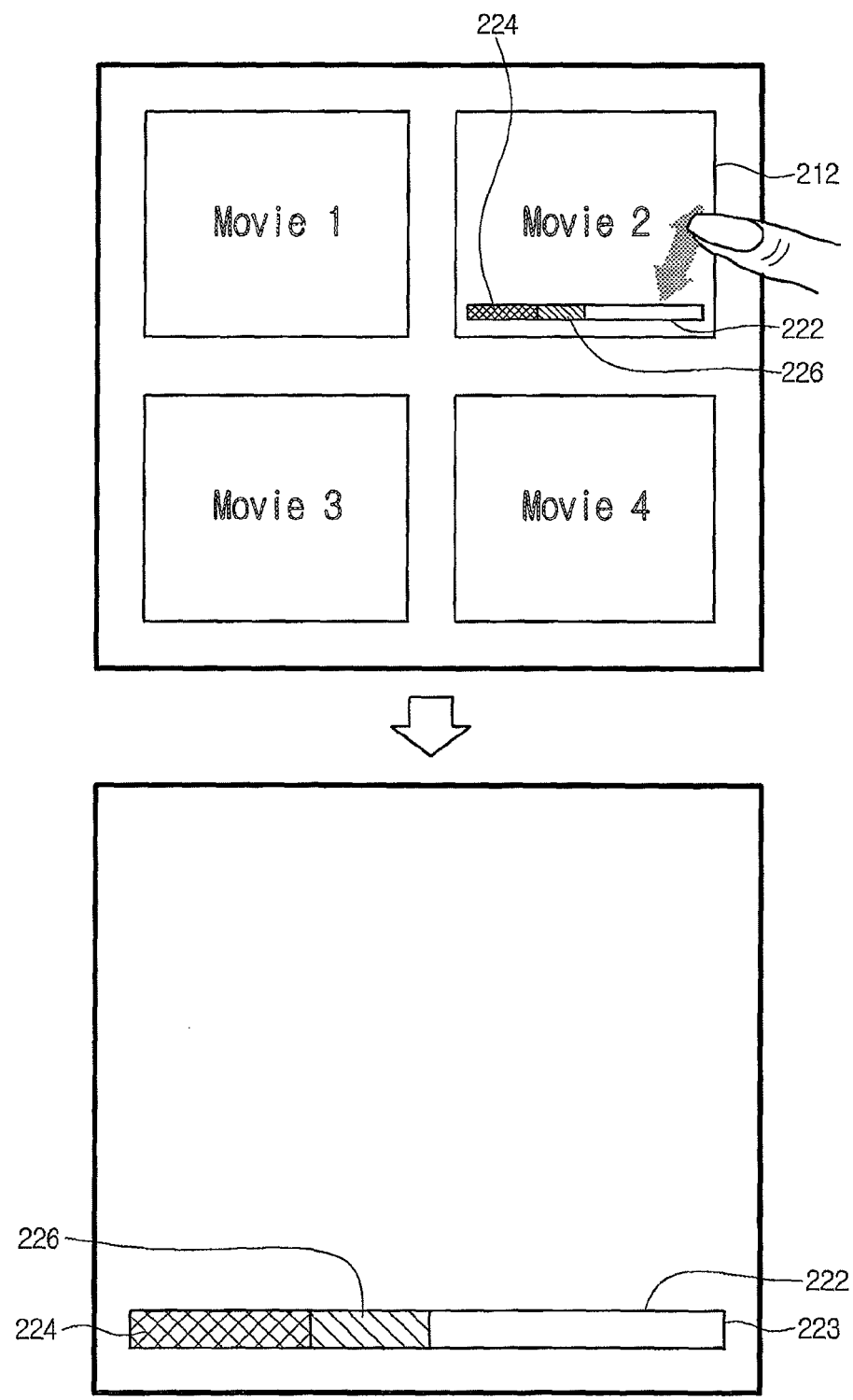

This will be described with reference to FIGS. 33 to 35. In particular, FIGS. 33 to 35 are overviews when the mobile terminal 100 displays a selected video in full screen according to an embodiment of the present invention. Referring to FIG. 33, when receiving a tap touch, i.e., a user input for selecting a video corresponding to the playback list 212 among a plurality of videos included in a displayed entire playback list, the control unit 180 can display the selected video in full screen. Then, the control unit 180 can display an oval-type progressive bar 220 for the selected video in full screen.

According to another embodiment of the present invention, the control unit 180 can display the oval-type progressive bar 220 for the selected video and the playback button 251 together in full screen.

Referring to FIG. 34, when receiving a tap touch, i.e., a user input for selecting a video corresponding to the playback list 212 among a plurality of videos included in a displayed entire playback list, the control unit 180 can display the selected video in full screen. Then, the control unit 180 can display the oval-type progressive bar 220 for the selected video and the playback button 251 together in full screen.

As another embodiment of the present invention, referring to FIG. 35, when receiving a tap touch, i.e., a user input for selecting a video corresponding to the playback list 212 among a plurality of videos included in a displayed entire playback list, the control unit 180 can display the selected video in full screen. Then, the control unit 180 can display a bar-type progressive bar 223 for the selected video in full screen.

As shown in FIG. 8, when receiving a user input for video playback (Yes in S150), the control unit 180 plays a video displayed in full screen (S152). The control unit 180 can receive a user's touch input for playing the displayed video through the touch sensor. Additionally, the control unit 180 can receive a user input for video playback through an external input device such as a keypad or a mouse.

Then, the control unit 180 can play a video according to a received user input. For example, when receiving a user input for touching the playback button 251 displayed on the display unit 151 through the touch sensor, the control unit 180 can play the video displayed in full screen.

As another example, when receiving a user input for double-touching a screen displayed on the display unit 151 through the touch sensor, the control unit 180 can play the video displayed in full screen. When a video being played reaches a playback section including pre-stored video viewing information (Yes in S154), the control unit 180 displays the oval-type progressive bar 220 (S156).

When the video being played reaches a section including video viewing information based on video viewing information stored in the memory 160, the control unit 180 can display the progressive bar 212 on the video viewing information.

Figure 36:
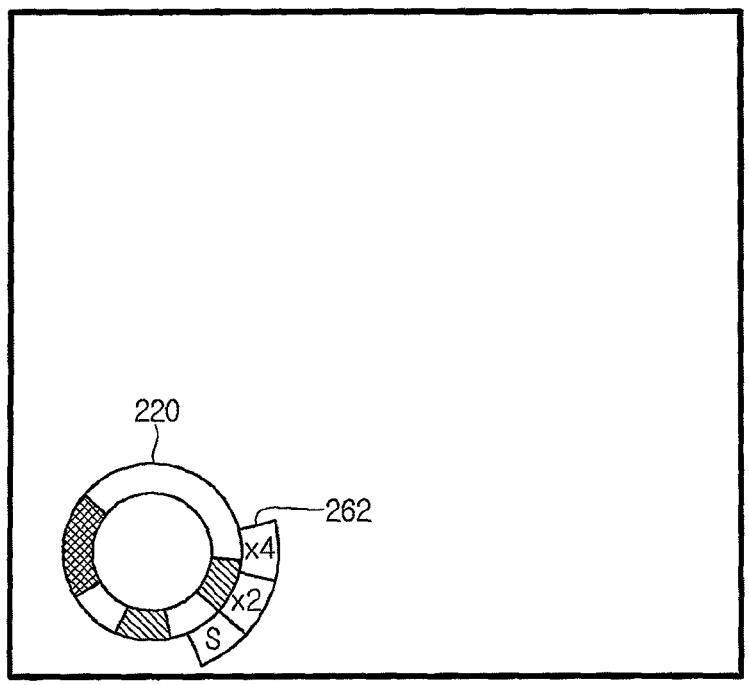
FIGS. 36 to 38 are overviews illustrating a progressive bar while a terminal plays a video according to an embodiment of the present invention.
Figure 37:
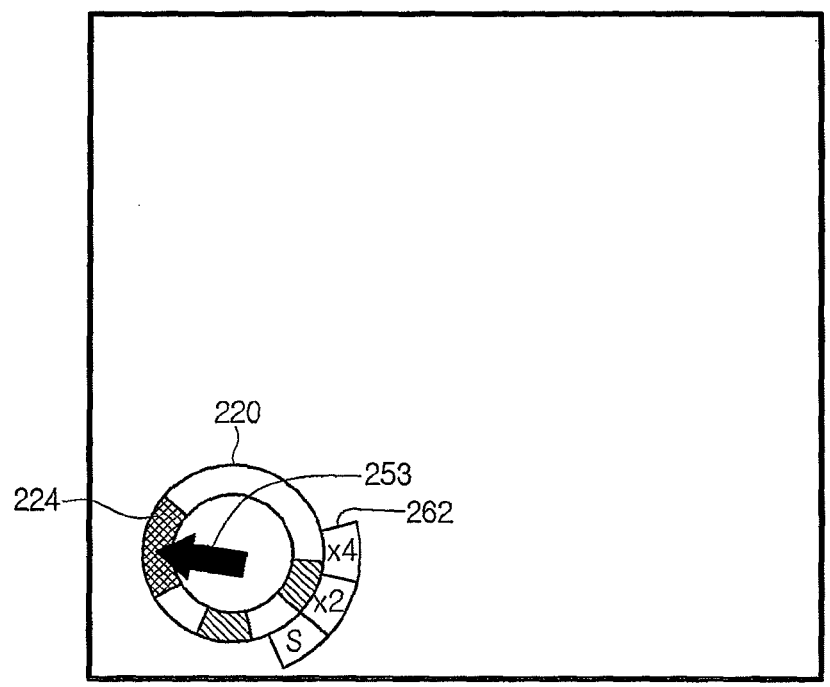
Figure 38:
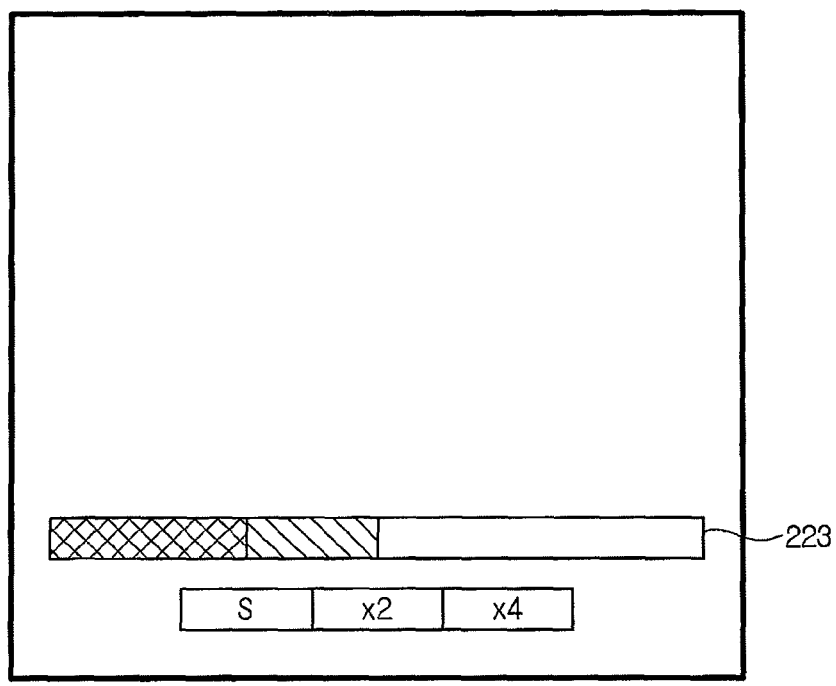

This will be described with reference to FIGS. 36 to 38. In particular, FIGS. 36 to 38 are overviews illustrating a progressive bar while the mobile terminal 100 plays a video according to an embodiment of the present invention. Referring to FIG. 36, when reaching a section including video viewing information on the video being played, the control unit 180 can display the oval-type progressive bar 220.

Additionally, the control unit 180 can display the oval-type progressive bar 220 and a playback setting menu 262 together.

Then, while displaying the oval-type progressive bar 220 during playback, the control unit 180 can display a section being played different from another section. For example, while displaying the oval-type progressive bar 220, the control unit 180 can display a section being played to flash.

According to another embodiment of the present invention, while displaying the oval-type progressive bar 220, the control unit 180 can display an indicator indicating a section being played. For example, as shown in FIG. 37, the control unit 180 can display an arrow-shaped indicator 253 indicating a section being played in the oval-type progressive bar 220.

Additionally, when reaching a section including video viewing information on the video being played, the control unit 180 can display the bar-type progressive bar 223. For example, referring to FIG. 38, when reaching a section including video viewing information on the video being played, the control unit 180 can display the bar-type progressive bar 223 and also the playback setting menu 262.

Herein, the playback setting menu may include at least one of a setting menu for video playback speed and a setting menu for video playback skip. For example, as shown in FIG. 36, the control unit 180 can display the oval-type progressive bar 220 and the playback setting menu 262 for the selected video. Then, the playback setting menu 262 may include buttons for skip playback, 2× playback, and 4× playback.

Figure 39:
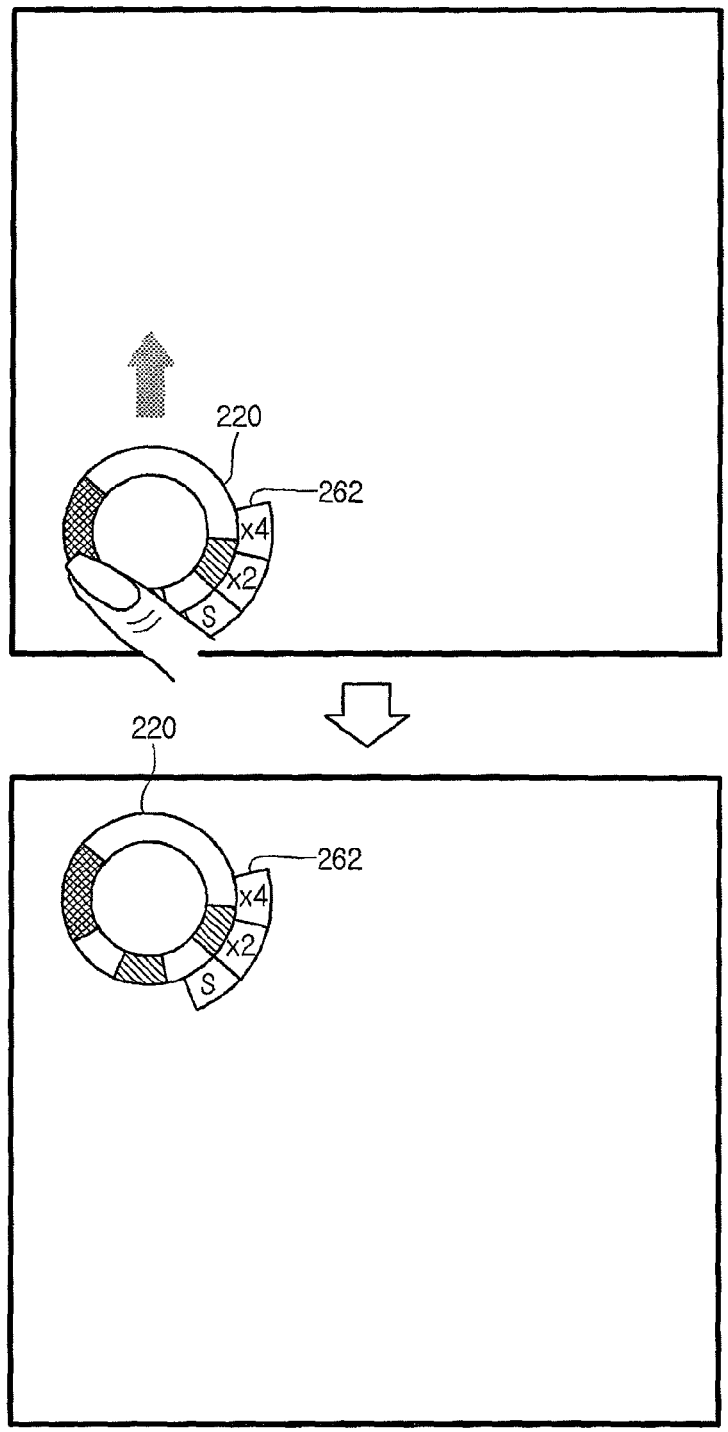
FIG. 39 is an overview illustrating a movement of a progressive bar according to an embodiment of the present invention.

Moreover, the control unit 180 can move the position of a progressive bar according to a user input for the progressive bar. For example, as shown in FIG. 39, when receiving a user's drag input for touching the oval-type progressive bar 220 and moving it to the upper of the full screen, the control unit 180 can move the oval-type progressive bar 220 to the upper in corresponds to the user's drag input.

Returning to FIG. 8, when receiving a user input for the mobile terminal 100 in a section including no pre-stored video information on the video being played (Yes in S158), the control unit 180 displays the oval-type progressive bar 212 (S156).

Figure 9:
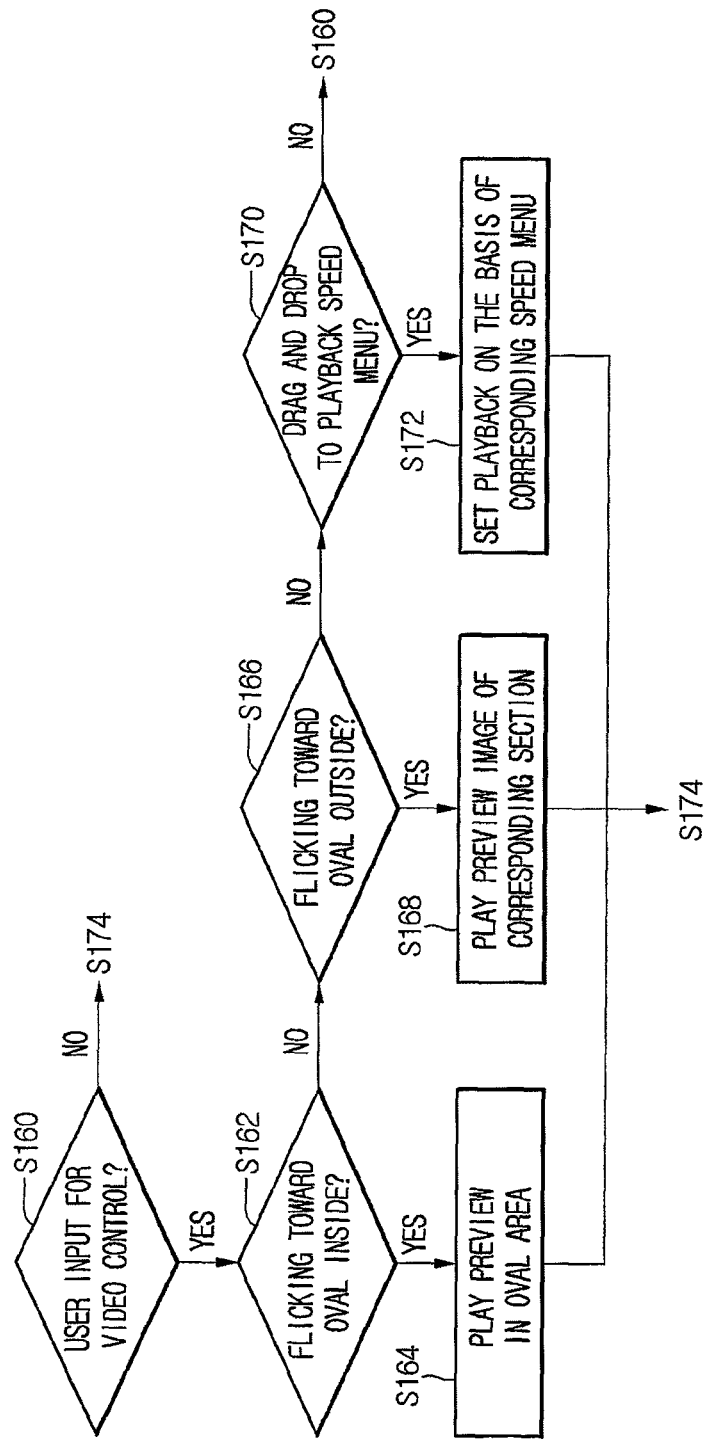

Next, FIG. 9 is a flowchart illustrating an operation depending on a user input for a video control of the terminal 100 according to an embodiment of the present invention. As shown, the control unit 180 receives a user input for controlling a video (S160). The control unit 180 can receive a user input for controlling a video being played or displayed by the display unit 151 through the touch sensor. Additionally, the control unit 180 can receive a user input for controlling a video through an external input device such as a keypad or a mouse.

Even when receiving the same user input for controlling a video, the control unit 180 can perform different operations according to whether or not the video is being played. For example, when a video is being played or for a still screen, even when receiving a user input, the control unit 180 can perform different operations.

When receiving a user input for selecting a partial section of the displayed oval-type progressive bar 220 and moving it to the oval inside of the oval-type progressive bar 220 (Yes in S162), the control unit 180 plays a preview image of the selected partial section in the oval area (S164).

Also, when receiving a user input for touching a partial section of the oval-type progressive bar 220 displayed on the display unit 151 through the touch sensor and flicking it toward the oval inside of the oval-type progressive bar 220, the control unit 180 can play a preview image of a section corresponding to the touched section in the oval inside area.

The partial section of the oval-type progressive bar 220 may correspond to one of a section 222 not played by a user, a section 224 played and viewed by a user, and a section 226 played but not viewed by a user. Then, the control unit 180 can play a preview image played inside the oval area, which is faster than a preview image played in a guide area described later.

Figure 40:
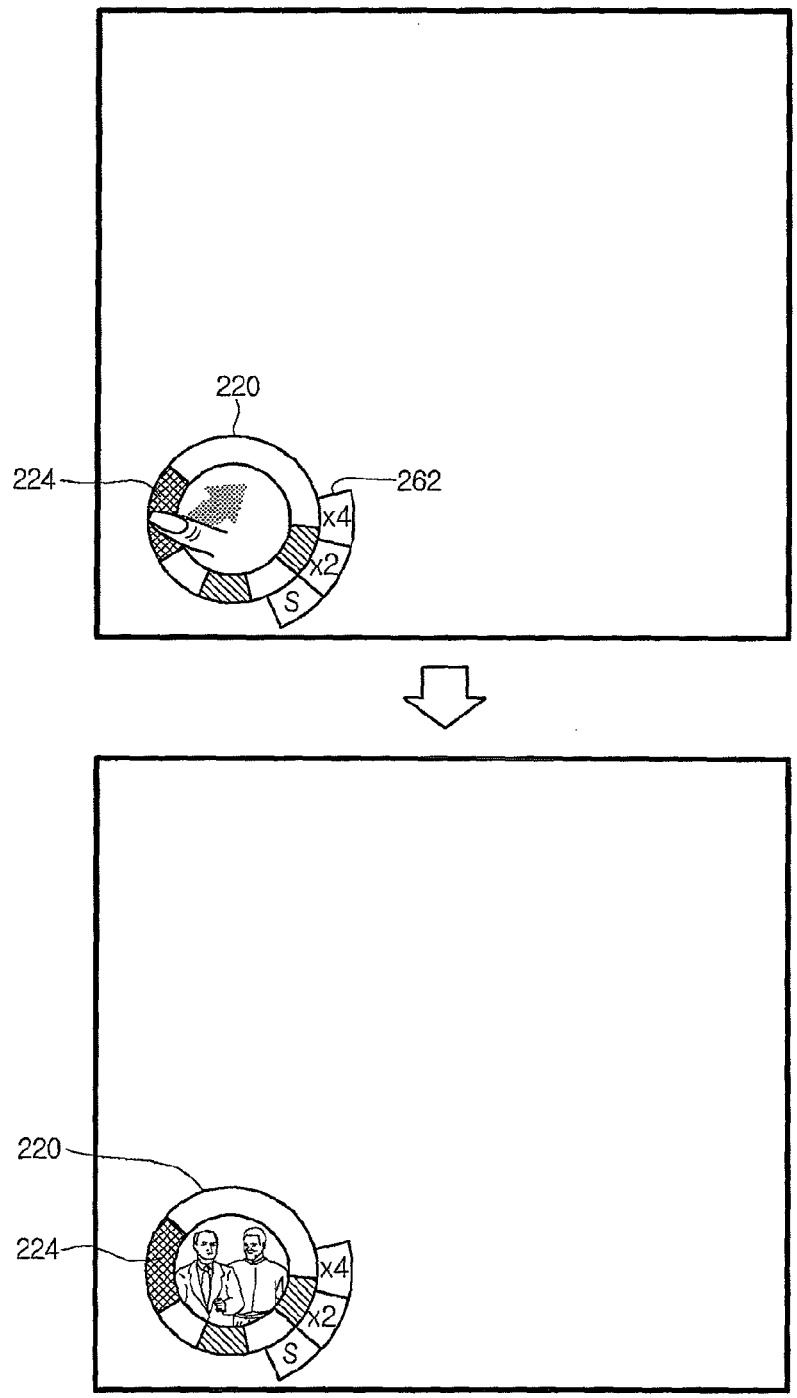
FIGS. 40 and 41 are overviews illustrating a preview playback operation according to an embodiment of the present invention.

This will be described with reference to FIGS. 40 and 41. Referring to FIG. 40, when receiving a user input for touching the viewed section 224 of the displayed oval-type progressive bar 220 during a video playback and flicking it toward the oval inside direction of the oval-type progressive bar 220, the control unit 180 can play a preview image of the viewed section 224 in an oval inside area.

Figure 41:
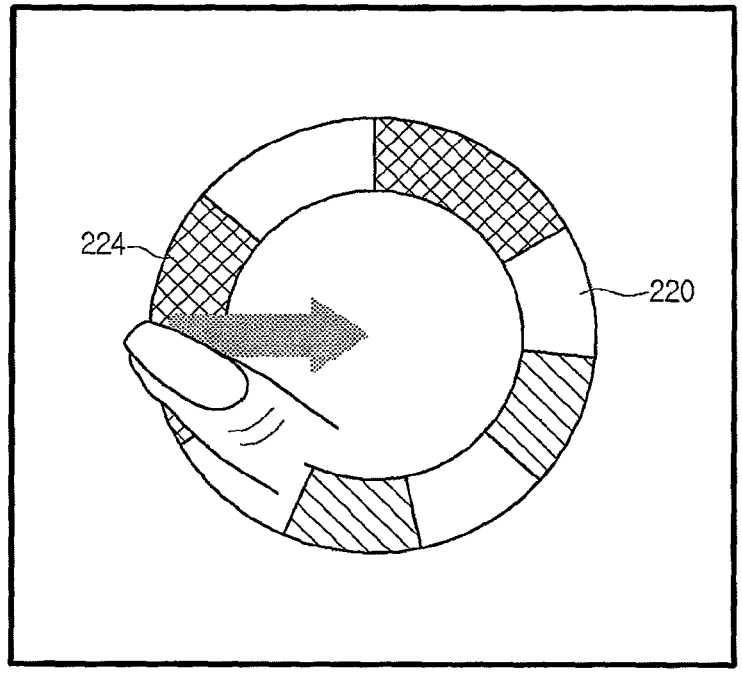
Figure 41:
Figure 41:
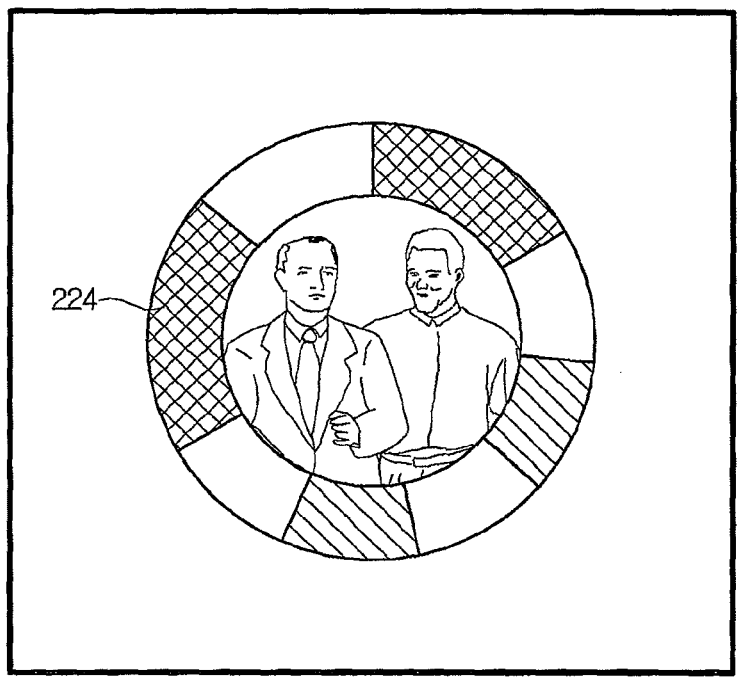

Referring to FIG. 41, when receiving a user input for touching the viewed section 224 of the displayed oval-type progressive bar 220 in a still screen where a video is not played and flicking it toward the oval inside direction of the oval-type progressive bar 220, the control unit 180 can play a preview image of the viewed section 224 in an oval inside area.

Figure 42:
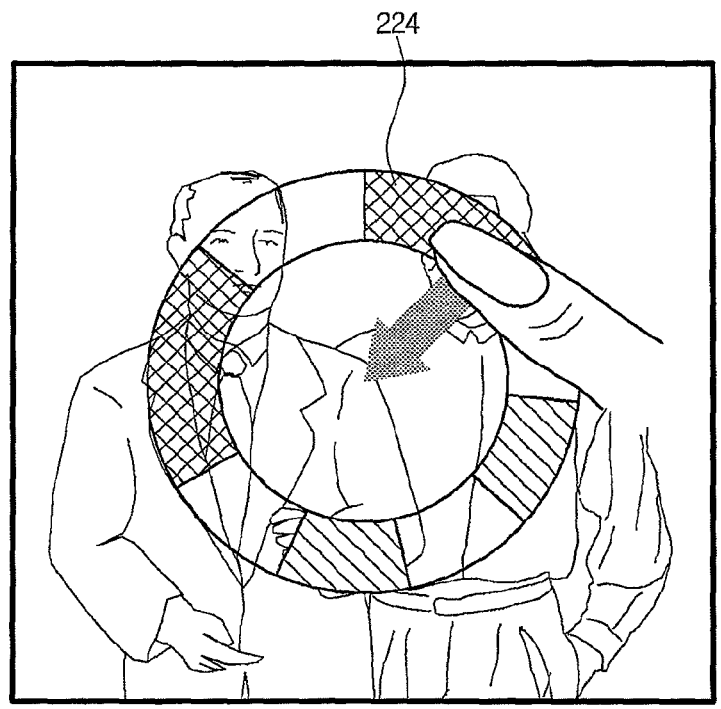
FIG. 42 is an overview illustrating a thumbnail change operation according to an embodiment of the present invention.
Figure 42:
Figure 42:
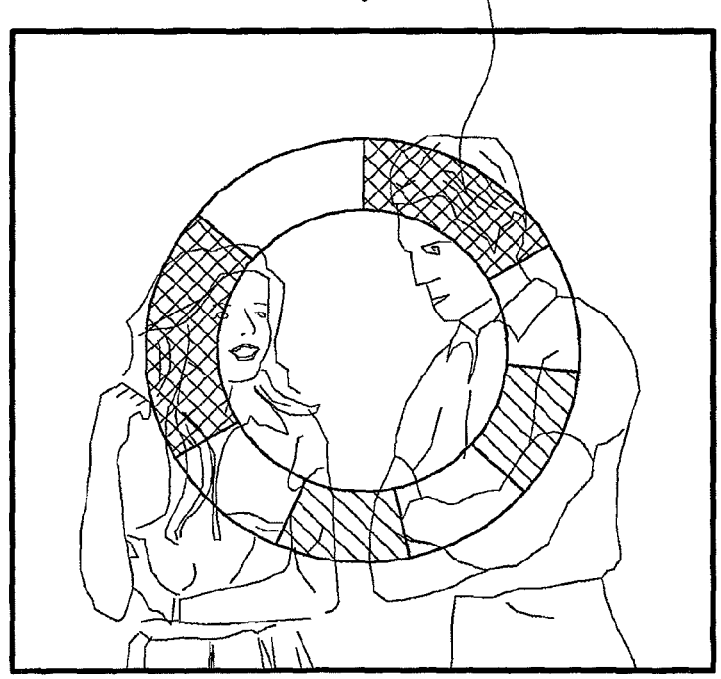

According to another embodiment of the present invention, referring to FIG. 42, when receiving a user input for touching a partial section of the displayed oval-type progressive bar 220 in a still screen where a video is not played and flicking it toward the oval inside direction of the oval-type progressive bar 220, the control unit 180 can display a thumbnail image corresponding to the touched partial section as the background screen of a full screen.

According to another embodiment of the present invention, when receiving a user input for touching a partial section of the bar-type progressive bar 223 for a video displayed on the display unit 151 through the touch sensor and flicking it toward the lower direction of the bar-type progressive bar 223, the control unit 180 can change a thumbnail image corresponding to the touched section into the background screen.

Next, referring to FIG. 9, when receiving a user input for selecting a partial section of the displayed oval-type progressive bar 220 and moving it to the oval outside of the oval-type progressive bar 220 (Yes in S166), the control unit 180 plays a preview image of the selected partial section (S168).

When receiving a user input for touching a partial section of the oval-type progressive bar 220 displayed on the display unit 151 through the touch sensor and flicking it toward the oval outside of the oval-type progressive bar 220, the control unit 180 can play a preview image of a section corresponding to the touched section. Then, the control unit 180 can display a preview image in a guide area 241 according to a user input.

Additionally, the control unit 180 can play a plurality of preview images on a plurality of areas according to a user input. Further, the partial section of the oval-type progressive bar 220 may correspond to one of a section 222 not played by a user, a section 224 played and viewed by a user, and a section 226 played but not viewed by a user.

Figure 43:
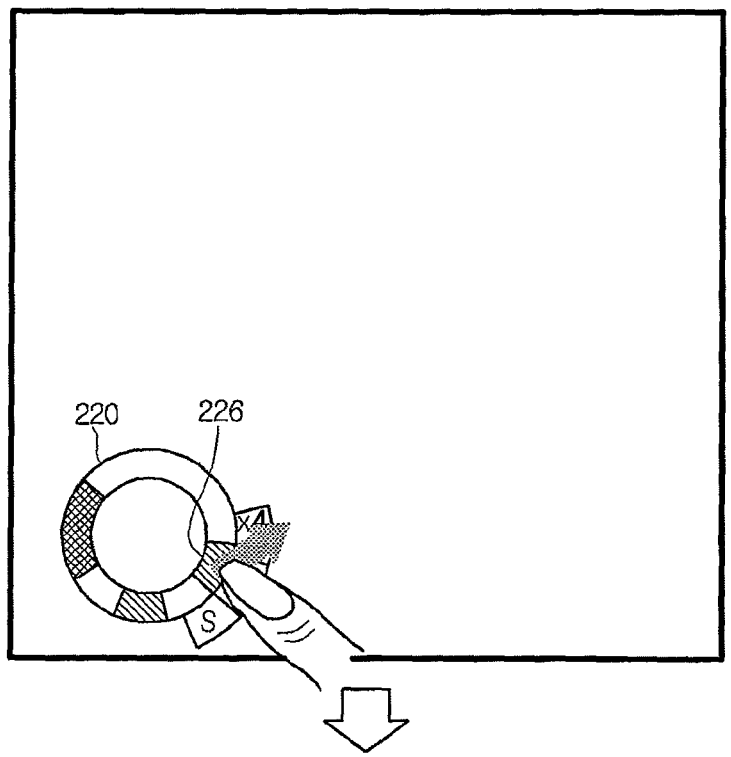
FIGS. 43 to 46 are overviews illustrating a preview image playback according to an embodiment of the present invention.
Figure 43:
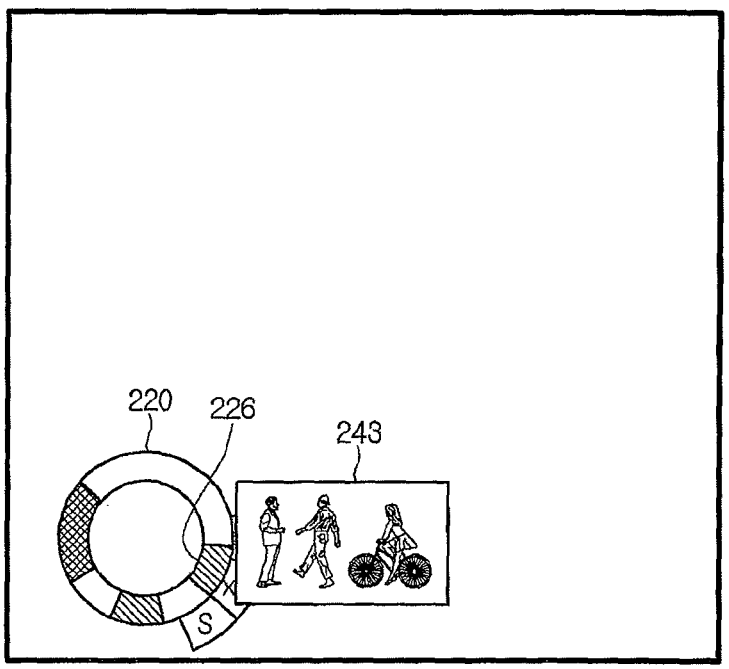

This will be described with reference to FIGS. 43 to 48. Referring to FIG. 43, when receiving a user input for touching the not viewed section 226 of the displayed oval-type progressive bar 220 during a video playback and flicking it toward the oval outside direction of the oval-type progressive bar 220, the control unit 180 can play a preview image 243 of the not viewed section 226.

Figure 44:
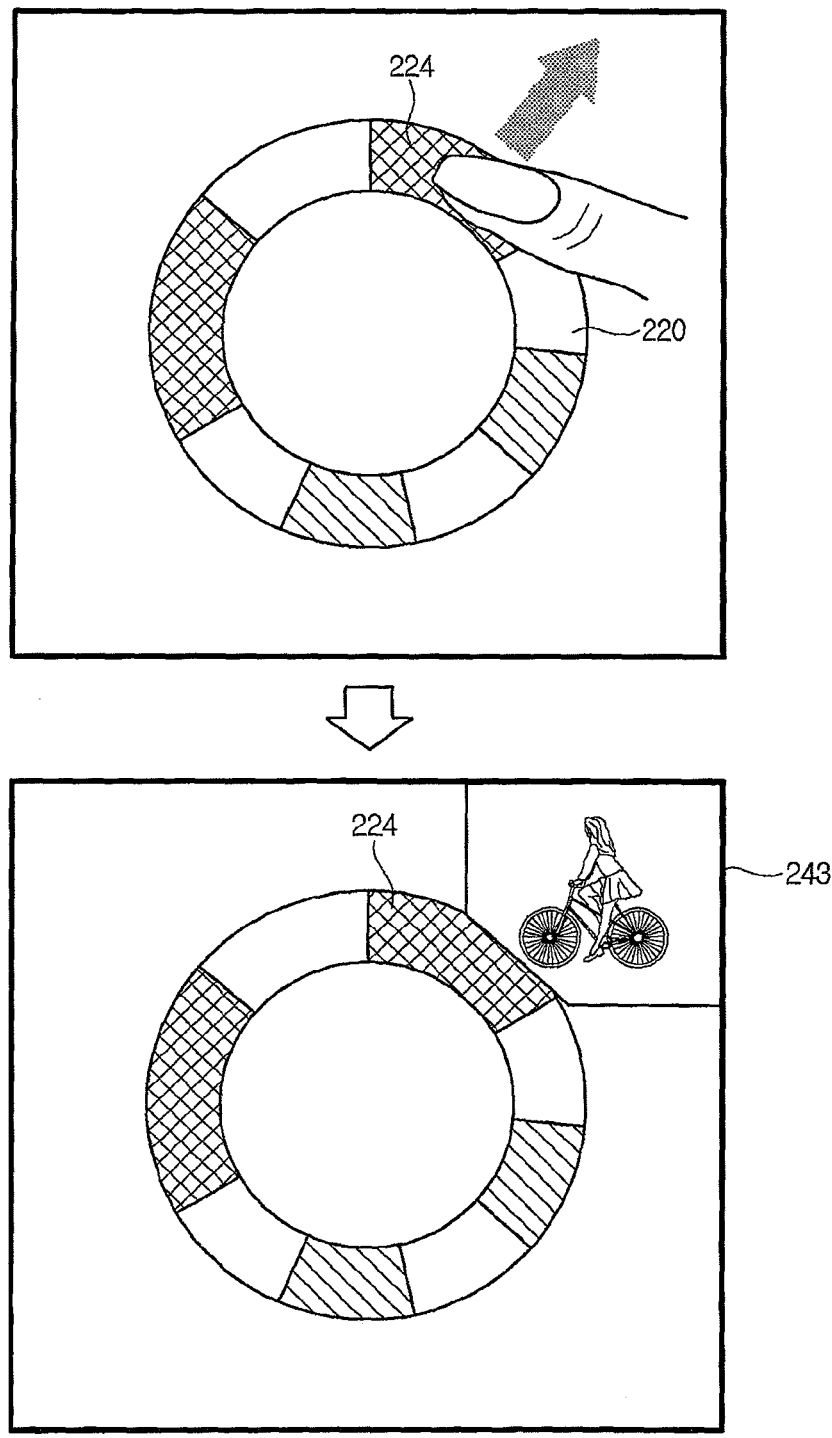

Referring to FIG. 44, when receiving a user input for touching the viewed section 224 of the displayed oval-type progressive bar 220 in a still screen where a video is not played and flicking it toward the oval outside direction of the oval-type progressive bar 220, the control unit 180 can play the preview image 243 of the viewed section 224.

Figure 45:
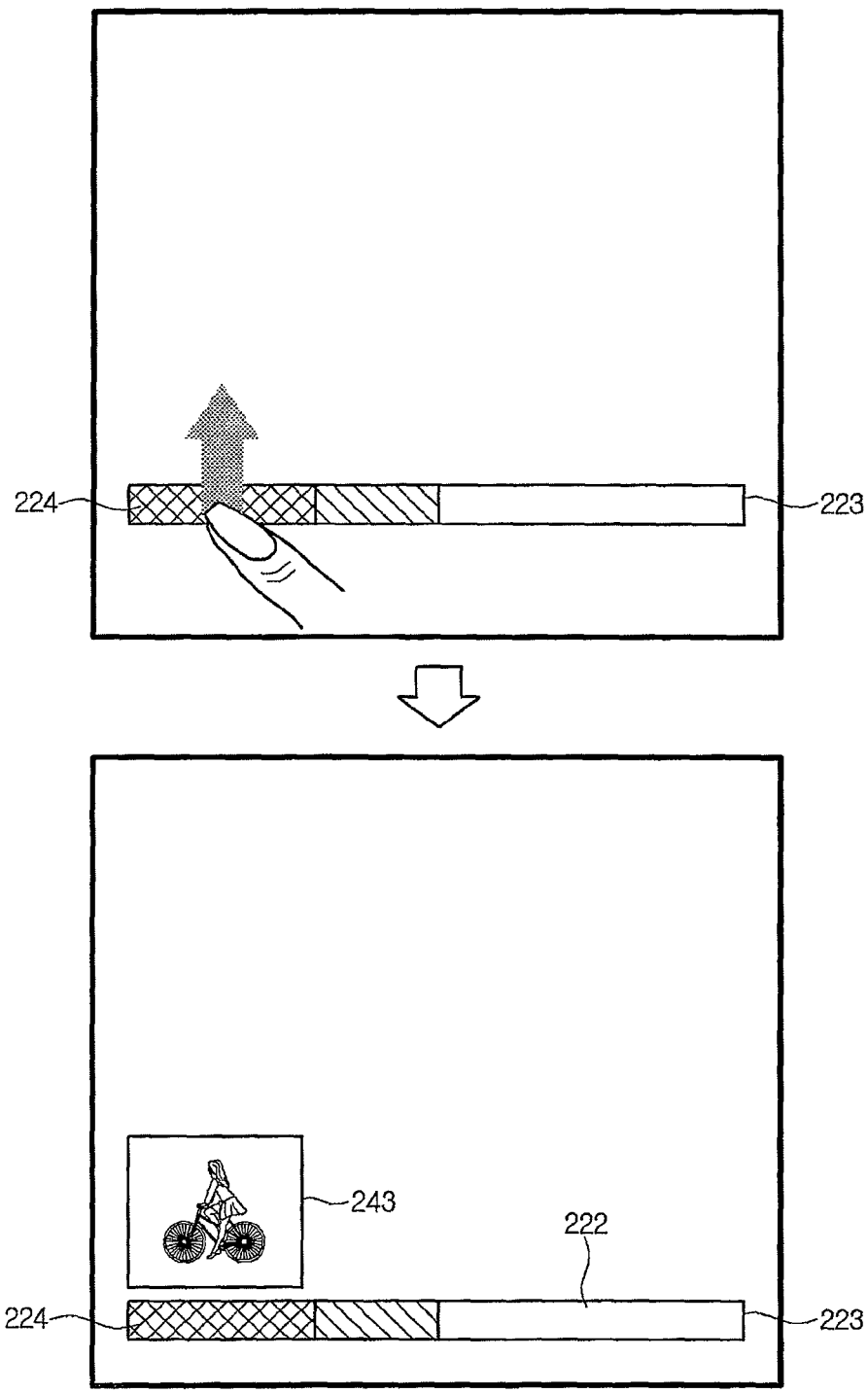

Referring to FIG. 45, when receiving a user input for touching the viewed section 224 of the displayed bar-type progressive bar 223 for a video displayed on the display unit 151 through the touch sensor and flicking it toward the upper direction of the bar-type progressive bar 223, the control unit 180 can play the preview image 243 of the viewed section 224.

Figure 46:
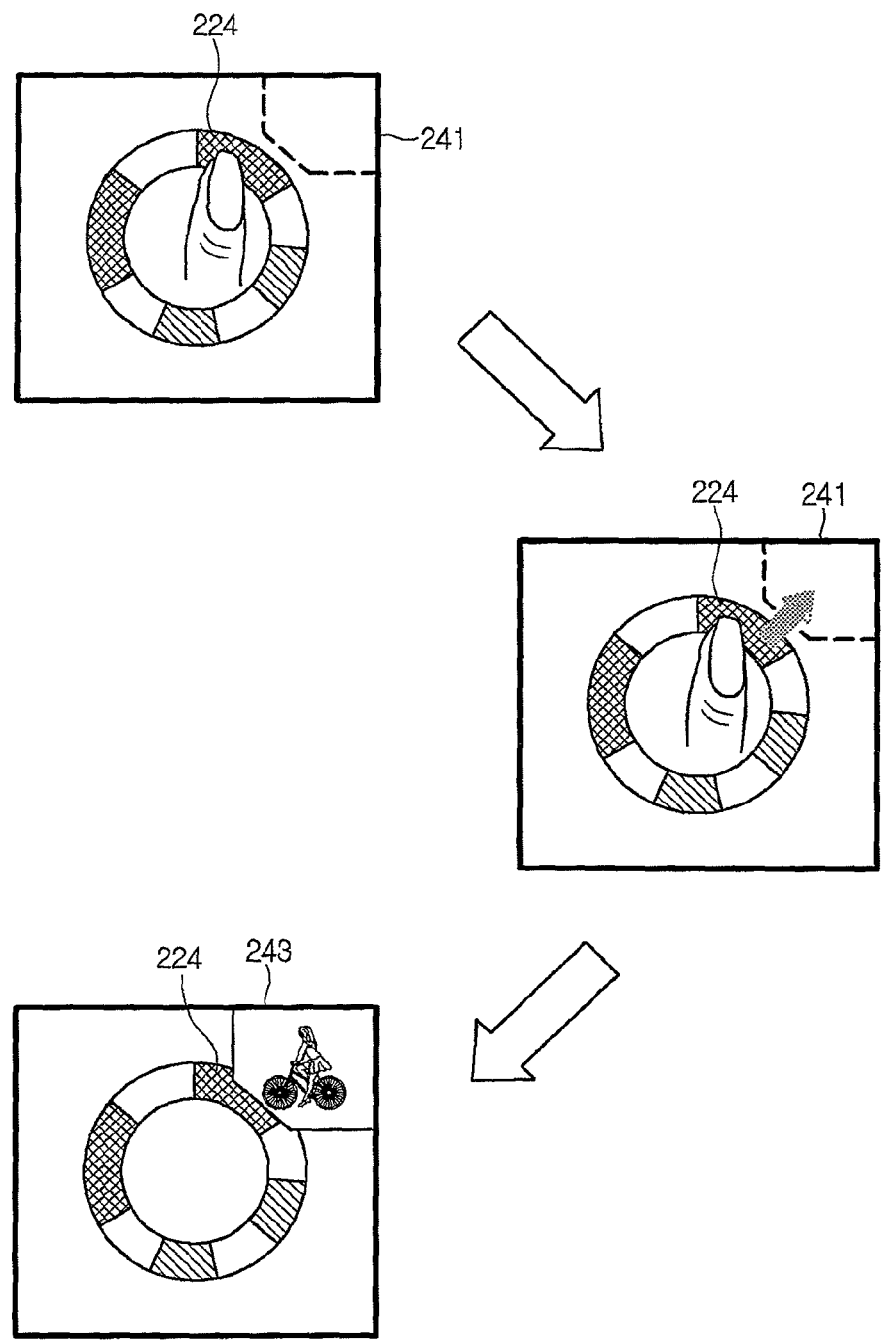

According to another embodiment of the present invention, referring to FIG. 46, when receiving a user input for touching the viewed section 224 of the oval-type progressive bar 220 for a video displayed on the display unit 151 through the touch sensor, the control unit 180 can display the guide area 241 indicating an area where the preview image 243 is to be displayed. Then, when receiving a user input for touching the viewed section 224 and flicking it toward the oval outside direction of the oval-type progressive bar 220, the control unit 180 can play the preview image 243 of the viewed section 224.

Figure 47:
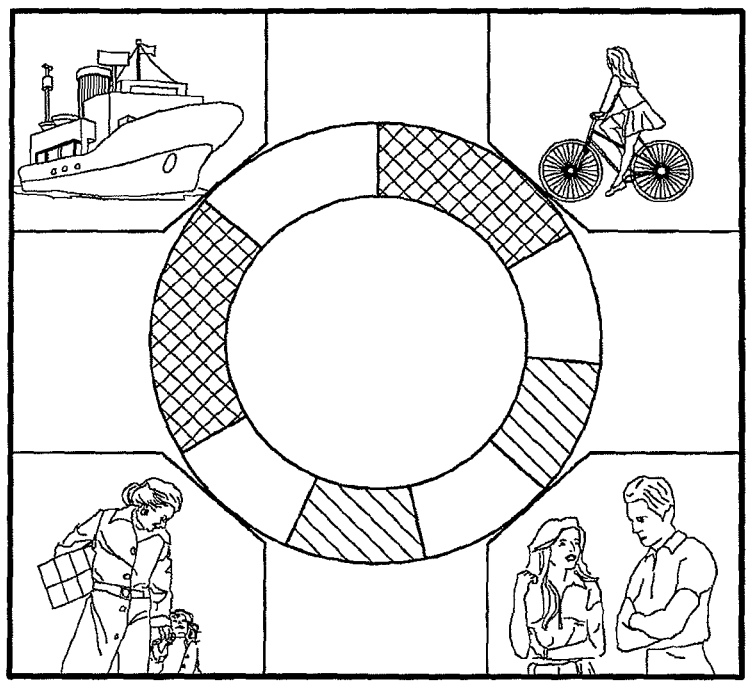
FIGS. 47 and 48 are overviews illustrating a plurality of preview image playbacks according to an embodiment of the present invention.

Additionally, the control unit 180 can play a plurality of preview images on a plurality of areas according to a user input. Referring to FIG. 47, the control unit 180 can play the preview images of four selected areas in respective partial areas of a full screen according to a user input. Then, when receiving a user input for selecting one of a plurality of preview images, the control unit 180 can display a selected preview image in full screen.

Figure 48:
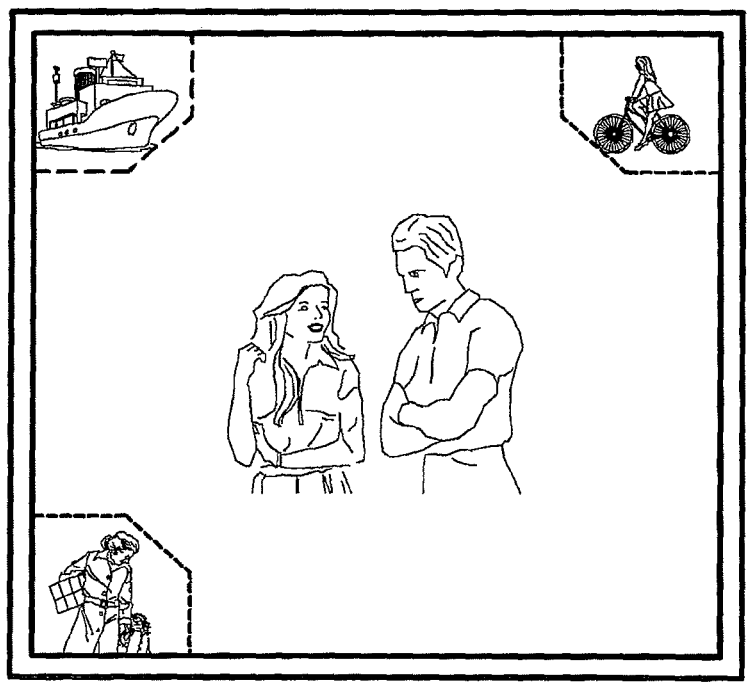

Referring to FIG. 48, the control unit 180 can display one preview image selected from a plurality of preview images in full screen and then play the remaining preview images other than the selected preview image in respective partial areas of a full screen.

Figure 49:
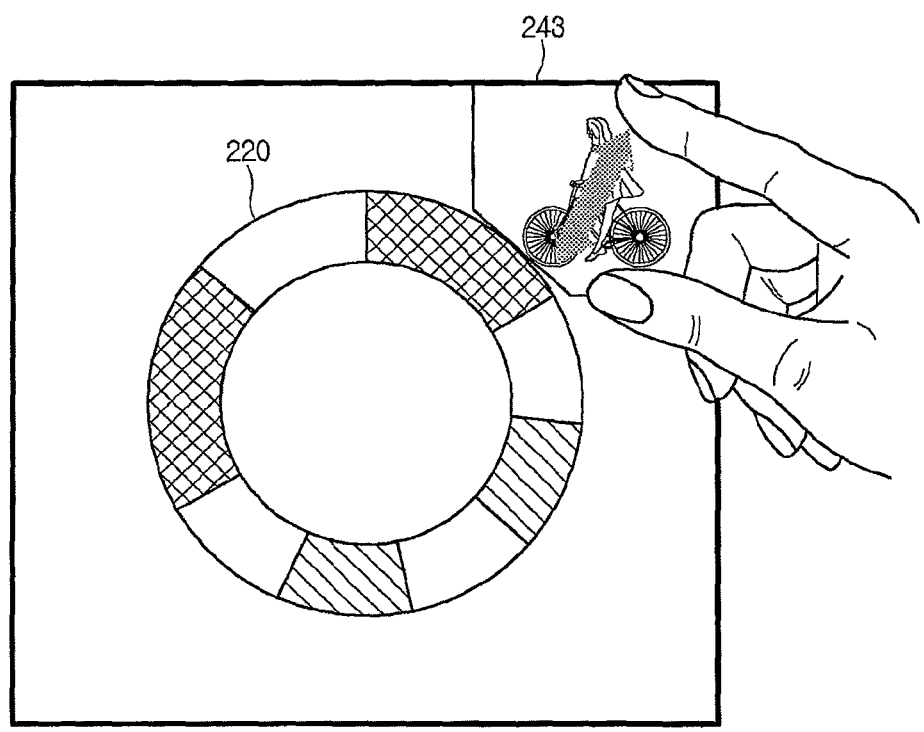
FIGS. 49 and 50 are overviews of converting the size of a preview image in correspondence to a user input according to an embodiment of the present invention.
Figure 49:
Figure 49:
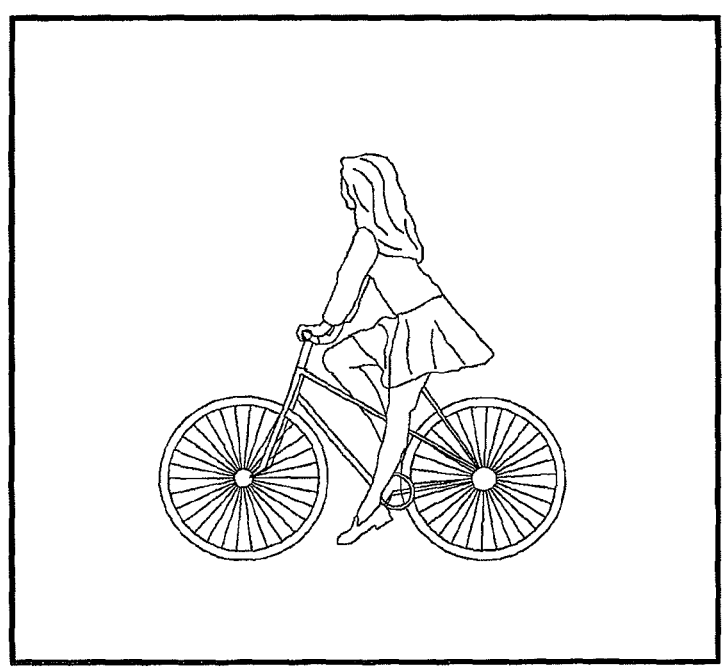

Moreover, the control unit 180 can change the size of the preview image 243 being played in correspondence to the received user's input. In more detail, the control unit 180 can change the size of the preview image 243 being played in correspondence to a user's pinch to zoom in or zoom out for the preview image 243. This will be described with reference to FIGS. 49 and 50. In particular, FIGS. 49 and 50 are overviews of converting the size of a preview image in correspondence to a user input.

When receiving a pinch-to-out touch that simultaneously spreads an area with two fingers from a user, the control unit 180 can change the size of the preview image 243 larger in correspondence to the pinch-to-out touch. For example, referring to FIG. 49, the control unit 180 can receive a pinch-to-out touch that simultaneously spreads an area with two fingers from a user and when the received pinch-to-out touch input is greater than a predetermined value, display the preview image 243 in full screen.

Figure 50:
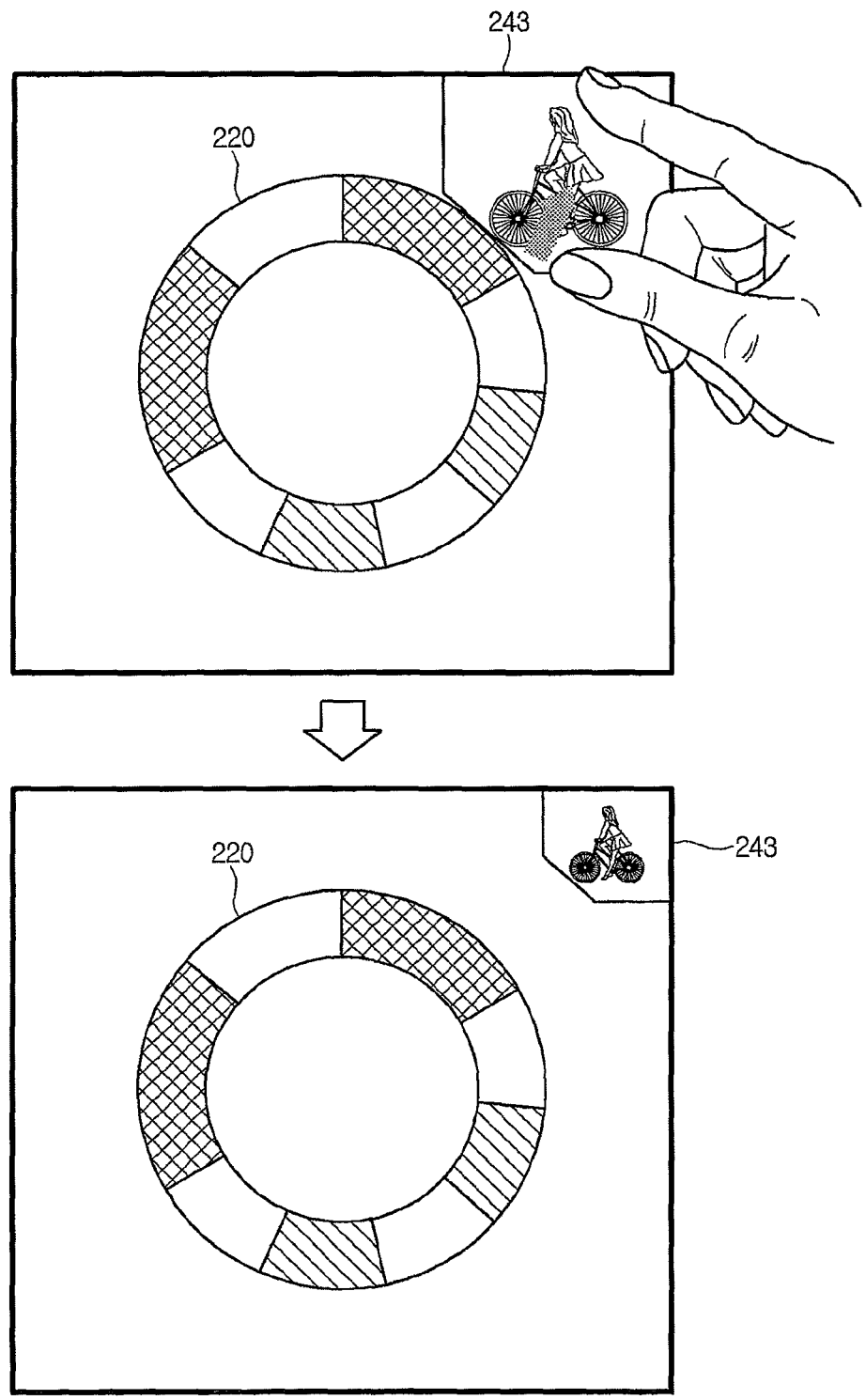

Referring to FIG. 50, when receiving a pinch-to-in touch that simultaneously narrows an area with two fingers from a user, the control unit 180 can change the size of the preview image 243 smaller in correspondence to the pinch-to-in touch.

Returning again to FIG. 9, when receiving a user input for dragging a partial section of the displayed oval-type progressive bar 220 and dropping it on the playback setting menu 262 (Yes in S170), the control unit 180 performs a playback setting of a section corresponding to the dragged and dropped partial section (S172).

Figure 51:
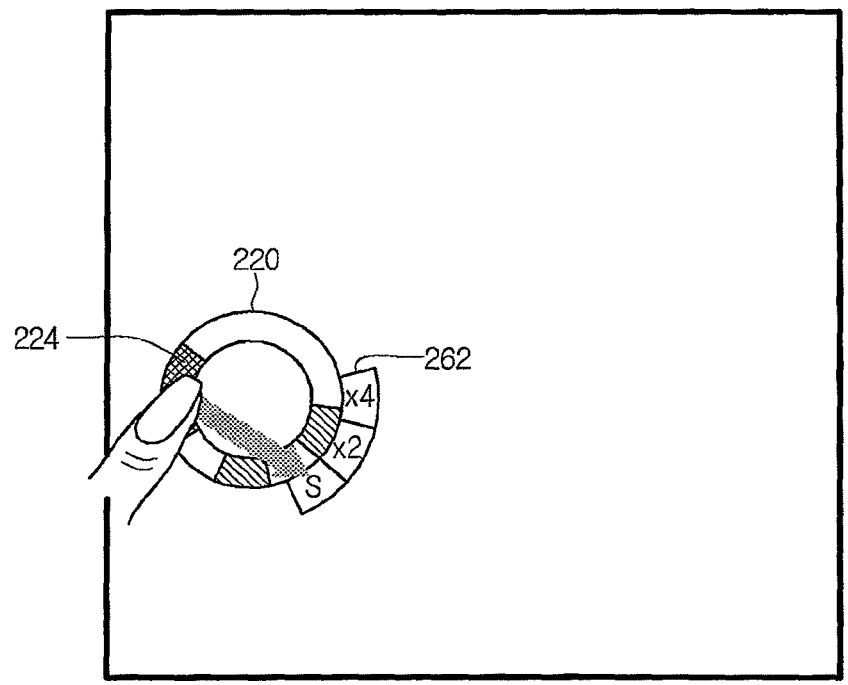
FIGS. 51 and 52 are overviews illustrating a playback setting according to an embodiment of the present invention.
Figure 51:
Figure 51:
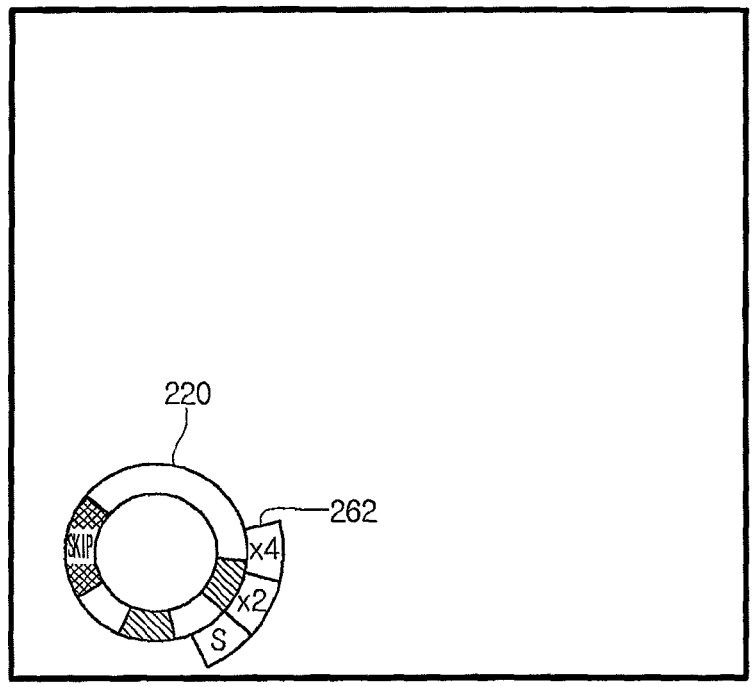

This will be described with reference to FIGS. 51 and 54. In particular, FIGS. 51 to 54 are overviews illustrating a video playback menu setting operation of the mobile terminal 100 according to an embodiment of the present invention. Referring to FIG. 51, when receiving from a user a user input for dragging the viewed section 224 of the oval-type progressive bar 220 during a video playback and dropping it on a button for the skip of the playback setting menu 262, the control unit 180 can be set to skip the dragged and dropped viewed section 244 and play a video. Then, the control unit 180 can display "SKIP" on the viewed section 224 of the oval-type progressive bar 223.

Figure 52:
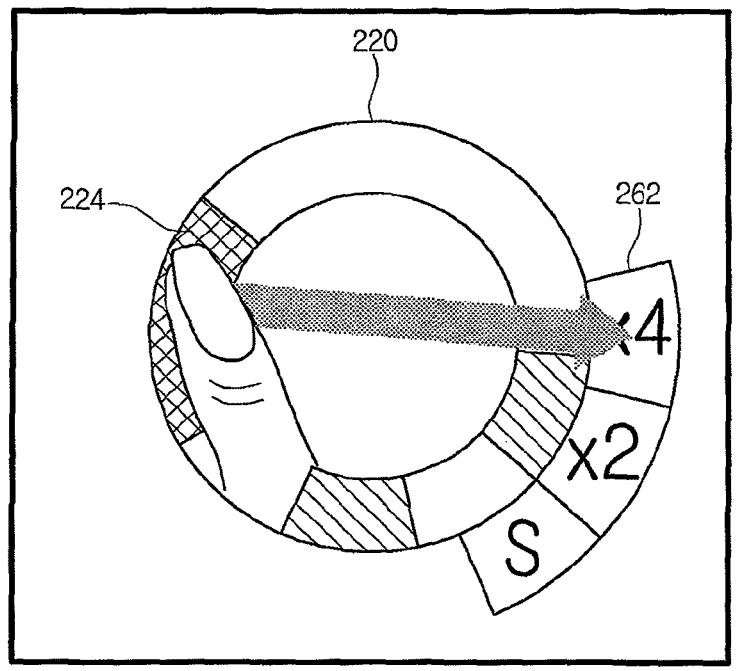
Figure 52:
Figure 52:
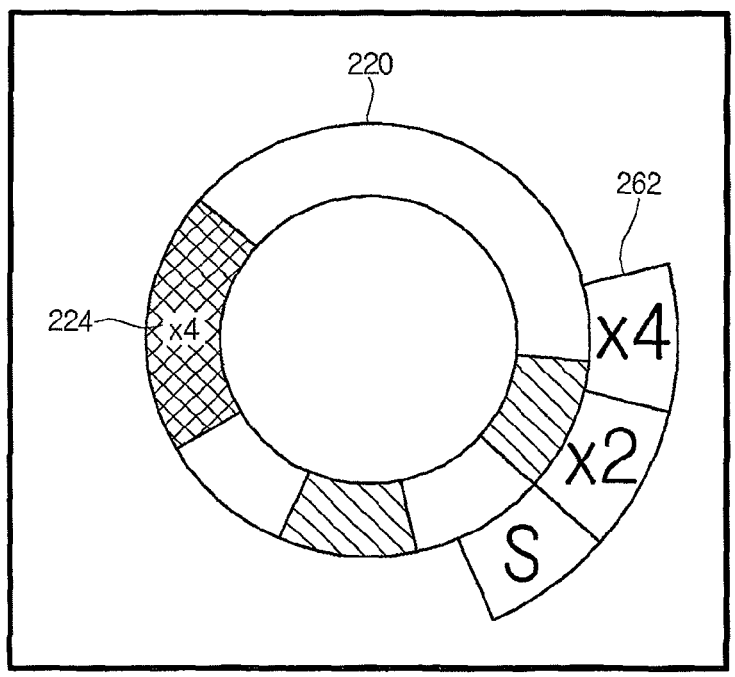

Referring to FIG. 52, when receiving from a user a user input for dragging the viewed section 224 of the displayed oval-type progressive bar 220 in a still screen where a video is not played and dropping it on a button for the 4× playback of the playback setting menu 262, the control unit 180 can be set to play the dragged and dropped viewed section 244 at 4× speed. Then, the control unit 180 can display "×4" on the viewed section 224 of the oval-type progressive bar 223.

Figure 53:
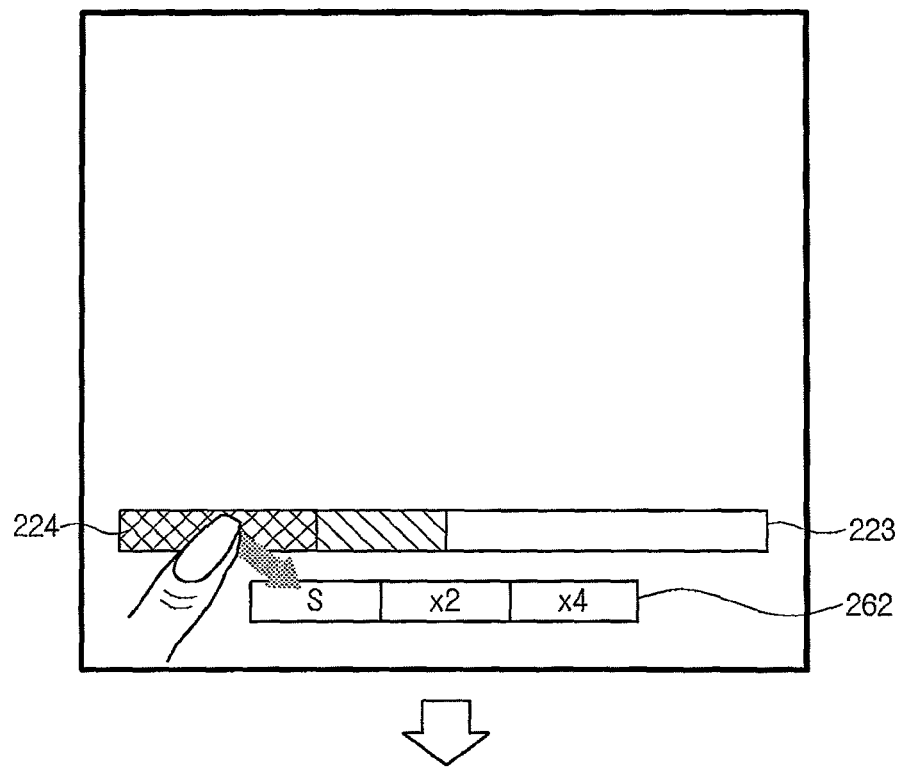
FIGS. 53 and 54 are overviews illustrating a playback setting according to another embodiment of the present invention.
Figure 53:
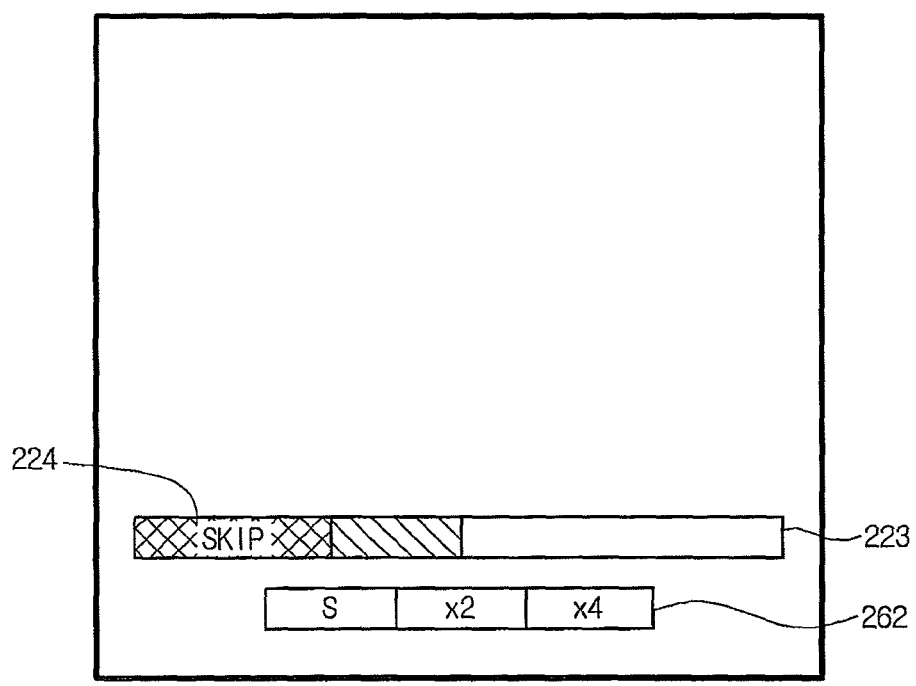
Figure 54:
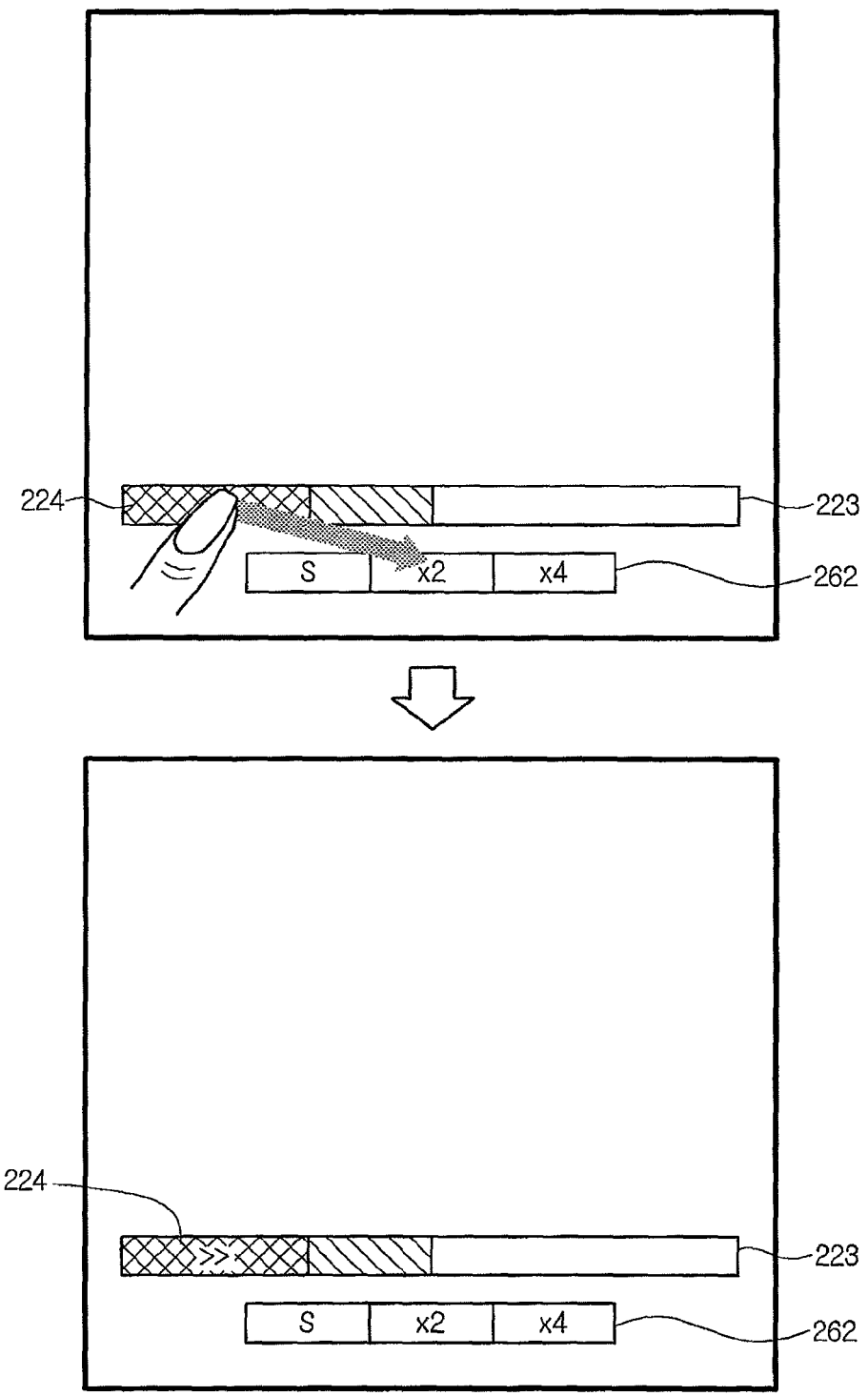

According to another embodiment of the present invention, referring to FIG. 53, when receiving a user input for dragging the viewed section 224 of the bar-type progressive bar 223 and dropping it on a button for the skip of the playback setting menu 262, the control unit 180 can be set to skip the dragged and dropped viewed section 244 and play a video. Then, the control unit 180 can display "SKIP" on the viewed section 224 of the bar-type progressive bar 223.

Furthermore, the control unit 180 can display symbols other than numbers or characters for a playback set section. For example, as shown in FIG. 54, the control unit 180 can display the 2× speed playback set viewed section 224 of the bar-type progressive bar 223 with a speed symbol. According to another embodiment of the present invention, when receiving a user input for selecting a partial section of the displayed oval-type progressive bar 220 and moving it to the oval outside of the oval-type progressive bar 220, the control unit 180 can be set to skip the selected partial section and play a video.

Figure 55:
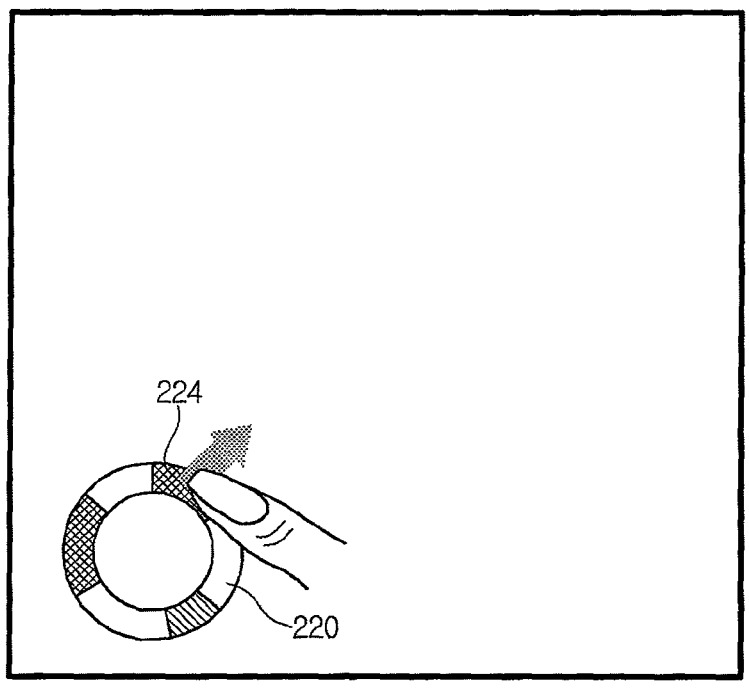
FIGS. 55 and 56 are overviews illustrating a playback setting according to another embodiment of the present invention.
Figure 55:
Figure 55:
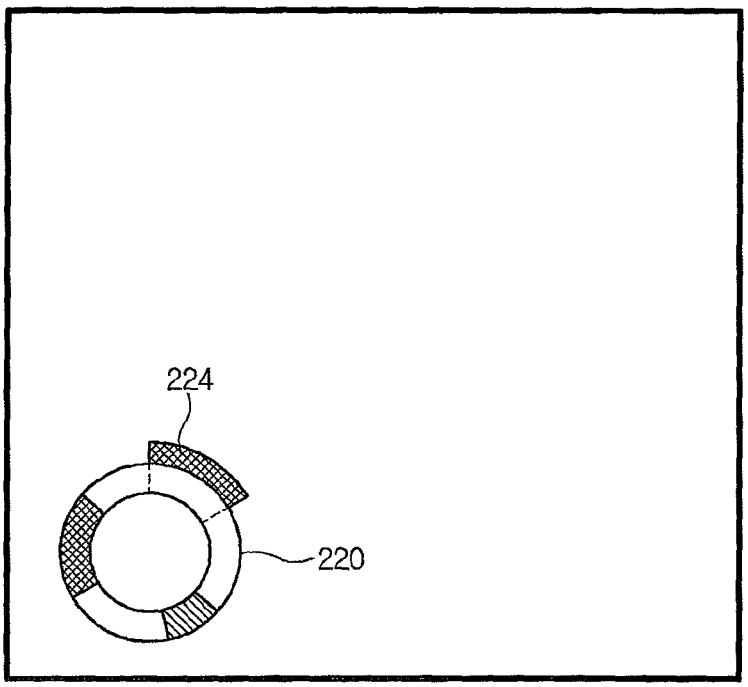

Referring to FIG. 55, when receiving a user input for touching the viewed section 224 of the displayed oval-type progressive bar 220 and flicking it toward the oval outside direction of the oval-type progressive bar 220, the control unit 180 can be set to skip the viewed section 224 and play a video.

Figure 56:
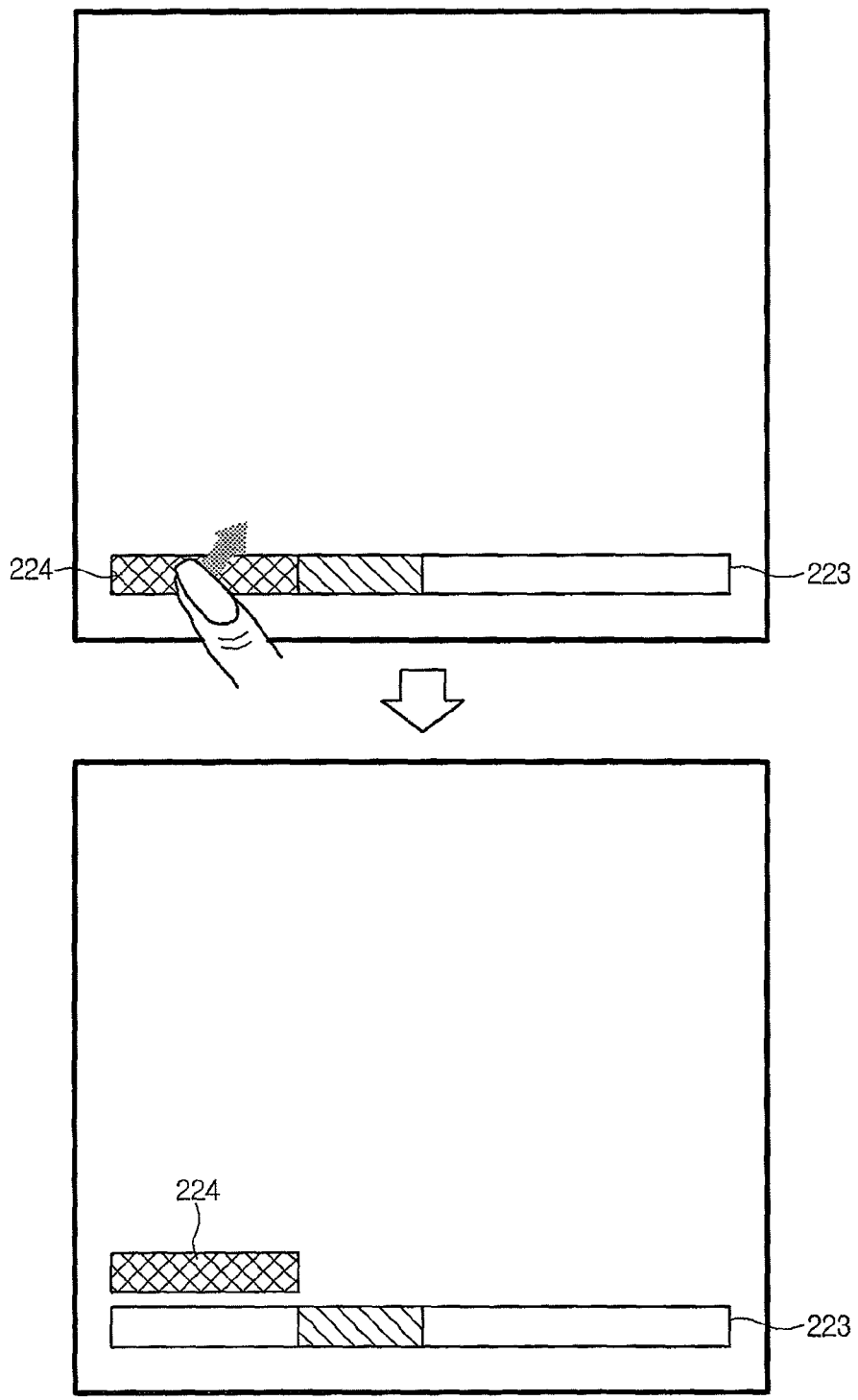

Referring to FIG. 56, when receiving a user input for touching the viewed section 224 of the displayed bar-type progressive bar 223 and flicking it in a diagonal direction of the bar-type progressive bar 223, the control unit 180 can be set to skip the viewed section 224 and play a video.

Next, FIG. 10 is a flowchart illustrating when the mobile terminal 100 terminates the display of a progressive bar according to an embodiment of the present invention. Referring to FIG. 10, if not receiving a user input for a predetermined time (Yes in S174), the control unit 180 removes the displayed oval-type progressive bar 220 (S176). Then, the control unit 180 returns to a full screen playing a video when the video is being played or returns to a full screen displaying a selected video in the case of a still screen where a video is not played (S178).

According to another embodiment of the present invention, when streaming video, the mobile terminal 100 can display information on the streaming video in the oval-type progressive bar 220. Then, the mobile terminal 100 can display information on whether a user views a video and information on streaming video together or may display only information on streaming video.

Herein, the information on streaming video may include information on a section that a user views more than a predetermined value and information on a section that a user skips more than a predetermined value. This will be described with reference to FIGS. 57 and 58.

Figure 57:
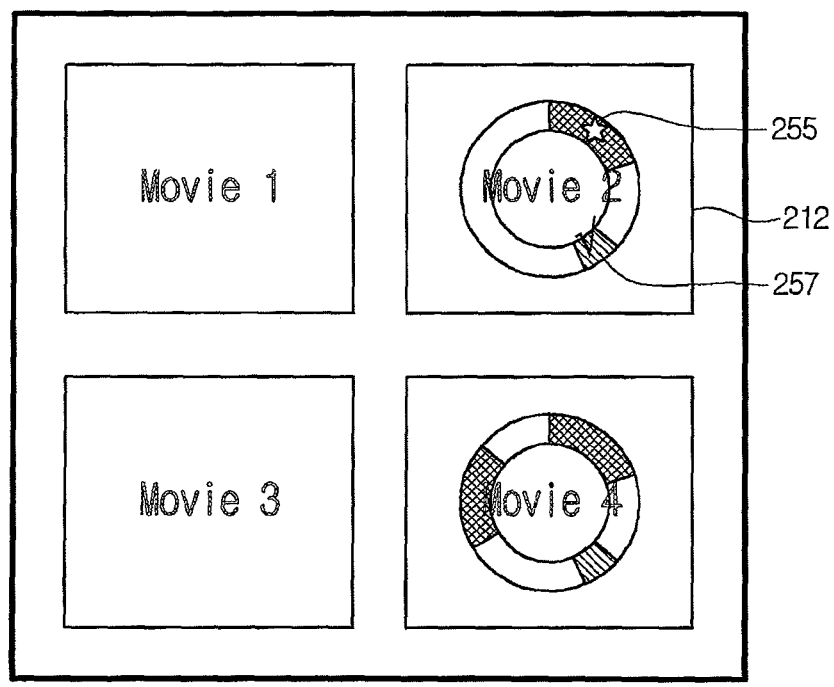
FIGS. 57 and 58 are overviews illustrating a playback list display for streaming video according to an embodiment of the present invention.

As shown in FIG. 57, the control unit 180 can display a playback list 212 on a plurality of streaming videos. Then, the control unit 180 can display information on each streaming video in the oval-type progressive bar 220. For example, the control unit 180 can display a section at which a user views streaming video more than a predetermined value, including a star-shaped indicator 255. Then, the control unit 180 can display a section at which a user skips streaming video more than a predetermined value, including a check mark-shaped indicator 257.

Figure 58:
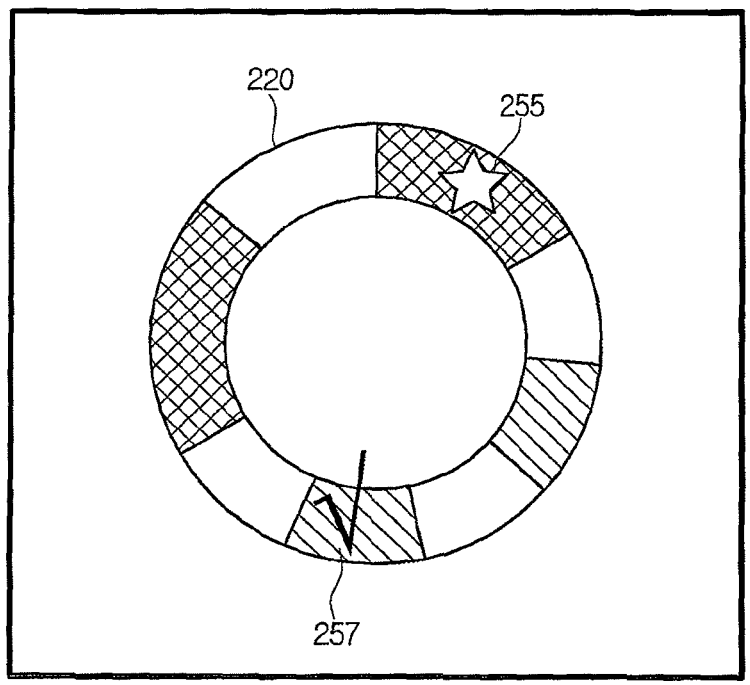

Additionally, as shown in FIG. 58, when displaying the oval-type progressive bar 220 for at least one streaming video, the control unit 180 can display the information on streaming video in the oval-type progressive bar 220. Further, the mobile terminal 100 can receive an input for a user's playback time setting and then perform a playback setting of a partial section of a video based on the input playback time. Herein, the partial section of the video may correspond to one of a section not played by a user, a section played and viewed by a user, and a section played but not viewed by a user.

In more detail, the control unit 180 can receive a playback time, that is, a time for playing a video, from a user and perform a playback setting on a not played section, a viewed section, a not viewed section of the video based on the input playback time. Herein, the playback setting menu may include at least one of a setting for video skip and a setting for video playback speed.

This will be described with reference to FIGS. 59 to 62. In particular, FIG. 59 is a flowchart illustrating a video playback setting operation of the mobile terminal 100 according to an embodiment of the present invention. Referring to FIG. 59, the control unit 180 receives a user input for playback setting on video playback (S210). The control unit 180 can receive a user input for setting on a skip for a partial section or an entire section of a video and a playback speed.

When receiving a user input for video playback setting, the control unit 180 displays a total playback time of a video (S230). When receiving a user input for video playback setting, the control unit 180 displays a total playback time, that is, a time consumed when a video is played at 1x speed. For example, as shown in FIG. 60, the control unit 180 can display a time consumed when a video is played at 1× speed. The control unit 180 receives a user input for a playback setting time (S250).

Figure 61:
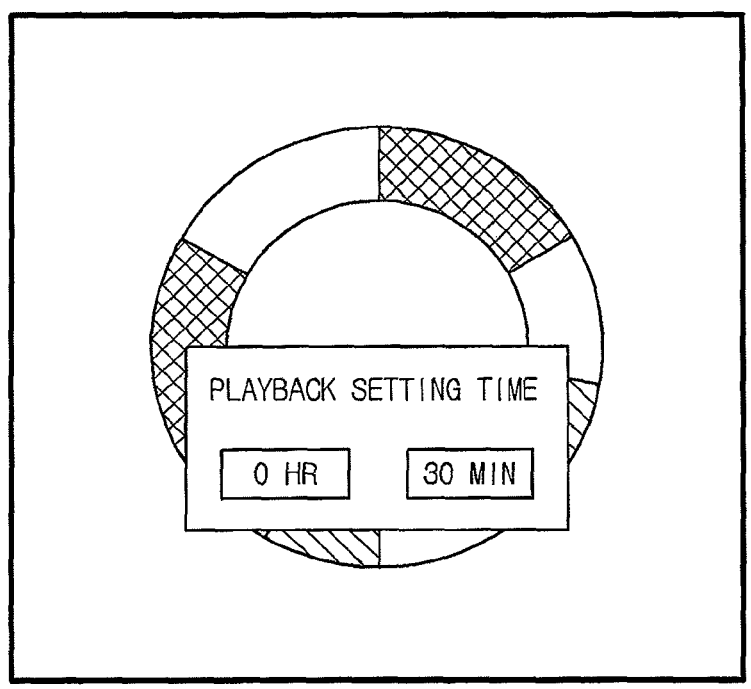

The control unit 180 receives a user input for playback setting time for video playback. For example, as shown in FIG. 61, the control unit 180 can receive a user input for playback setting time through a pop-up window for inputting a playback setting time. The control unit 180 performs a playback setting on video based on a user input for playback setting time (S270). The control unit 180 can perform a playback setting on video based on information on whether a user views a video and a user input for playback setting time.

For example, when a playback setting time that a user inputs is shorter than a total playback time consumed when a video is played at 1× speed, the control unit 180 can set a section that a user views to be played at a speed faster than 1× speed. Then, the control unit 180 can set a section not played by a user and a section not viewed by a user to be played at 1× speed.

Figure 62:
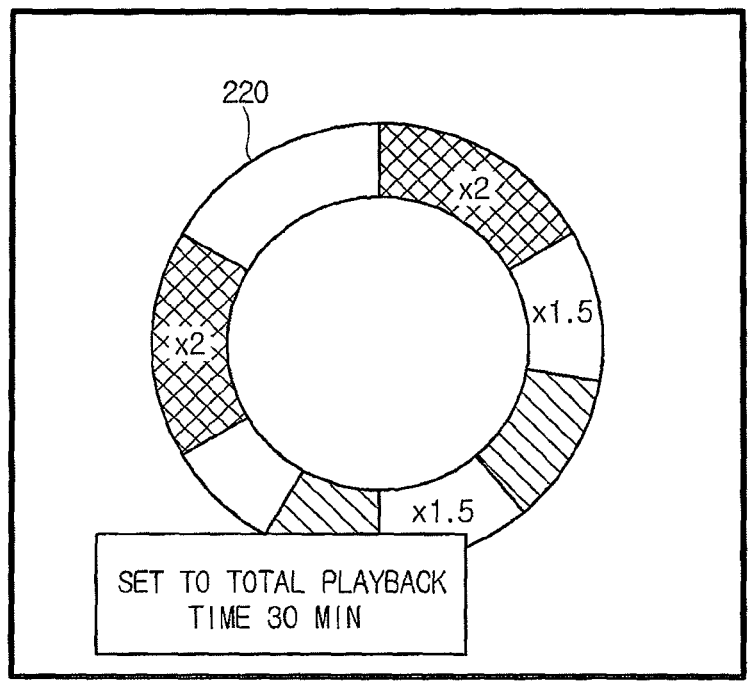

The control unit 180 displays setting contents on the performed playback setting (S290). The control unit 180 can display playback setting contents on video with respect to an entire or part of a section of a video. For example, as shown in FIG. 62, the control unit 180 can display a pop-up window for a set total playback time. Then, the control unit 180 can display a speed set for each section of the oval-type progressive bar 220.

Hereinafter, an operating method of a terminal according to another embodiment of the present invention will be described with reference to FIGS. 63 to 90. In particular, FIGS. 63 and 64 are flowcharts illustrating an operating method of a terminal according to an embodiment of the present invention.

Figure 63:
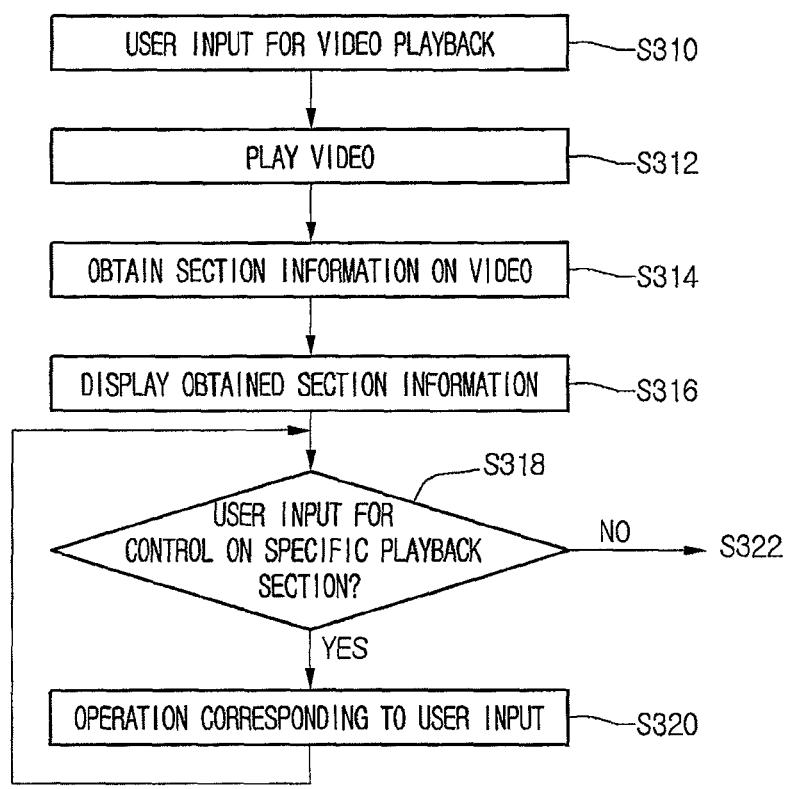
FIGS. 63 and 64 are flowcharts illustrating an operating method of a terminal according to another embodiment of the present invention.
Figure 64:
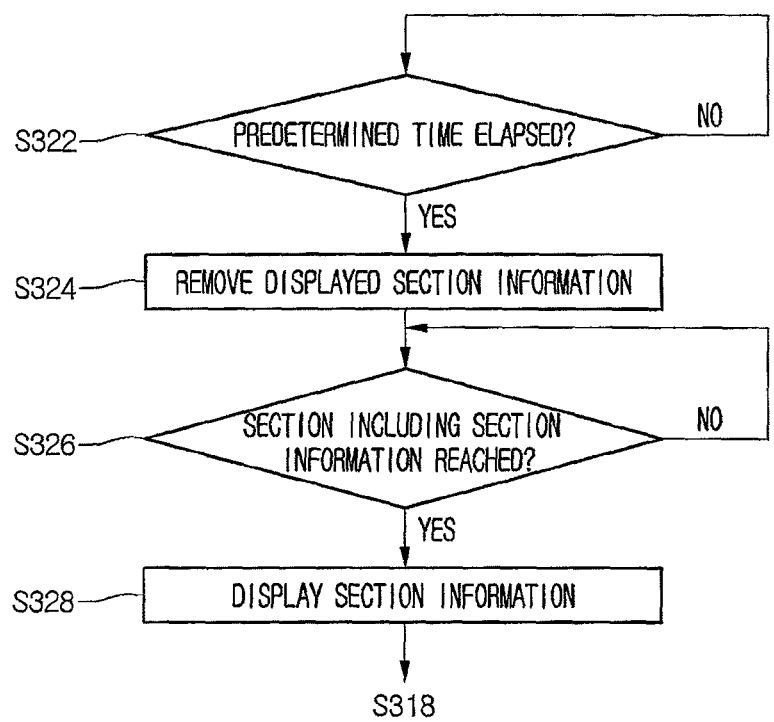

Referring to FIG. 63, the control unit 180 receives a user input for video playback from a user (S310). The control unit 180 can receive a user's touch input for video playback through the touch sensor. Additionally, the control unit 180 can receive a user input for video playback through an external input device such as a keypad or a mouse.

Herein, the video may be a video stored in the memory 160 of the mobile terminal 100 or a video according to a broadcast signal received through the broadcast reception module 111. Additionally, the video may be received through the wireless internet module 113 or the short range communication module 114.

The control unit 180 plays a video in response to a user input for playing video (S312). For example, the control unit 180 can play a video that a user selects in full screen in response to a user input. Therefore, the control unit 180 can display a played video through the display unit 151.

The control unit 180 obtains section information on a video being played (S314). The control unit 180 can obtain feature information on a video based on at least one of image and sound of a video from the video being played. For example, the control unit 180 can obtain feature information on a video based on at least one of image and sound of a video from the video being played.

The control unit 180 can obtain feature information on a video through EPG information on a video being played. Additionally, the control unit 180 can obtain feature information on a video through automatic contents recognition on a video being played.

The control unit 180 can identify a playback section including a feature obtained from an entire playback section of a video. Accordingly, the control unit 180 can identify a playback section including one of a plurality of features from an entire playback section. Then, the control unit 180 can obtain section information on a video on the basis that a playback section including one of a plurality of feature information is divided in an entire playback section. For example, the control unit 180 can obtain feature information by dividing an entire playback section into playback sections including features on characters, backgrounds, places, voices, and background music of a video.

The control unit 180 displays the obtained section information on the video in a progressive bar form (S316). The control unit 180 can display the obtained section information on the video on the display unit 151. In more detail, the control unit 180 can identify a playback section including each feature among the plurality of obtained features for a video.

Additionally, the control unit 180 can identify and display a playback section including the feature of a video in the entire playback section based on the obtained section information on the video. Then, the control unit 180 can identify and display a playback section including one of the plurality of features by each feature in the entire playback section based on the plurality of obtained section information on the video.

For example, the control unit 180 can display the obtained section information on the video in a progressive bar form. The control unit 180 can display the plurality of obtained section information on the video in one progressive bar. In more detail, the control unit 180 can display the obtained section information on the video in a three-dimensional progressive bar 300. The control unit 180 can display one of section information for each obtained feature of a video on each side of the three-dimensional progressive bar 300 and each of section information displayed on each side of the three-dimensional progressive bar 300 may be one of different features of one video.

Then, the control unit 180 can identify a section including one of a plurality of features in an entire playback section of a video and may then display it. Accordingly, the control unit 180 can display an entire section of a video on the left end to right end of each side of the three-dimensional progressive bar 300 and may display a section including one of a plurality of features on each side of the three-dimensional progressive bar 300 separately.

For example, the control unit 180 can distinguish a playback section including the feature of a video in one side from a section including no feature of the video by each side of the three-dimensional progressive bar 300 and may then display it. The control unit 180 can display a playback section including the feature of a video in one side of the three-dimensional progressive bar 300 and a section including no feature differently in terms of at least one of color, contrast, and three-dimensional effect.

This will be described with reference to FIGS. 65 to 69. FIGS. 65 to 69 are overviews illustrating a progressive bar 300 displaying section information according to another embodiment of the present invention. The control unit 180 can display section information on a video in a progressive bar by dividing an entire playback section into playback sections including the feature of a video.

Figure 65:
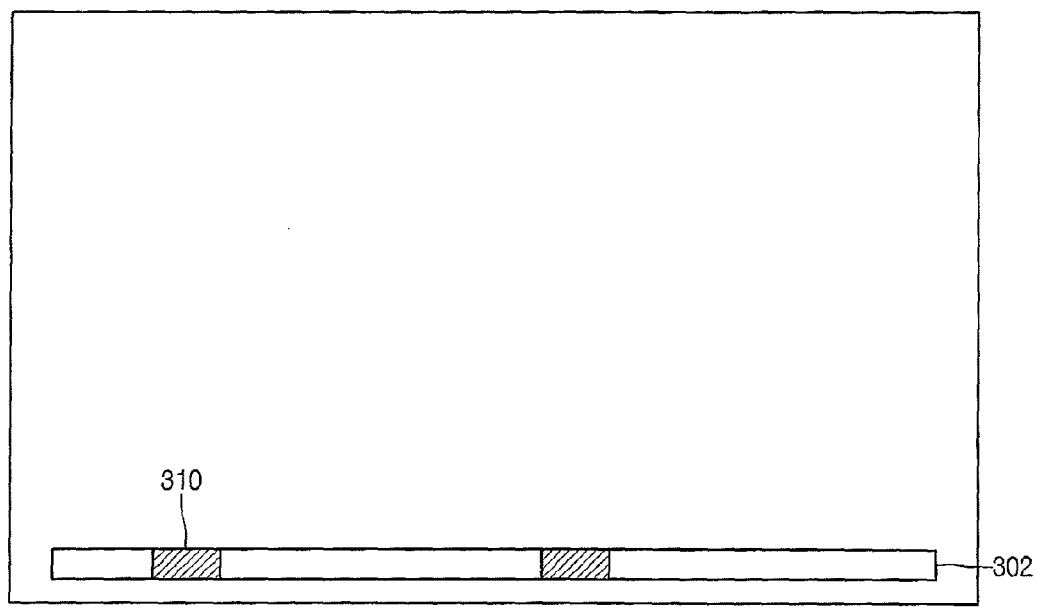
FIG. 65 is an overview illustrating a section information display of a terminal according to another embodiment of the present invention.

Referring to FIG. 65, the control unit 180 can identify a playback section 310 including a first feature in a progressive bar 302 for an entire playback section and may then display it. Additionally, the control unit 180 can display section information in the three-dimensional progressive bar 300 capable of displaying section information on a plurality of features.

Figure 66:
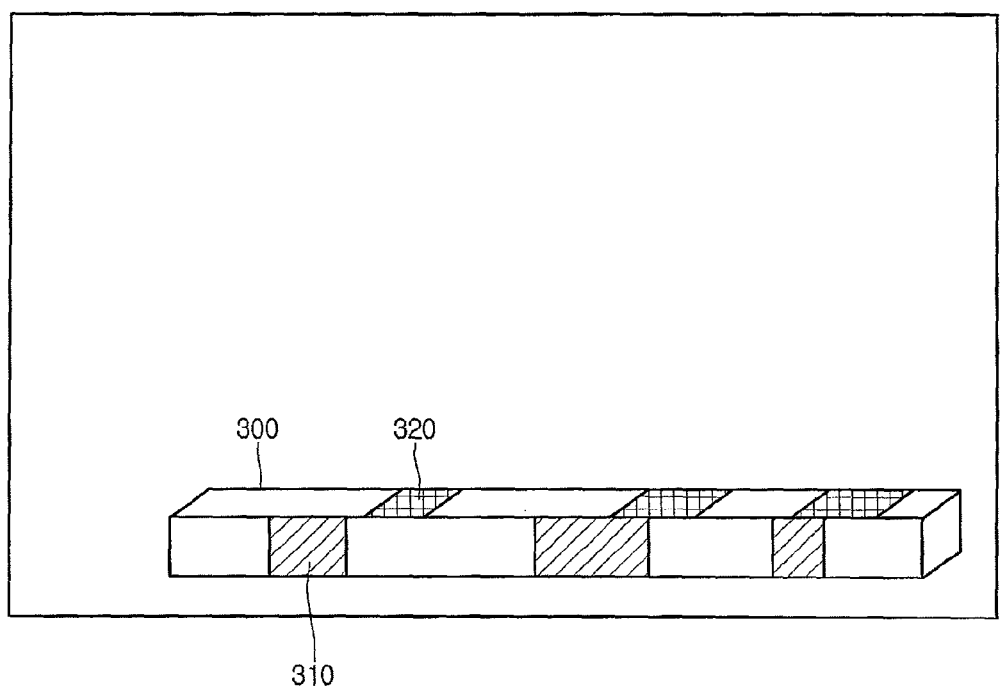
FIGS. 66 to 69 are overviews illustrating a progressive bar displaying section information according to another embodiment of the present invention.

Referring to FIG. 66, since one section information is displayed on each side of the three-dimensional progressive bar 300, the control unit 180 can display a playback section 310 (hereinafter referred to as a "first feature section") including a first feature in the entire playback section of a video on one side of the three-dimensional progressive bar 300 and can display a playback section 320 (hereinafter referred to as a "second feature section") including a second feature in the entire playback section of the video on another side. Herein, the first feature and the second feature may be different from each other.

Figure 67:
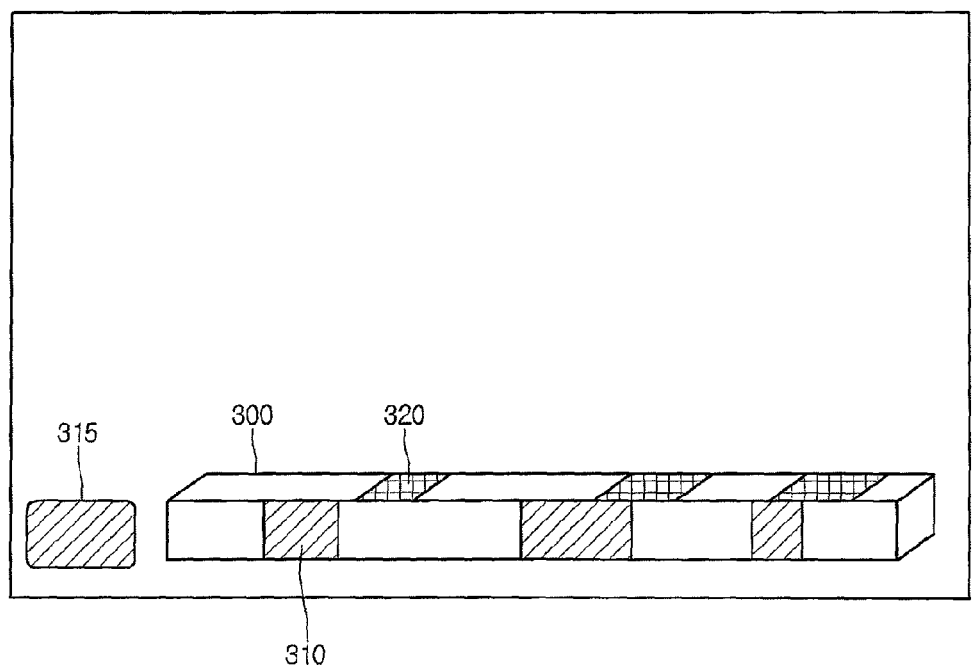

Additionally, the control unit 180 can display an information window representing a feature displayed on each side of the three-dimensional progressive bar 300. In more detail, the control unit 180 can display an information window for a feature that each side of the three-dimensional progressive bar 300 represents, with respect to each side. For example, as shown in FIG. 67, the control unit 180 can display an information window 315 representing the feature on a side displayed at the front of a full screen among a plurality of sides of the three-dimensional progressive bar 300.

Figure 68:
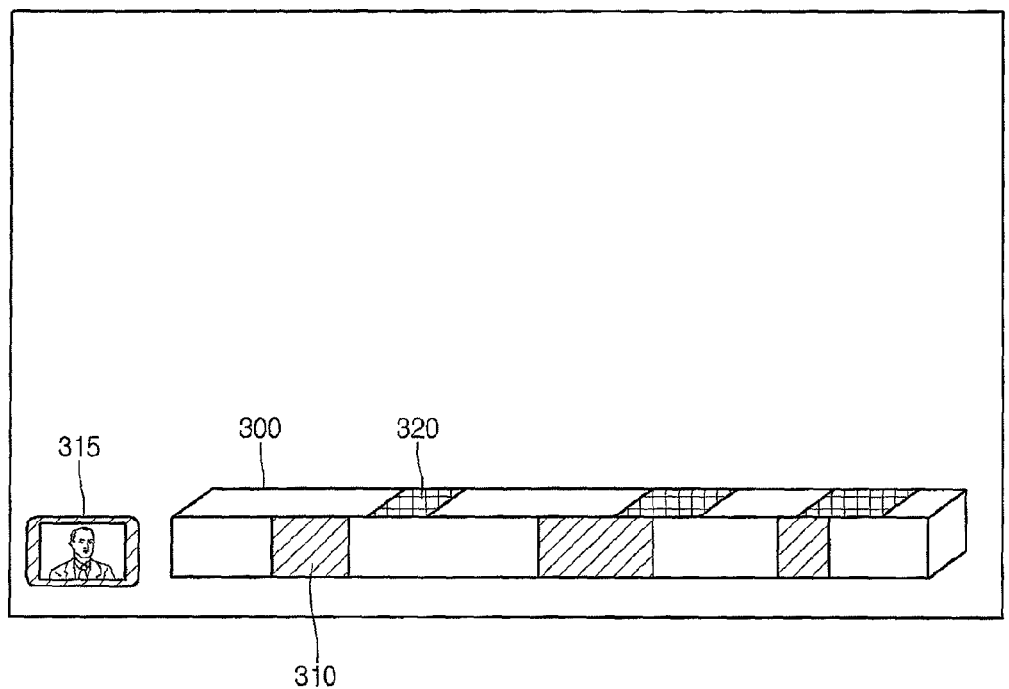

In more detail, referring to FIG. 68, when the first feature of the three-dimensional progressive bar 300 is information on the appearance of a character X, the control unit 180 can display the face of the character X. Then, the control unit 180 can distinguish a playback section displaying the character X from a section not displaying the character X in the entire playback section of a video and may then display it on a side where the first feature of the three-dimensional progressive bar 300 is displayed.

Figure 69:
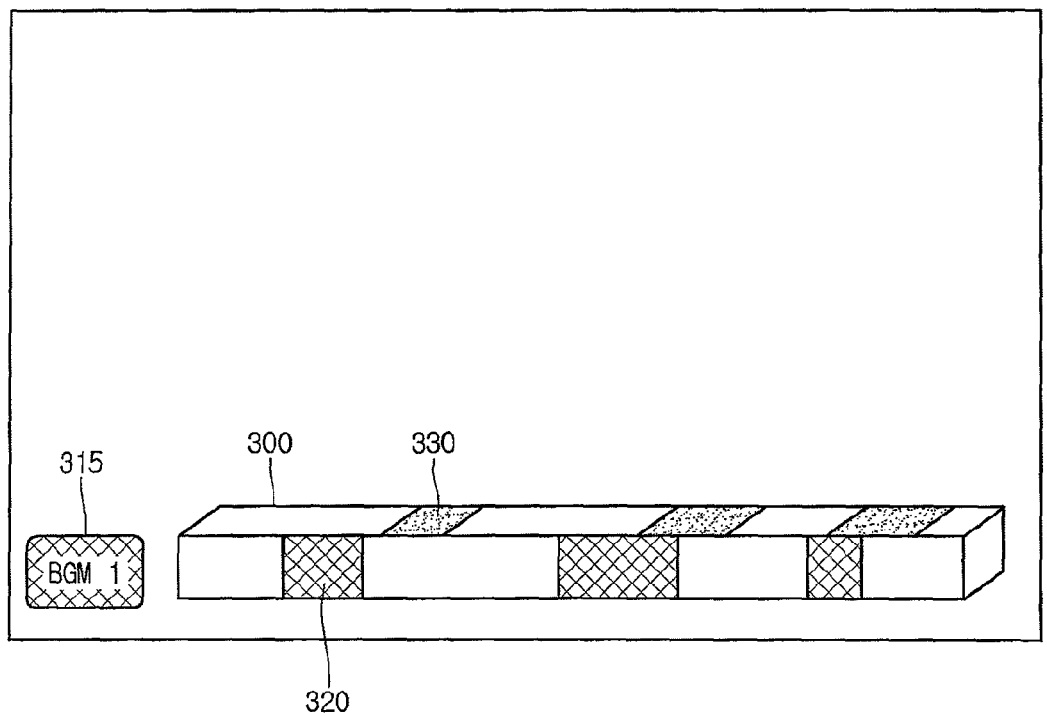

According to another embodiment of the present invention, referring to FIG. 69, when the second feature of the three-dimensional progressive bar 300 is information on background music BGM1, the control unit 180 can display the song title of the background music BGM1 on the information window 315. Then, the control unit 180 can distinguish a playback section outputting the background music BGM1 from a section not outputting the background music BGM1 in the entire playback section of a video and may then display it on a side where the second feature of the three-dimensional progressive bar 300 is displayed.

Moreover, the control unit 180 can display the displayed information window 315 for a predetermined time or may display it while the three-dimensional progressive bar 300 is displayed. The control unit 180 can also display a playback indicator 380 displaying a progress section of a video being played in the three-dimensional progressive bar 300. The playback indicator 380 will be described with reference to FIG. 70.

Figure 70:
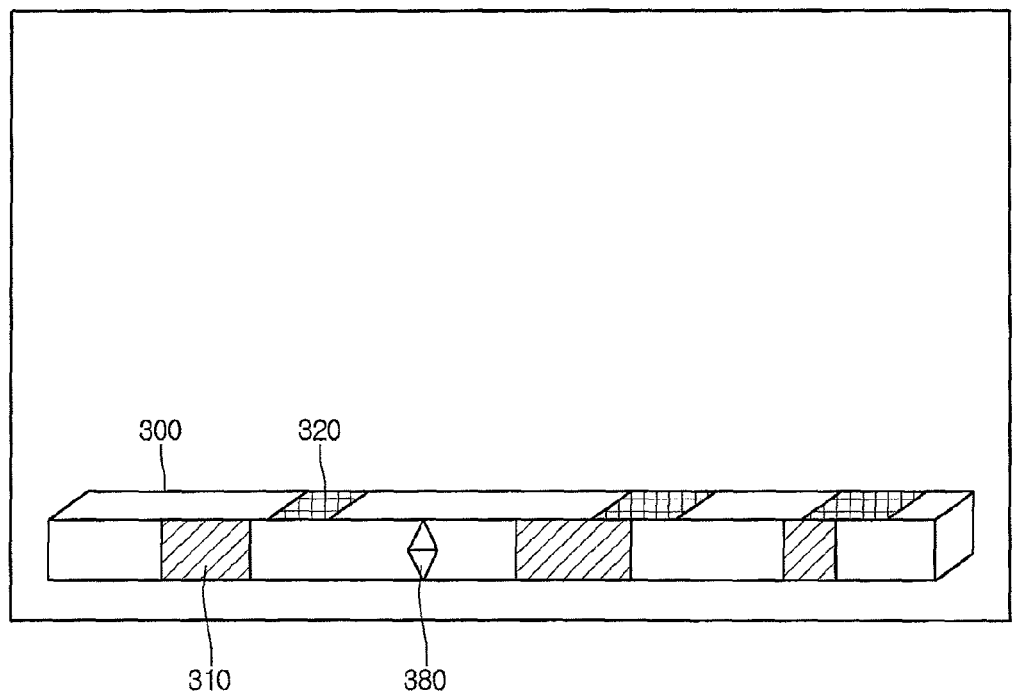
FIGS. 70 to 72 are overviews illustrating a playback indicator according to another embodiment of the present invention.

In particular, FIG. 70 is an overview illustrating the playback indicator 380 according to another embodiment of the present invention. Referring to FIG. 70, the control unit 180 can display a progress section of a video being played on a side representing the first feature, that is, one side of the three-dimensional progressive bar 300, as the playback indicator 380.

Additionally, the control unit 180 can display the viewing rating of a progress section of a video through the playback indicator 380. For example, the control unit 180 can display different colors of the playback indicator 380 according to the viewing rating of a progress section of a video.

In more detail, if the viewing rating of a progress section of a video is general audience, the control unit 180 can display the playback indicator 380 with green color. In more detail, if the viewing rating of a progress section of a video is 15 or older, the control unit 180 can display the playback indicator 380 with yellow color. In more detail, if the viewing rating of a progress section of a video is 19 or older, the control unit 180 can display the playback indicator 380 with red color.

Additionally, the control unit 180 can display the number of playbacks of a progress section of a video through the playback indicator 380. For example, the control unit 180 can display different colors or contrasts of the playback indicator 380 according the number of playbacks of a progress section of a video.

According to an embodiment of the present invention, when the number of playbacks of a progress section of a video is increased, the control unit 180 can display the contrast of the playback indicator 380 darker in proportion to the increased number of playbacks.

According to another embodiment of the present invention, if a section in progress is a section played first, the control unit 180 can display the playback indicator 380 with white color. When the number of playbacks of a corresponding section is more than a first reference value, the control unit 180 can display the playback indicator 380 with gray color. When the number of playbacks of a corresponding section is more than a second reference value, the control unit 180 can display the playback indicator 380 with black color.

Figure 71:
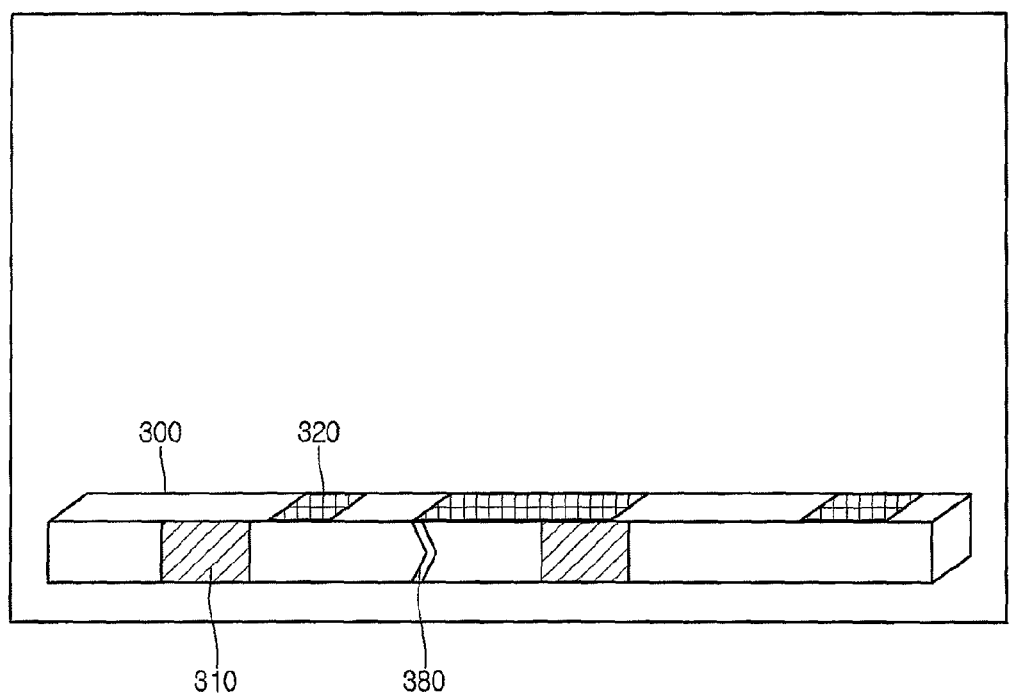
Figure 72:
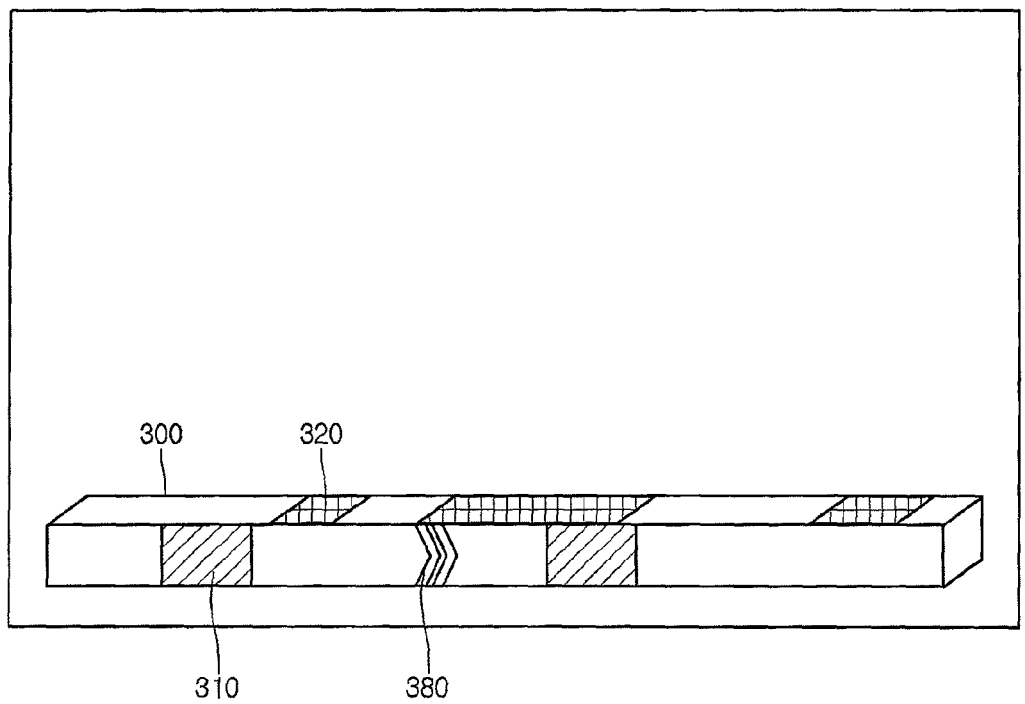

Additionally, the control unit 180 can display the playback speed of a video through the playback indicator 380. In more detail, the control unit 180 can divide the playback speed of a video in the form of the playback indicator 380 and may then display it. This will be described with reference to FIGS. 71 and 72. In particular, FIGS. 71 and 72 are overviews illustrating the playback indicator 380 according to another embodiment of the present invention. Referring to FIG. 71, when a current video is being played at 1× speed, the control unit 180 can display the playback indicator 380 as a one arrow form.

Then, referring to FIG. 72, when a current video is being played at 2× speed, the control unit 180 can display the playback indicator 380 as a two arrows form. Additionally, the control unit 180 can display other section information other than section information displayed in a progressive bar through the playback indicator 380.

Figure 73:
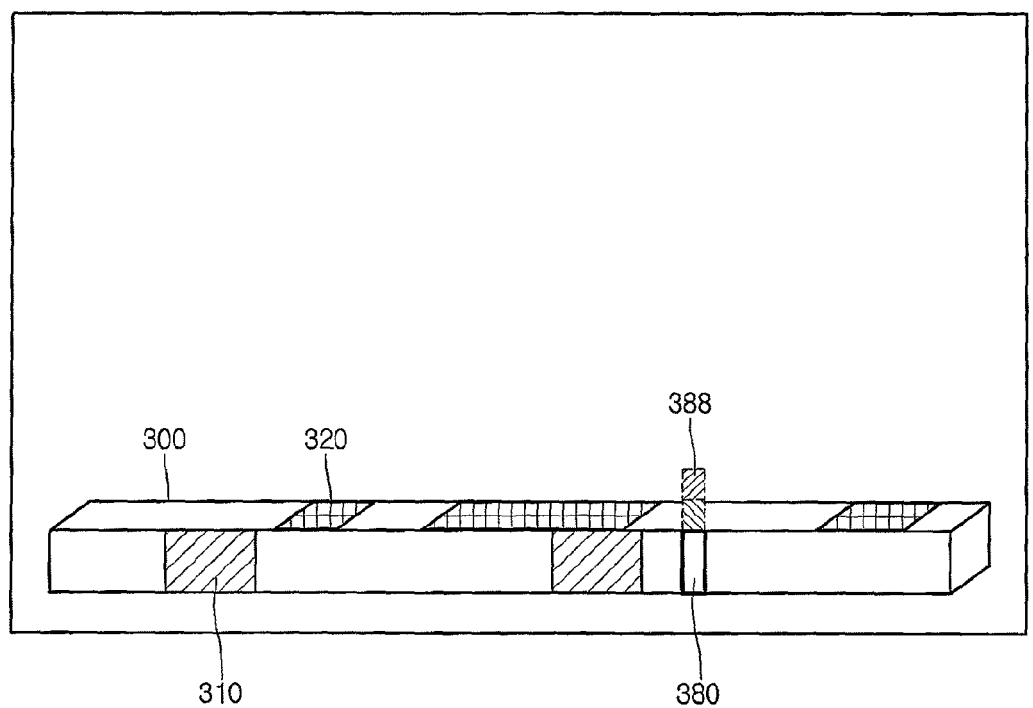
FIG. 73 is an overview illustrating an extension of a playback indicator according to another embodiment of the present invention.

This will be described with reference to FIG. 73. In particular, FIG. 73 is an overview illustrating an extension of the playback indicator 380 according to another embodiment of the present invention. Referring to FIG. 73, the control unit 180 can display section information including other features other than a first feature section 310 including a first feature and a second feature section 320 including a second feature, which are displayed from the three-dimensional progressive bar 300, through a playback indicator extension unit 388.

Accordingly, when a playback section including other features other than the first feature and the second feature is in progress, the control unit 180 can display section information included in a section in progress through the playback indicator extension unit 388. According to another embodiment of the present invention, the control unit 180 can display user's preference and the number of playbacks for a specific section in the entire playback section of a video in a three-dimensional progressive bar 300.

Figure 74:
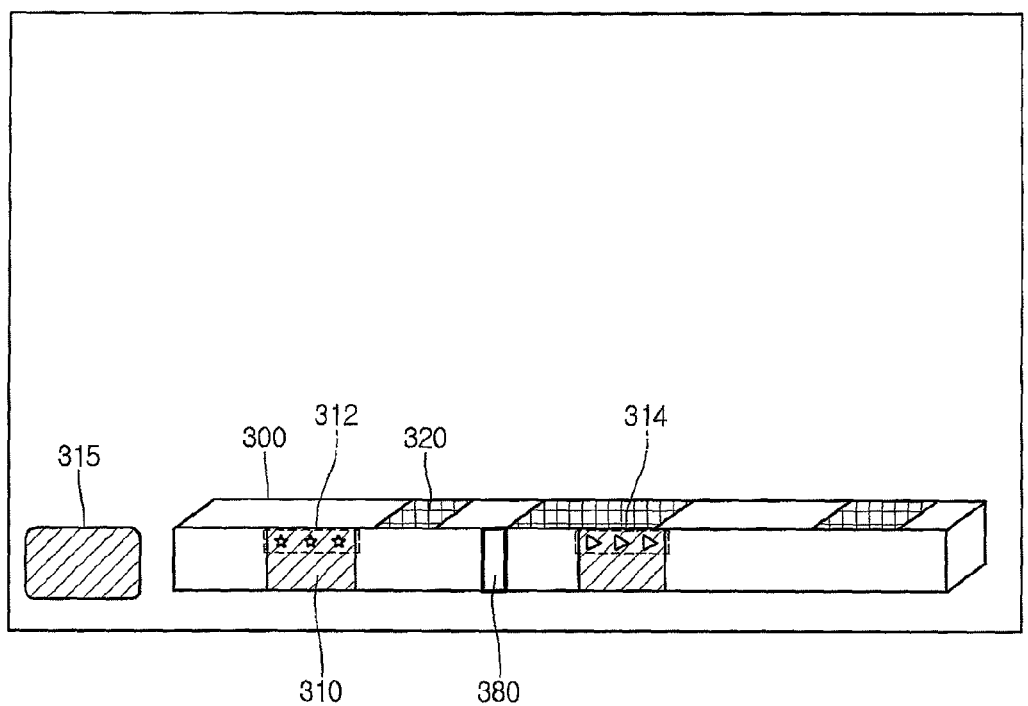
FIG. 74 is an overview illustrating a three-dimensional progressive bar according to another embodiment of the present invention.

This is described with reference to FIG. 74. In particular, FIG. 74 is an overview illustrating a three-dimensional progressive bar 300 according to another embodiment of the present invention. Referring to FIG. 74, the control unit 180 can display a user's preference for a specific section of a video being played as a star-shaped indicator 312 in the three-dimensional progressive bar 300. Accordingly, when a user's preference is higher, the control unit 180 can increase the number of stars included in the star-shaped indicator 312 and may then display them.

Additionally, the control unit 180 can display the number of user's playbacks for a specific section of a video being played as a playback arrow form indicator 314 in the three-dimensional progressive bar 300. Accordingly, when the number of user's playbacks for a specific section of a video is larger, the control unit 180 can increase the number of playback arrows included in the playback arrow form indicator 314 and may then display them.

Returning again to FIG. 63, the control unit 180 receives a user input for control on displayed section information (S318). The control unit 180 can receive a user input for control on a section including section information from the three-dimensional progressive bar 300 displayed on the display unit 151 through the touch sensor. Additionally, the control unit 180 can receive a user input for controlling a video through an external input device such as a keypad or a mouse.

The control unit 180 performs a control operation corresponding to the input user input on the displayed section information (S320). The control unit 180 can perform a control operation corresponding to the input user input on the section information displayed in the three-dimensional progressive bar 300. This will be described with reference to FIGS. 75 and 89. In The control unit 180 can move the displayed three-dimensional progressive bar 300 in correspondence to the input user input. In particular, FIG. 75 is an overview illustrating a movement of a three-dimensional progressive bar 300 according to another embodiment of the present invention.

Figure 75:
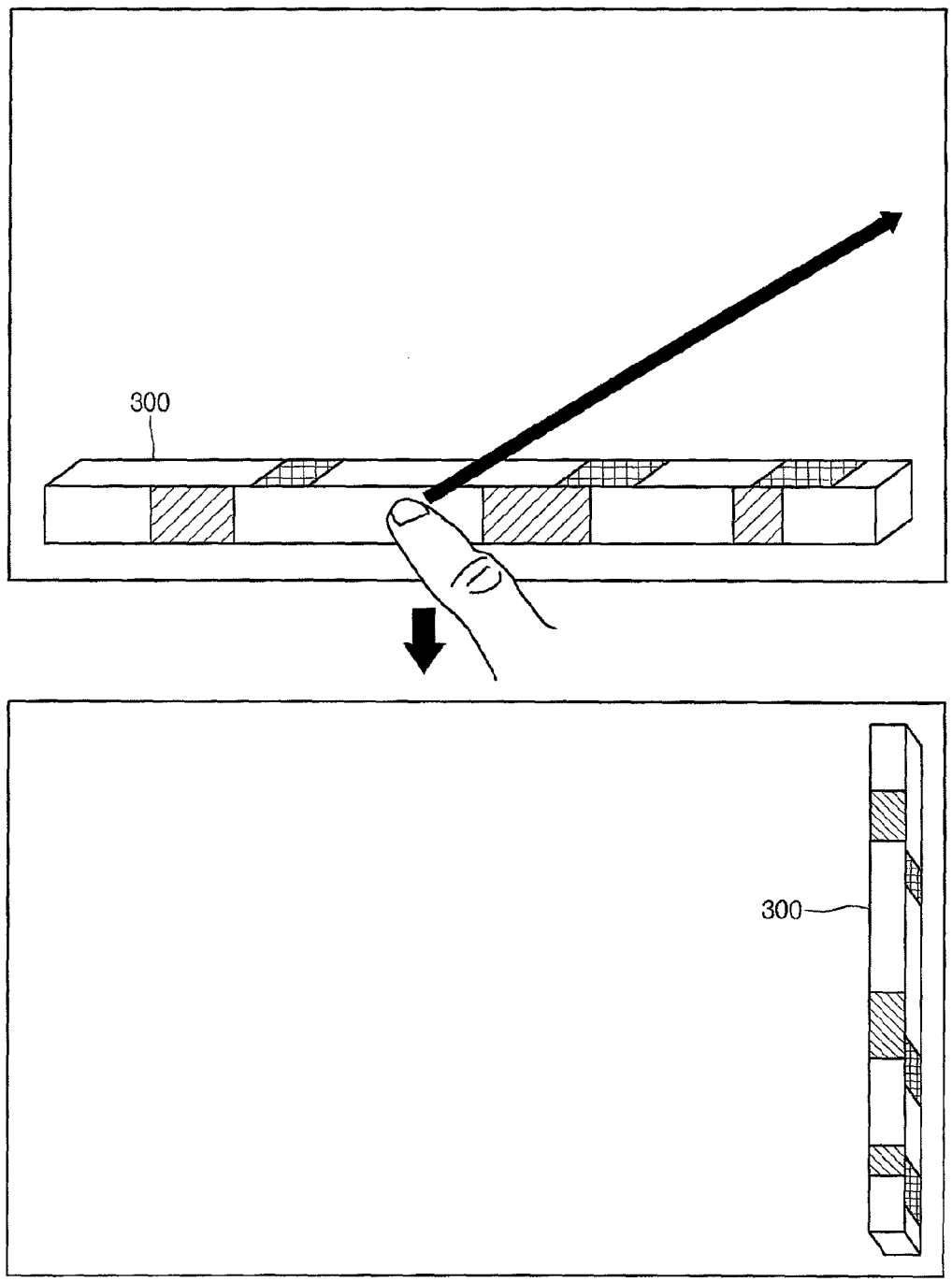
FIG. 75 is an overview illustrating a three-dimensional progressive bar according to another embodiment of the present invention.

For example, as referring to FIG. 75, when receiving a user's drag input for touching the three-dimensional progressive bar 300 and moving it to the right of a full screen, the control unit 180 can move the three-dimensional progressive bar 300 to the right of the full screen in corresponds to the user's drag input.

The control unit 180 can rotate the three-dimensional progressive bar 300 in correspondence to the user input. In more detail, when receiving a user input for touching the three-dimensional progressive bar 300 and flicking it in the upper or lower direction, the control unit 180 can rotate the three-dimensional progressive bar 300 in the flicking direction.

Figure 76:
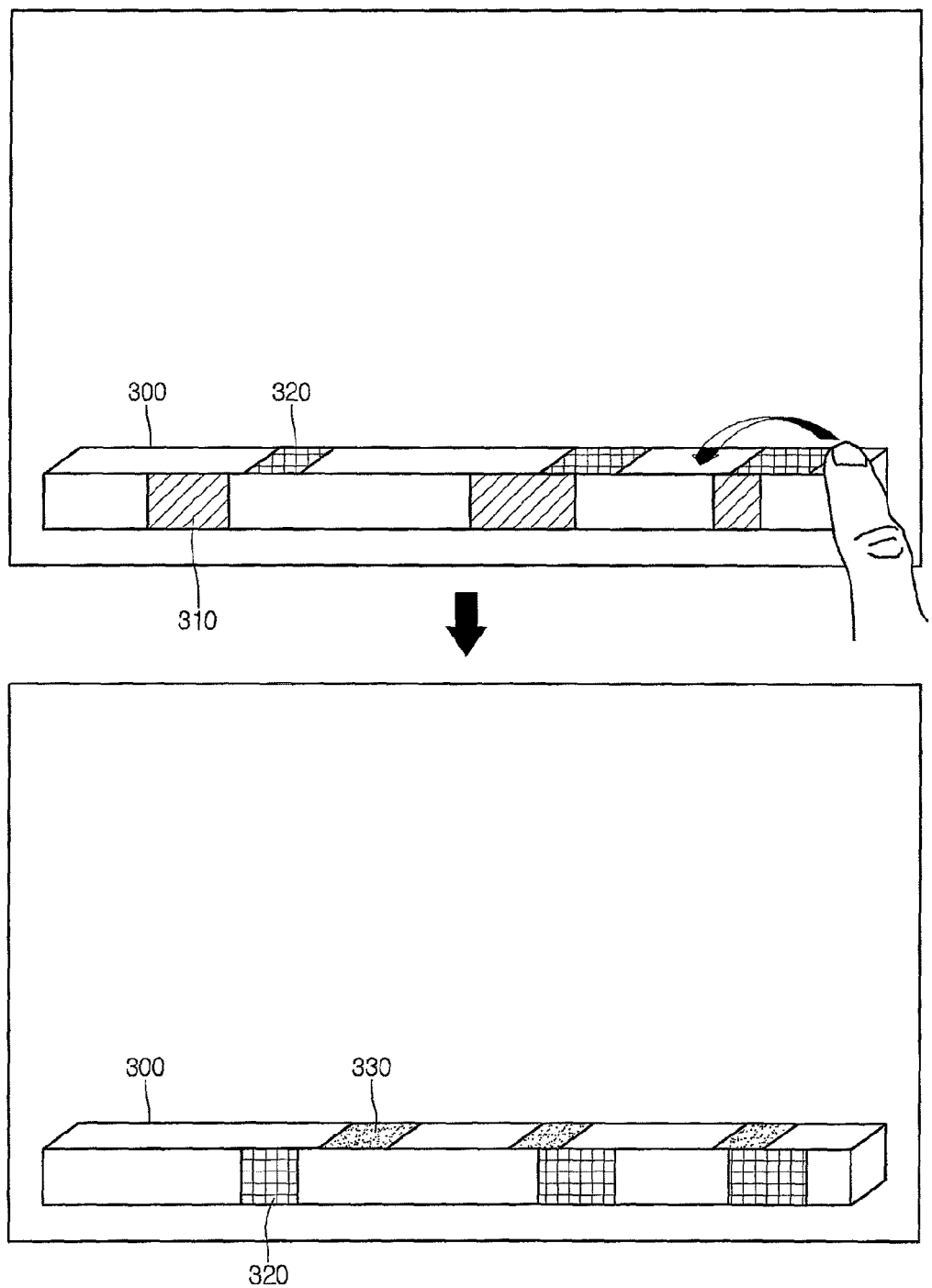
FIG. 76 is an overview illustrating a rotation of a three-dimensional progressive bar according to another embodiment of the present invention.

FIG. 76 is an overview illustrating a rotation of a three-dimensional progressive bar 300 according to another embodiment of the present invention. Referring to FIG. 76, when receiving a user input for touching the three-dimensional progressive bar 300 and flicking it a lower direction, the control unit 180 can rotate the three-dimensional progressive bar 300 displayed in full screen, so that a side for a first feature including a first feature section 310 and a side for a second feature including a second feature section 320 rotate.

Accordingly, the control unit 180 can display the side for the second feature including the second feature section 320 of the three-dimensional progressive bar 300 and a side for a third feature including a third feature section 330 in full screen. The control unit 180 can receive a user input for section information displayed in the three-dimensional progressive bar 300 and then extract an image file of a section including corresponding section information. For example, when receiving a user input for touching a partial section including section information and flicking it toward the lower direction from the three-dimensional progressive bar 300, the control unit 180 can extract an image file corresponding to the touched partial section.

Figure 77:
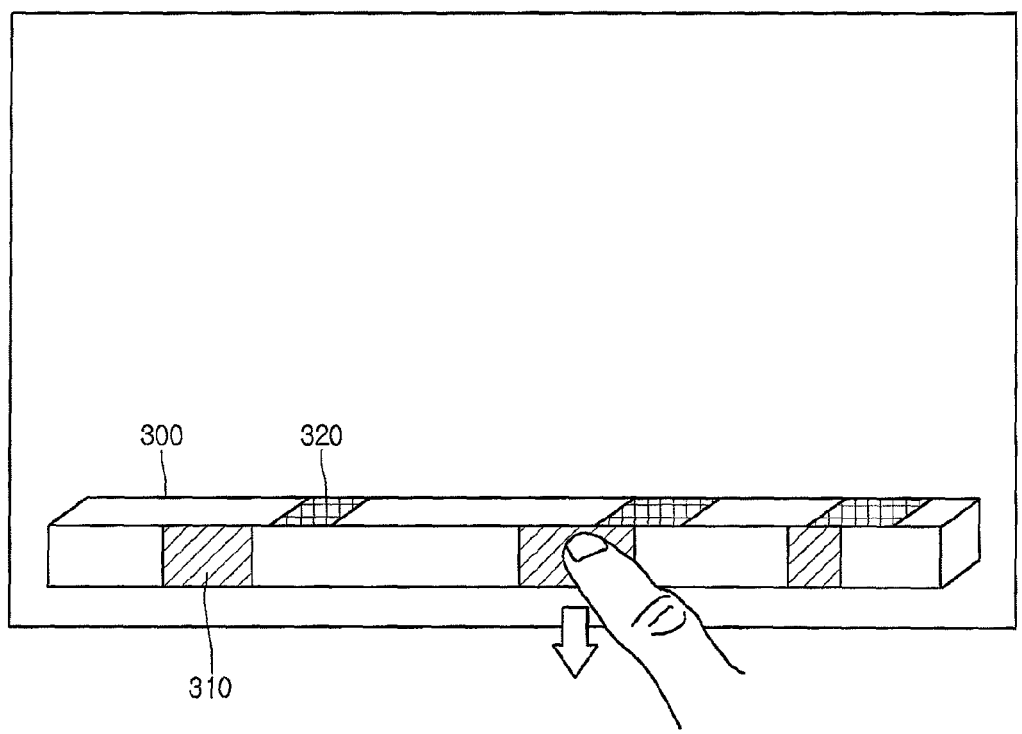
FIG. 77 is an overview illustrating an image file extraction operation on a partial section according to another embodiment of the present invention.

FIG. 77 is an overview illustrating an image file extraction operation on a partial section according to another embodiment of the present invention. Referring to FIG. 77, when receiving a user input for touching a section 310 including first feature information and flicking it toward the lower direction from the three-dimensional progressive bar 300, the control unit 180 can extract an image file of the first feature section 310.

The control unit 180 can receive a user input for a partial section displayed in the three-dimensional progressive bar 300 and may then play a preview image of a corresponding section. For example, when receiving a user input for touching a partial section including section information and flicking it toward the upper direction from the three-dimensional progressive bar 300, the control unit 180 can display a preview image for the touched partial section.

Figure 78:
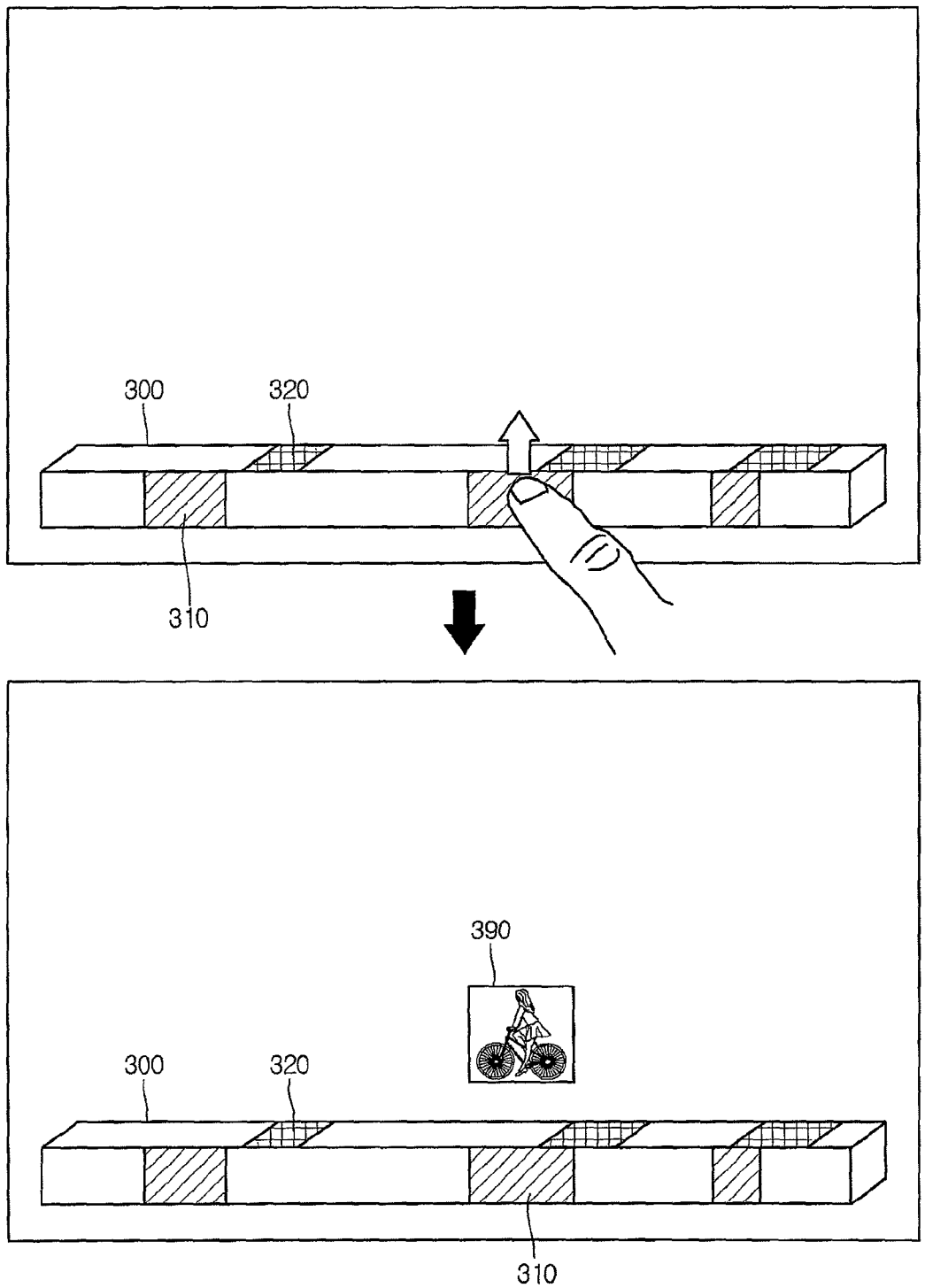
FIG. 78 is an overview illustrating a preview image display for a partial section according to another embodiment of the present invention.
Figure 79:
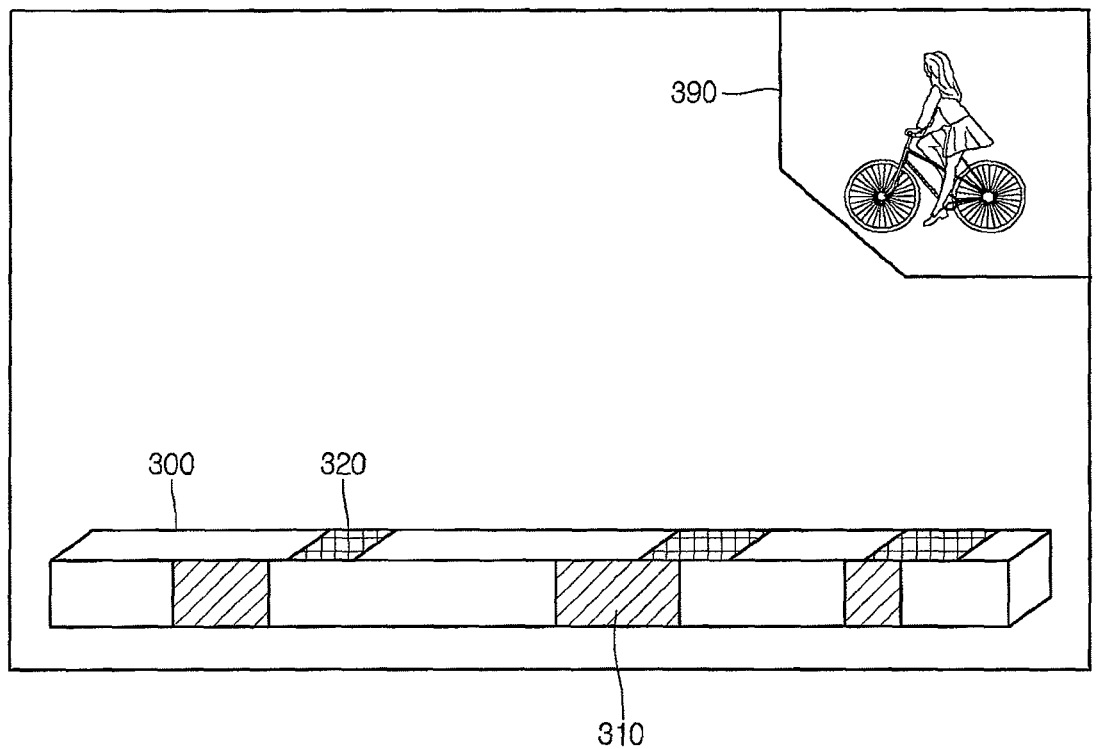
FIG. 79 is an overview illustrating a preview image display for a partial section according to another embodiment of the present invention.
Figure 80:
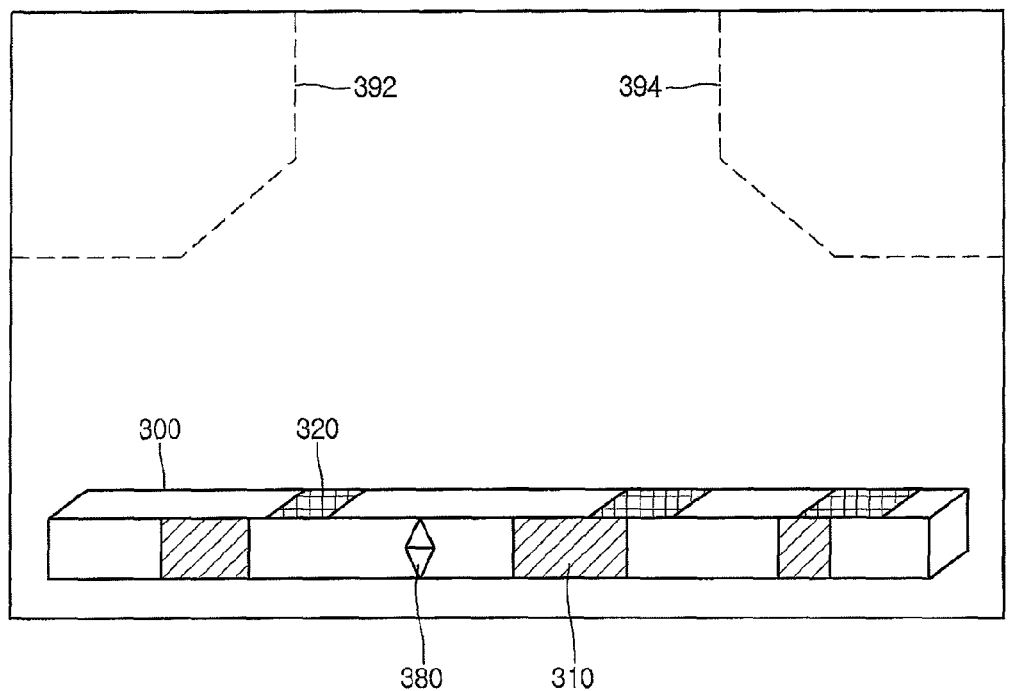
FIG. 80 is an overview illustrating a preview image display for a partial section according to another embodiment of the present invention.

FIG. 78 is an overview illustrating a preview image display for a partial section according to another embodiment of the present invention. Referring to FIG. 78, when receiving a user input for touching the first feature section 310 and flicking it toward the upper direction from the three-dimensional progressive bar 300, the control unit 180 can display a preview image 390 of the first feature section 310. The control unit 180 can display the preview image 390 at the top of the three-dimensional progressive bar 300 as shown in FIG. 78 or may display the preview image 390 in part of a full screen as shown in FIG. 79.

For example, when receiving a user input for touching a partial section including the feature of a video and flicking it toward the upper direction from the three-dimensional progressive bar 300, the control unit 180 can display a thumbnail image for the touched partial section. Then, the control unit 180 can display a thumbnail image extracted from a touched partial section at each predetermined time interval.

Furthermore, the control unit 180 can display a preview image or a thumbnail image simultaneously for a plurality of section information. For example, referring to FIG. 80, the control unit 180 can display a preview image 392 for the first feature section 310 at the left top of a full screen and display a preview image 394 for the second feature section 320 at the right top of the full screen. Additionally, the control unit 180 can divide the full screen and may then display respective progressive bars for a plurality of section information.

Figure 81:
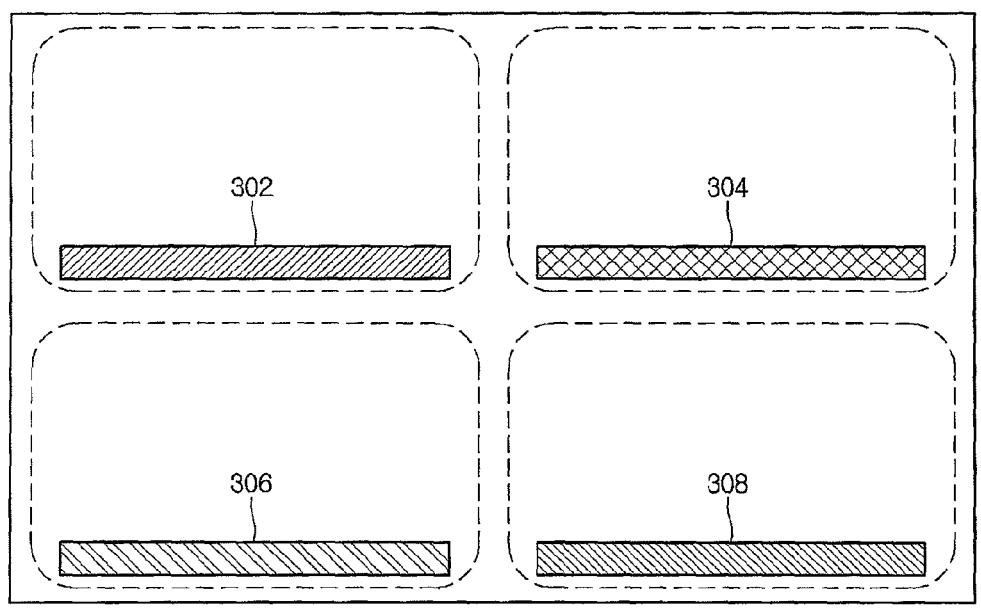
FIG. 81 is an overview illustrating a display of a plurality of section information according to another embodiment of the present invention.

Referring to FIG. 81, the control unit 180 can divide the full screen into four screens and then display a progressive bar 302 for a first feature, a progressive bar 304 for a second feature, a progressive bar 306 for a third feature, and a progressive bar 308 for a fourth feature in the respective divided screens. According to another embodiment of the present invention, the control unit 180 can display respective progressive bars for a plurality of section information at the top, bottom, left, and right of the full screen.

Figure 82:
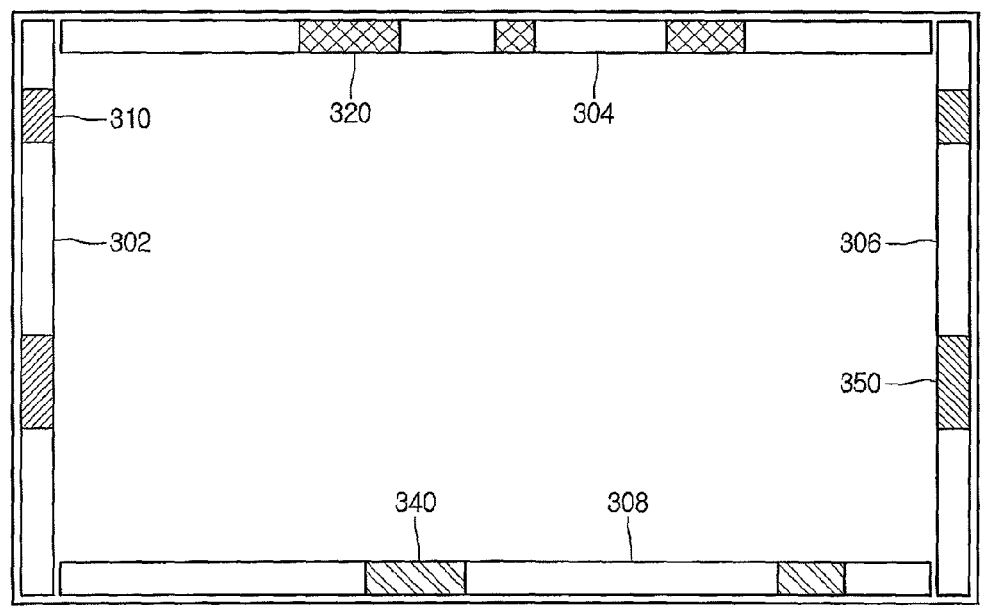
FIG. 82 is an overview illustrating a display of a plurality of section information according to another embodiment of the present invention.

Referring to FIG. 82, the control unit 180 can display the progressive bar 302 for a first feature at the left of the full screen, the progressive bar 304 for a second feature at the top of the full screen, the progressive bar 306 for a third feature at the right of the full screen, and the progressive bar 308 for a fourth feature at the bottom of the full screen.

The control unit 180 can receive a user input for a partial section displayed in the three-dimensional progressive bar 300 and then display section information for a new feature by combining a plurality of different features. For example, the control unit 180 can receive a user input for dragging a section including one feature and dropping it on a section including another feature and may then display section information for a new feature obtained by combining each feature.

Figure 83:
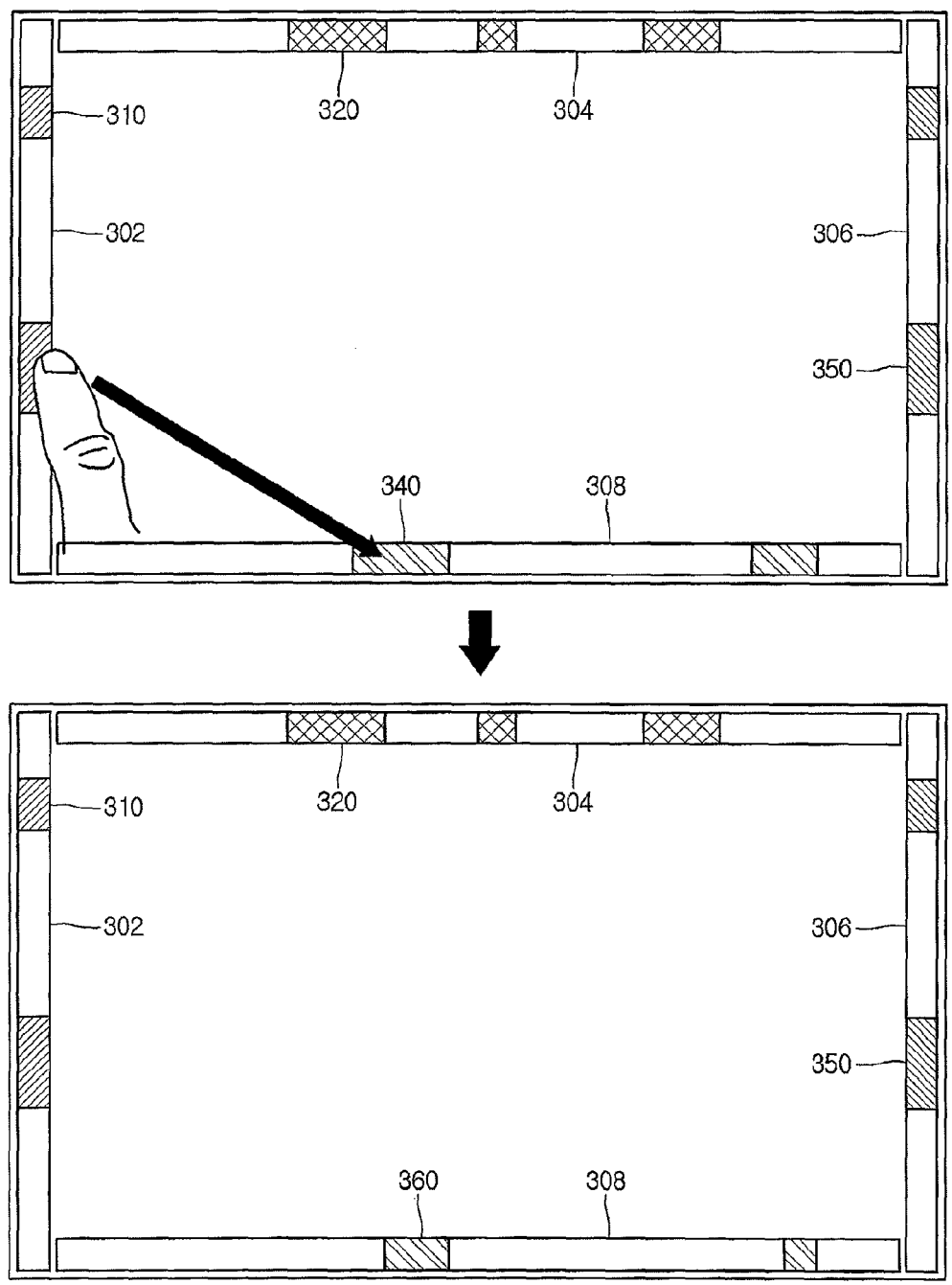
FIG. 83 is an overview illustrating a new feature combination depending on a user input according to another embodiment of the present invention.

Referring to FIG. 83, when receiving a user input for dragging a first feature section 310 including a first feature and dropping it on a fourth section 340 including a fourth feature, the control unit 180 can add section information for a fifth feature obtained by combining the first feature and the fourth feature. Then, the control unit 180 can display the section 360 including the added fifth feature in the progressive bar 308 for the fifth feature.

For example, when the first feature section 310 is a section where a character A appears and the fourth feature section is a section where a character B appears, the fifth feature may be that the characters A and B appear simultaneously. Then, the control unit 180 can display a section including the fifth feature in the three-dimensional progressive bar 300.

The control unit 180 can receive a user input for a partial section displayed in the three-dimensional progressive bar 300 and then generate a playback list. For example, the control unit 180 can receive a user input for dragging a section including one feature and dropping it on the playback list 370 and then generate a playback list including the dragged and dropped section.

Figure 84:
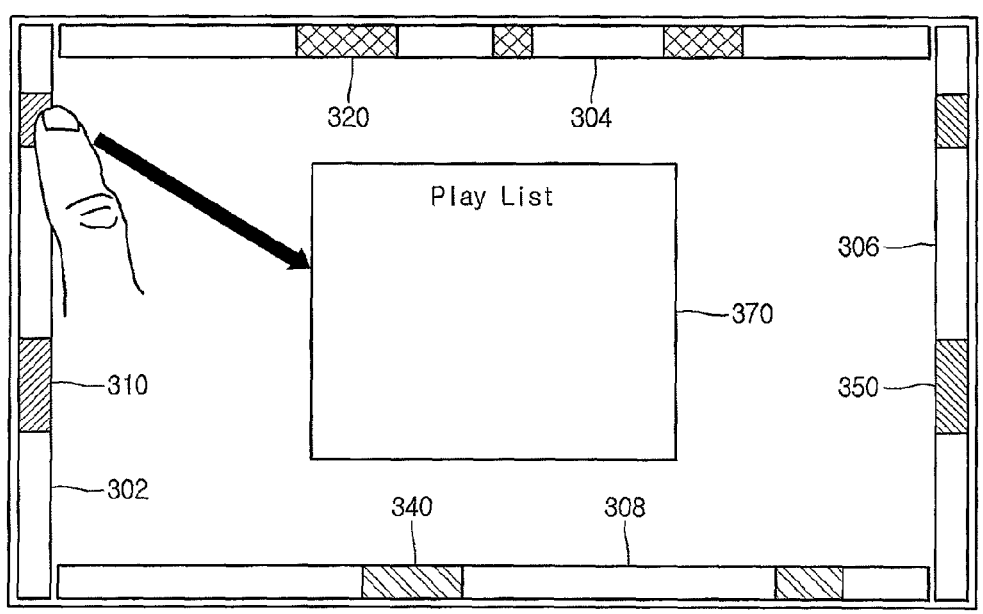
FIG. 84 is an overview illustrating a playback list according to another embodiment of the present invention.

Referring to FIG. 84, when receiving a user input for dragging the first feature section 310 and dropping it on the playback list 370, the control unit 180 can generate a playback list including the dragged and dropped first feature section 310.

Figure 85:
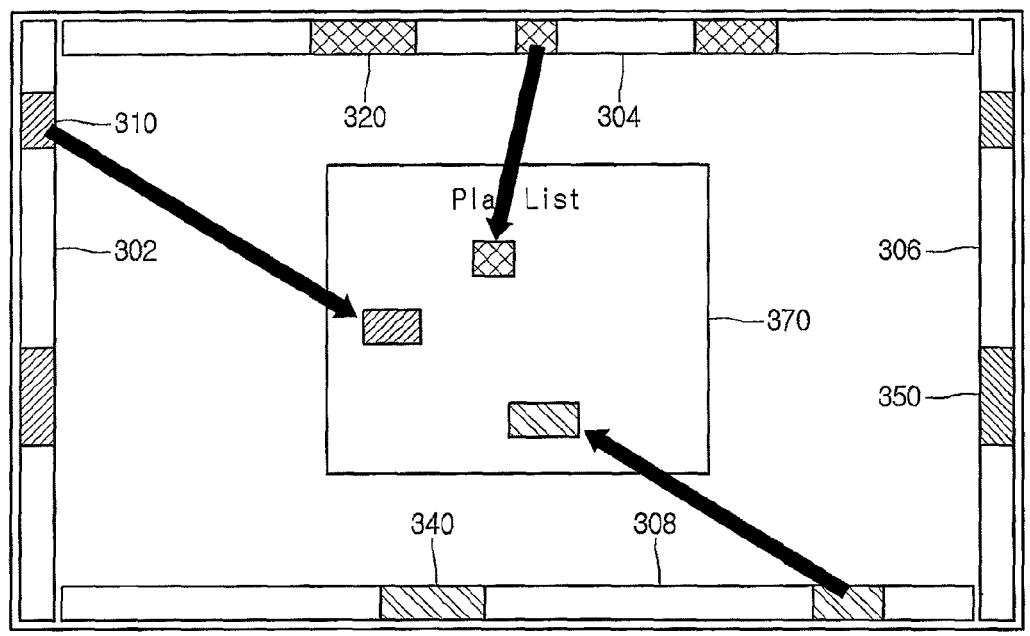
FIG. 85 is an overview illustrating a playback list generation according to another embodiment of the present invention.
Figure 85:
Figure 85:
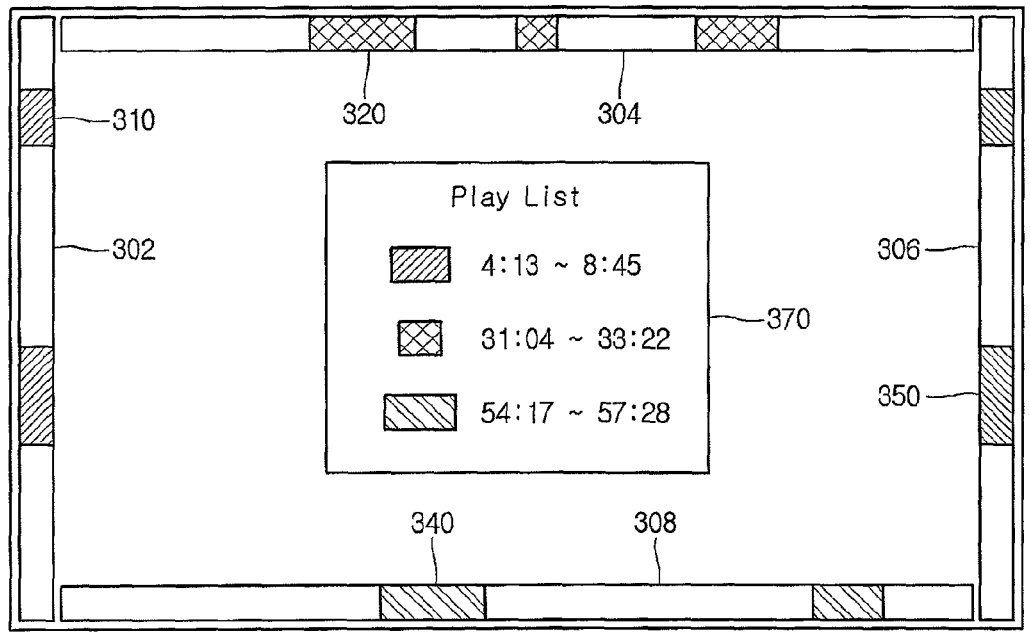

According to an embodiment of the present invention, referring to FIG. 85, when receiving a user input for dragging the first feature section 310, the second feature section 320, and a fourth feature section 340 including a fourth feature information and dropping them on the playback list 370, the control unit 180 can generate the playback list 370 including the dragged and dropped first feature section 310, second feature section 320, and fourth feature section 340.

Then, the control unit 180 can store only a playback section included in the generated playback list 370. Additionally, the control unit 180 can play only a playback section included in the generated playback list 370. The control unit 180 can receive a user input for the playback indicator 380 displayed in the three-dimensional progressive bar 300 and then perform an operation corresponding to the received user input. For example, according to a user input for the playback indicator 380, the control unit 180 can display respective progressive bars for a plurality of section information included in the three-dimensional progressive bar 300.

Figure 86:
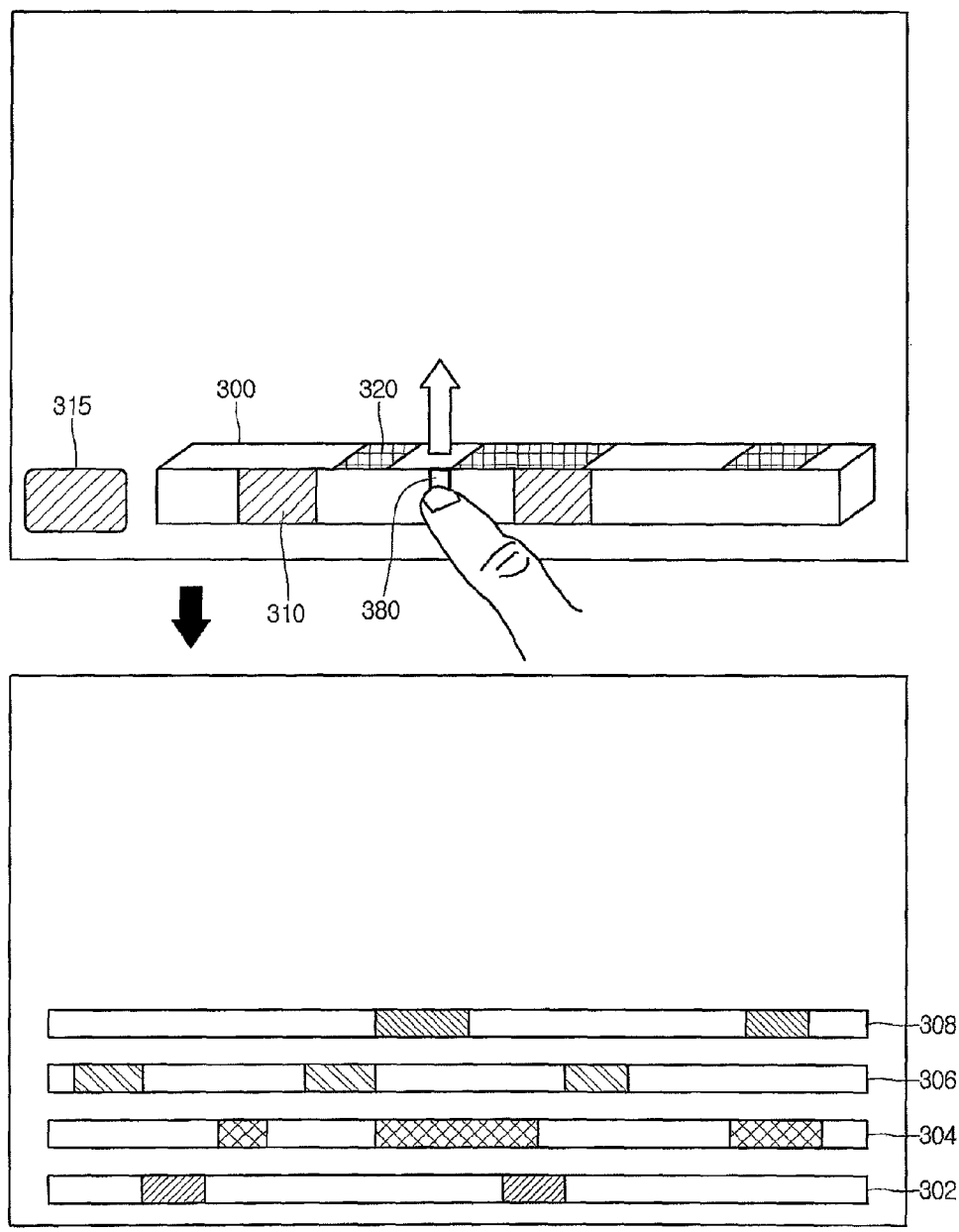
FIG. 86 is an overview illustrating a progressive bar displaying a plurality of section information according to another embodiment of the present invention.

As shown in FIG. 86, when receiving a user input for touching the playback indicator 380 and flicking it toward the upper direction of the three-dimensional progressive bar 300, the control unit 180 can display a progressive bar for each of section information included in the three-dimensional progressive bar 300.

Accordingly, the control unit 180 can display a progressive bar 302 for section information including a first feature, a progressive bar 304 for section information including a second feature, a progressive bar 306 for section information including a third feature, and a progressive bar 308 for section information including a fourth feature. Additionally, the control unit 180 can display a viewing rating for a specific section when displaying respective progressive bars for a plurality of section information.

Figure 87:
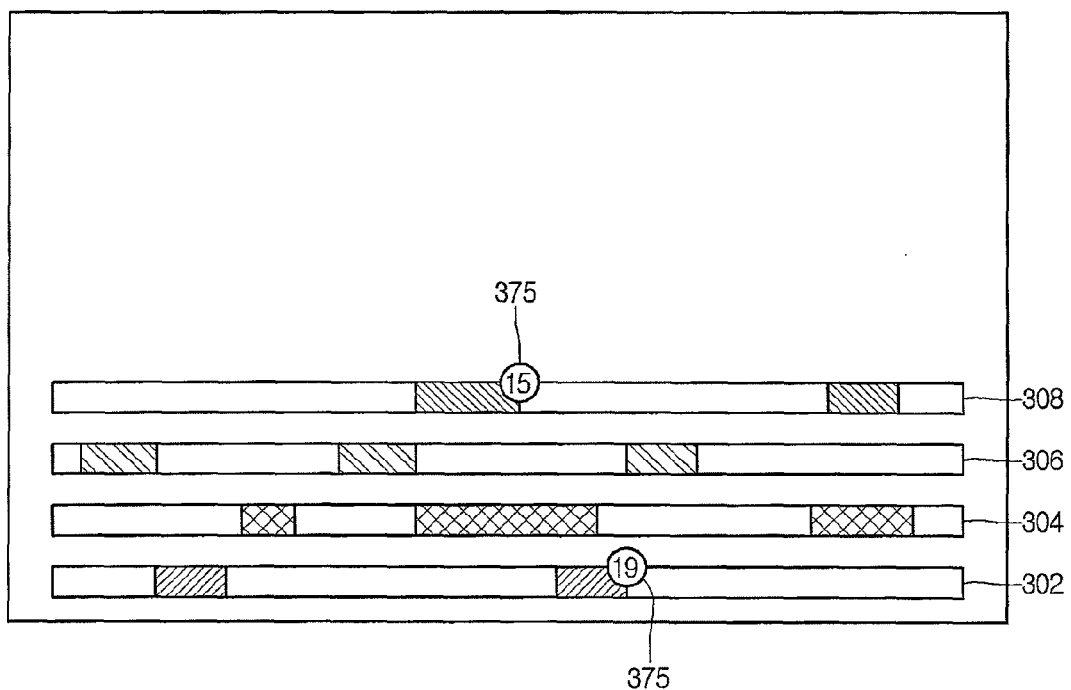
FIG. 87 is an overview illustrating a viewing rating display according to another embodiment of the present invention.

Referring to FIG. 87, the control unit 180 can display a viewing rating display 375 for a playback section that is not for general audience in the progressive bar 302 for a first feature, the progressive bar 304 for a second feature, the progressive bar 306 for a third feature, and the progressive bar 308 for a fourth feature.

Figure 88:
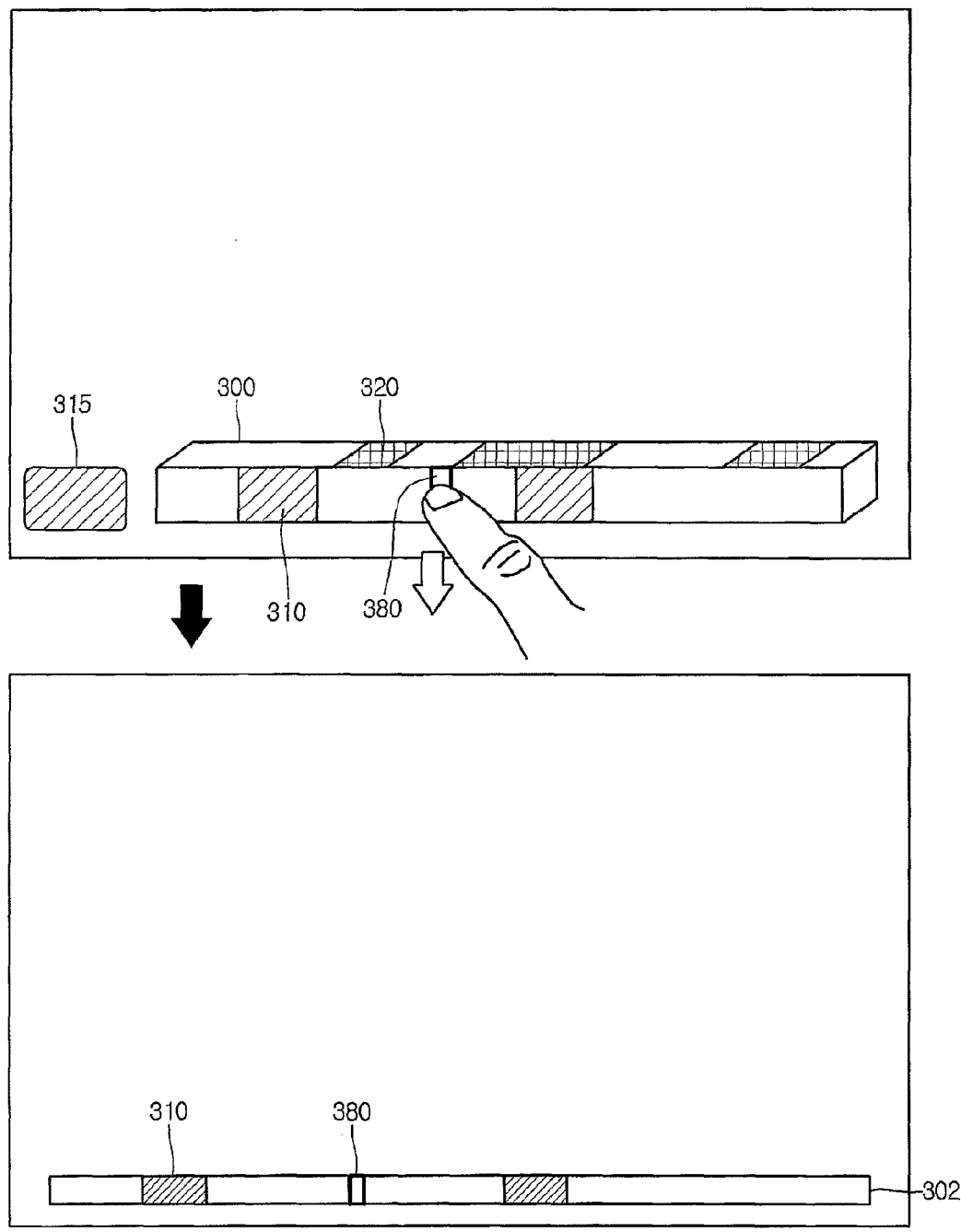
FIGS. 88 and 89 are overviews illustrating a change of a progressive bar according to another embodiment of the present invention.

According to another embodiment of the present invention, the control unit 180 can change the form of the three-dimensional progressive bar 300 according to a user input for the playback indicator 380. For example, as shown in FIG. 88, when receiving a user input for touching the playback indicator 380 and flicking it toward the lower direction of the three-dimensional progressive bar 300, the control unit 180 can change the three-dimensional progressive bar 300 into the progressive bar 302 for a first feature.

Figure 89:
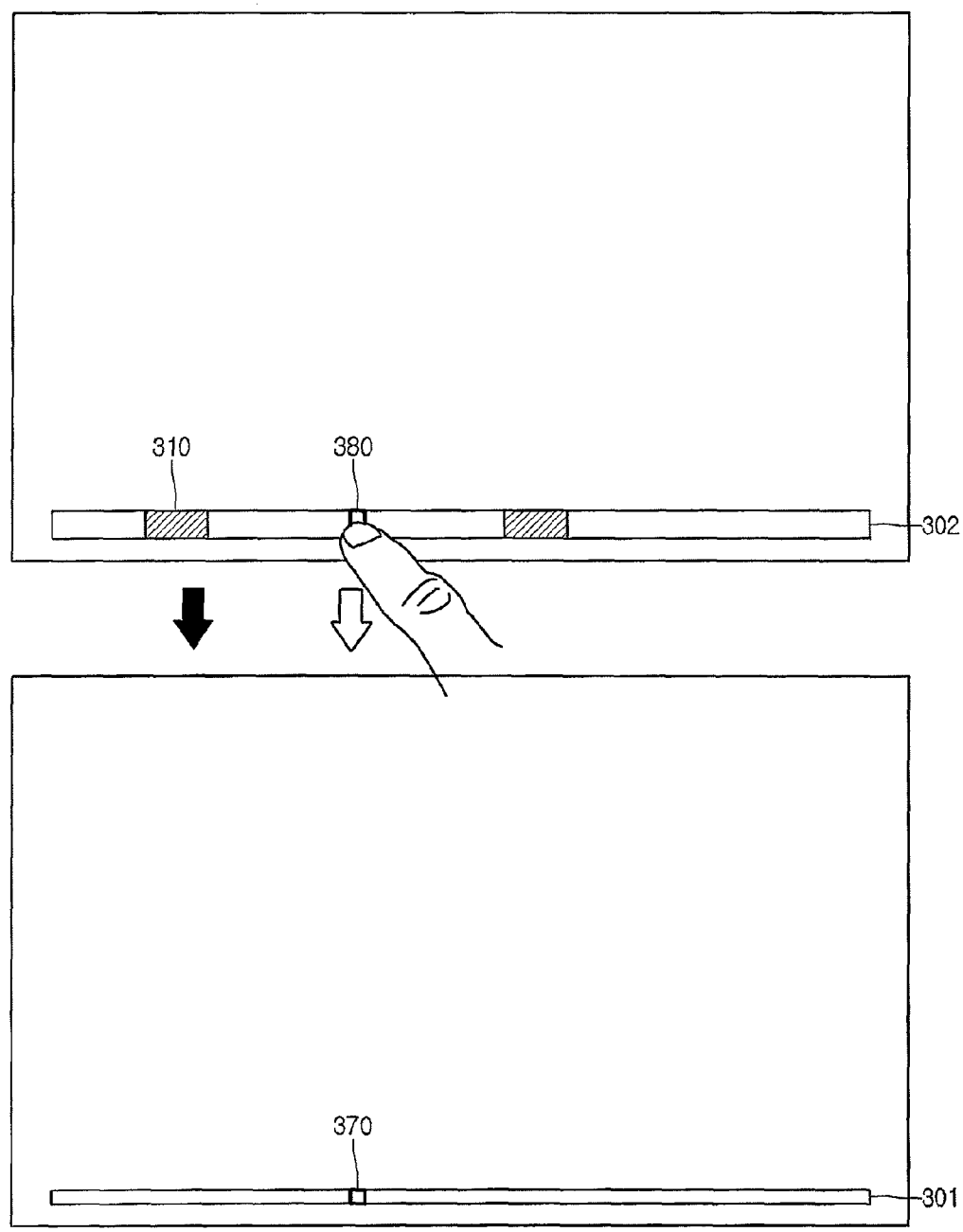

Then, as shown in FIG. 89, when receiving a user input for touching the playback indicator 380 and flicking it toward the lower direction of the three-dimensional progressive bar 302 for a first feature, the control unit 180 can change the three-dimensional progressive bar 302 for the first feature into a general progressive bar 301 displaying a progress section.

Next, FIG. 64 is a flowchart illustrating a section information display of the mobile terminal 100 according to another embodiment of the present invention. Referring to FIG. 64, if not receiving a user input for a predetermined time (Yes in S322), the control unit 180 removes a progressive bar displaying section information on a video (S324).

Then, the control unit 180 can play a video in full screen where the progressive bar displaying section information is removed. For example, if not receiving a user input for a predetermined time, the control unit 180 can remove the three-dimensional progressive bar 300 displaying a plurality of section information.

When a progress section of a video reaches a feature section including the feature of the video (Yes in S326), the control unit 180 displays a progressive bar displaying section information (S328). When a progress section of a video reaches a specific section including at least one feature, the control unit 180 can display a progressive bar displaying section information. This will be described with reference to FIGS. 90 and 91.

Figure 90:
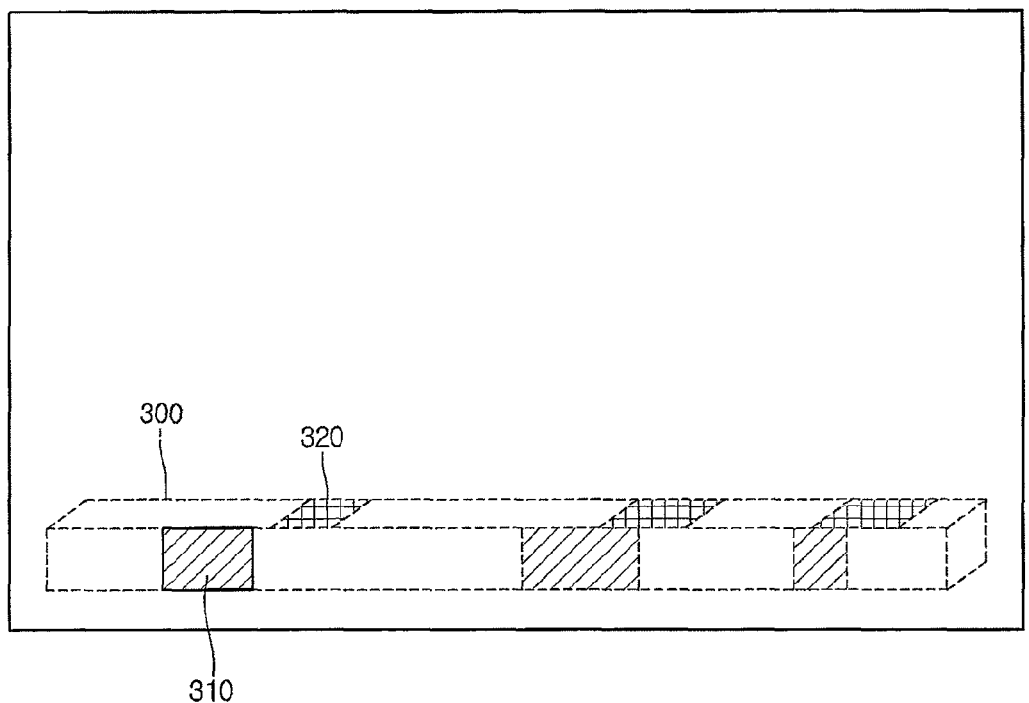
FIGS. 90 and 91 are overviews illustrating a three-dimensional progressive bar displaying section information on a video progress section according to another embodiment of the present invention.
Figure 91:
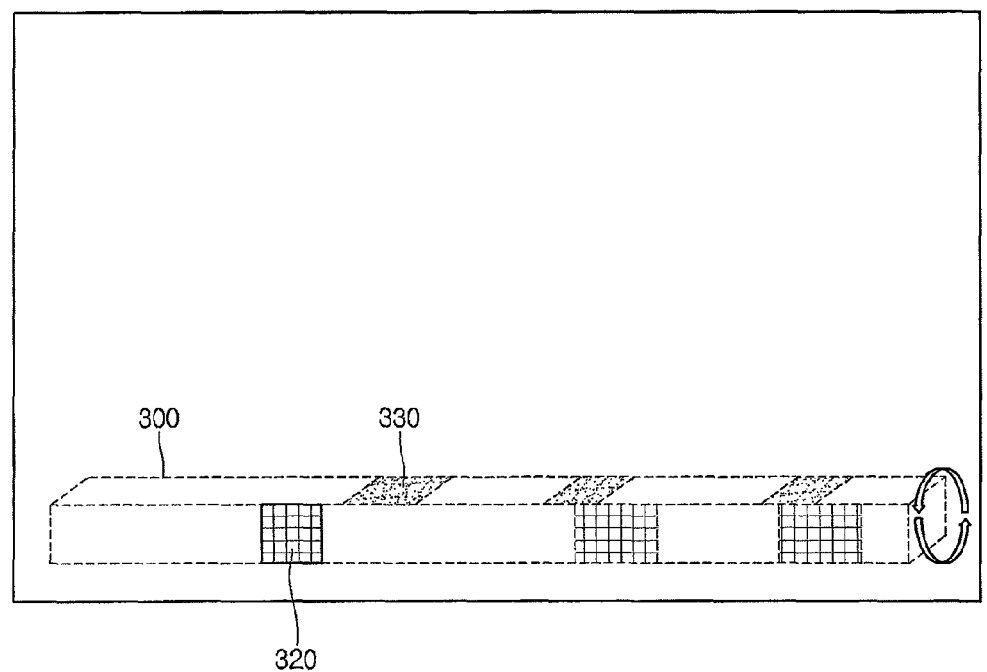

In particular, FIGS. 90 and 91 are overviews illustrating a three-dimensional progressive bar 300 displaying section information on a video progress section according to another embodiment of the present invention. Referring to FIG. 90, when a progress section of a video reaches a first feature section 310 including a first feature, the control unit 180 can display the three-dimensional progressive bar 300. Then, the control unit 180 can display the remaining section other than the first feature section 310 semi-transparently in the entire section of the three-dimensional progressive bar 300. Then, while a section including one feature is in progress, if a section including another feature is reached, the control unit 180 can rotate the three-dimensional progressive bar 300 to display a side displaying the other feature.

Referring to FIG. 91, while the first feature section 310 is in progress, if the second feature section 320 including a second feature is reached, the control unit 180 can rotate the three-dimensional progressive bar 300 so that a side displaying the second feature section 320 is displayed at the front of a full screen.

According to another embodiment of the present invention, the control unit 180 can display a plurality of section information for a video in respective partial areas of a full screen. In more detail, the control unit 180 can display a plurality of section information for a video in respective edge areas of a full screen. This is described with reference to FIG. 92. In particular, FIG. 92 is an overview illustrating a display of a plurality of section information according to another embodiment of the present invention.

Figure 92:
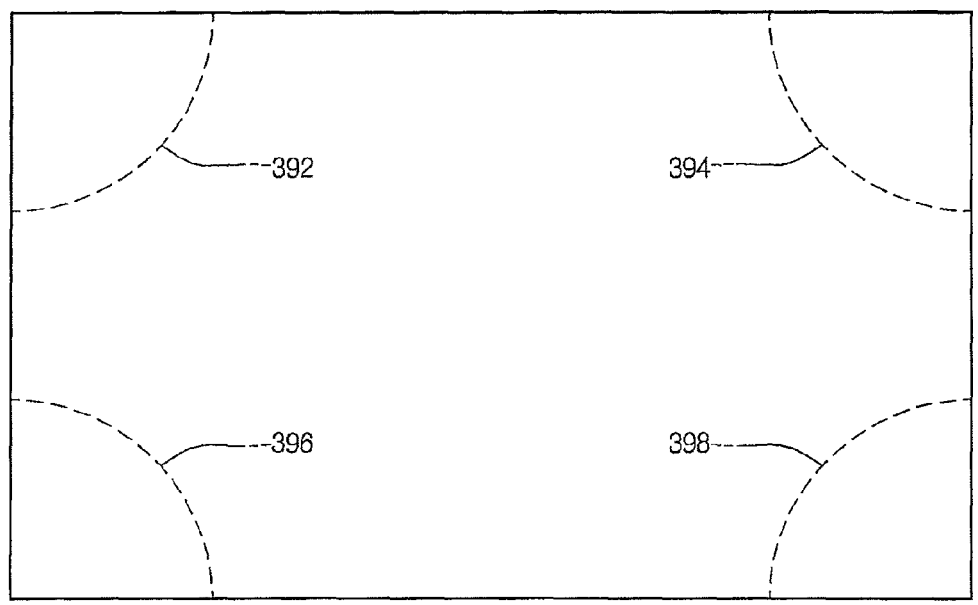
FIG. 92 is an overview illustrating a display of a plurality of section information according to another embodiment of the present invention.

Referring to FIG. 92, the control unit 180 can display section information for a first feature, a second feature, a third feature, and a fourth feature in respective edge areas 392, 394, 396, and 398 of a full screen. Then, when a progress section of a video reaches an area including the first feature, the second feature, the third feature, or the fourth feature, the control unit 180 may display section information corresponding to each feature in the respective edge areas 392, 394, 396, and 398 of a full screen. Additionally, the control unit 180 can display information for each of a plurality of features in the respective edge areas 392, 394, 396, and 398 of a full screen.

In relation to a terminal and its operating method according to an embodiment of the present invention, a user receives detailed information on video viewing and views a video conveniently. Further, according to an embodiment of the present invention, an intuitive control method for video in addition to video viewing information may be provided to a user.

According to an embodiment of the present invention, the above method may be implemented on a program recorded medium as processor readable code. Examples of the processor readable medium may include ROM, RAM, CD-ROM, magnetic tape, floppy disk, and optical data storage devices and also may be implemented in a form of a carrier wave (for example, transmission through internet).

In relation to the above-described terminal, the configurations and methods of the above-described embodiments are applied without limitations and in order to provide various modifications, some or all of embodiments may be selectively combined and configured.

What is claimed is:

1. A method of controlling a mobile terminal, the method comprising:
   obtaining, via a camera of the mobile terminal, an image of a user;
   playing a video on a display unit of the mobile terminal;
   determining, via a controller of the mobile terminal, if the user is viewing the video being played based on the obtained image;
   storing, in a memory associated with the mobile terminal, video viewing information indicating when the user is viewing the video being played and when the user is not viewing the video being played for a specific playback section in an entire playback section of the video being played;
   receiving an input requesting the video viewing information be displayed;
   displaying the video viewing information as a progressive bar on the display unit;
   dividing the entire playback section of the video into a first section corresponding to the video not being played, a second section corresponding to when the user is viewing the video being played, and a third section corresponding to when the user is not viewing the video being played;
   receiving an input for a playback setting time of the video; and
   performing a playback setting on the video based on the input for the playback setting time and the video viewing information,
   wherein the performing the playback setting on the video comprises setting a playback speed of the second section faster than a playback speed of the first section and a playback speed of the third section when the playback setting time is shorter than a total playback time of the video.

2. The method according to claim 1, further comprising:
   determining if the user is viewing the video being played by determining whether the user is gazing at the video being played based on the obtained image of the user.

3. The method according to claim 1, further comprising:
   displaying the stored video viewing information, when a progress section of the video being played reaches a section including stored video viewing information.

4. The method according to claim 1, further comprising:
   receiving a user input on the displayed progressive bar; and performing a control operation on the video based on a type of the user input.

5. The method according to claim 4, wherein the performing the control operation comprises playing a preview image for the video based on a first type of the user input, displaying a thumbnail image for the video based on a second type of the user input, and setting a playback characteristic for the video based on a third type of the user input, and
wherein the setting of the playback characteristic comprises skip-playing a partial section of the video and setting a playback speed.

6. The method according to claim 4, wherein the performing the control operation comprises, when the video is being played or a still screen is displayed, performing different control operations in response to a same type of user input.

7. The method according to claim 1, wherein the displaying the video viewing information comprises displaying an entire playback list of video viewing information for at least one video played.

8. The method according to claim 1, wherein the progressive bar includes a first section corresponding to the video not being played, a second section corresponding to when the user is viewing the video being played, and a third section corresponding to when the user is not viewing the video being played.

9. The method according to claim 8, further comprising:
receiving an input for one of the first, second and third sections of the progressive bar; and
performing a video control operation on a corresponding partial section of the video based on the received input,
wherein the performing the video control operation comprises playing a preview image for the corresponding partial section, displaying a thumbnail image corresponding to the partial section, and setting a playback for the corresponding partial section.

10. The method according to claim 9, wherein the performing the video control operation comprises at least one of playing a preview image on the corresponding partial section, displaying a thumbnail image corresponding to the partial section, and setting a playback characteristic for the corresponding partial section when the received input corresponds to a flicking touch direction, and
wherein the setting of the playback for the corresponding partial section comprises skip-playing the corresponding partial section and setting a playback speed of the corresponding partial section.

11. A mobile terminal, comprising:
a camera configured to obtain an image of a user;
a display unit configured to display a video being played on the mobile terminal; and
a controller configured to:
determine if the user is viewing the video being played based on the obtained image;
store, in a memory associated with the mobile terminal, video viewing information indicating when the user is viewing the video being played and when the user is not viewing the video being played for a specific playback section in an entire playback section of the video being played;
receive an input requesting the video viewing information be displayed;
display the video viewing information as a progressive bar on the display unit;
divide the entire playback section of the video into a first section corresponding to the video not being played, a second section corresponding to when the user is viewing the video being played, and a third section corresponding to when the user is not viewing the video being played;
receive an input for a playback setting time of the video; and
perform a playback setting on the video based on the input for the playback setting time and the video viewing information,
wherein the performing the playback setting on the video comprises setting a playback speed of the second section faster than a playback speed of the first section and a playback speed of the third section when the playback setting time is shorter than a total playback time of the video.

12. The mobile terminal according to claim 11, wherein the controller is further configured to determine if the user is viewing the video being played by determining whether the user is gazing at the video being played based on the obtained image of the user.

13. The mobile terminal according to claim 11, wherein the controller is further configured to display the stored video viewing information, when a progress section of the video being played reaches a section including stored video viewing information.

14. The mobile terminal according to claim 11, wherein the controller is further configured to:
receive a user input on the displayed progressive bar, and
perform a control operation on the video based on a type of the user input.

15. The mobile terminal according to claim 14, wherein the performing the control operation comprises playing a preview image for the video based on a first type of the user input, displaying a thumbnail image for the video based on a second type of the user input, and setting a playback characteristic for the video based on a third type of the user input, and
wherein the setting of the playback characteristic comprises skip-playing a partial section of the video and setting a playback speed.

16. The mobile terminal according to claim 14, wherein the performing the control operation comprises, when the video is being played or a still screen is displayed, performing different control operations in response to a same type of user input.

17. The mobile terminal according to claim 11, wherein the controller is further configured to display an entire playback list of video viewing information for at least one video played.

18. The mobile terminal according to claim 11, wherein the progressive bar includes a first section corresponding to the video not being played, a second section corresponding to when the user is viewing the video being played, and a third section corresponding to when the user is not viewing the video being played.

* * * * *